(12) United States Patent
Lindbo

(10) Patent No.: US 12,654,942 B2
(45) Date of Patent: Jun. 16, 2026

(54) AUTOMATED STORAGE AND RETRIEVAL SYSTEM

(71) Applicant: Ocado Innovation Limited, Hatfield (GB)

(72) Inventor: Lars Sverker Ture Lindbo, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 453 days.

(21) Appl. No.: 18/552,969

(22) PCT Filed: Mar. 28, 2022

(86) PCT No.: PCT/EP2022/058171
§ 371 (c)(1),
(2) Date: Sep. 28, 2023

(87) PCT Pub. No.: WO2022/207574
PCT Pub. Date: Oct. 6, 2022

(65) Prior Publication Data
US 2024/0190658 A1      Jun. 13, 2024

(30) Foreign Application Priority Data

Mar. 29, 2021    (GB) ..................................... 2104433

(51) Int. Cl.
*B65G 1/06* (2006.01)
*B65G 1/04* (2006.01)
*B65G 1/137* (2006.01)

(52) U.S. Cl.
CPC ......... *B65G 1/1375* (2013.01); *B65G 1/0478* (2013.01)

(58) Field of Classification Search
CPC ................ B65G 1/1375; B65G 1/0478; B65G 2201/0258; B65G 1/0492; B65G 1/04;
(Continued)

(56) References Cited

U.S. PATENT DOCUMENTS 7,591,630 B2 * 9/2009 Lert, Jr. ............... B65G 1/0492
414/280
2004/0065523 A1 * 4/2004 Lichti ................... B65G 47/57
198/475.1
(Continued)

FOREIGN PATENT DOCUMENTS

DE        102010015054 A1    11/2011
EP           2417044 B1       8/2022
(Continued)

OTHER PUBLICATIONS

International Search Report (PCT/ISA/210) with translation and Written Opinion (PCT/ISA/237) mailed on Jul. 18, 2022, by the Japan Patent Office as the International Searching Authority for International Application No. PCT/EP2022/058171 (21 pages).
(Continued)

*Primary Examiner* — Justin Holmes
(74) *Attorney, Agent, or Firm* — Gregory Matt McCloskey

(57)                    ABSTRACT

An automated storage and retrieval system includes a storage area distributed over vertically stacked storage levels having an in-bound area and an out-bound area; movable carriages on which items are placed; and autonomous transport vehicles, configured to move carriages in the storage area. A multi-level vertical loop conveyor includes a drive member; spaced apart platforms coupled to the drive member, spaced by the spacing between the vertically stacked storage levels, each platform having a support surface to support a carriage; a guide member for guiding platforms around a continuous vertical loop; and a drive mechanism to move platforms vertically one behind another around the continuous vertical loop. A navigation system guides the autonomous transport. A control system controls movement of the drive member so a platform will be at a level
(Continued)

corresponding to at least one of the vertically stacked storage levels in response to signals from the navigation.

33 Claims, 31 Drawing Sheets

(58) Field of Classification Search
CPC ...... B65G 1/137; B65G 1/065; B65G 1/1378; B66B 9/10
See application file for complete search history.

(56) References Cited

U.S. PATENT DOCUMENTS

| | | | |
|---|---|---|---|
| 2005/0061622 | A1 | 3/2005 | Martin |
| 2007/0065258 | A1* | 3/2007 | Benedict .................. B65G 1/04 414/266 |
| 2010/0316468 | A1 | 12/2010 | Lert et al. |
| 2010/0316469 | A1 | 12/2010 | Lert et al. |
| 2010/0316470 | A1 | 12/2010 | Lert et al. |
| 2010/0322746 | A1 | 12/2010 | Lert et al. |
| 2010/0322747 | A1 | 12/2010 | Lert et al. |
| 2012/0259482 | A1 | 10/2012 | Jeschke |
| 2013/0129453 | A1 | 5/2013 | Salichs et al. |
| 2014/0088758 | A1 | 3/2014 | Lert et al. |
| 2014/0271063 | A1 | 9/2014 | Lert et al. |
| 2014/0277693 | A1 | 9/2014 | Naylor |
| 2015/0266672 | A1 | 9/2015 | Lert et al. |
| 2016/0185526 | A1 | 6/2016 | Lert et al. |
| 2017/0362032 | A1 | 12/2017 | Sullivan et al. |
| 2018/0016098 | A1 | 1/2018 | Lert et al. |
| 2018/0334325 | A1 | 11/2018 | Lert et al. |
| 2019/0218034 | A1 | 7/2019 | Caveney |
| 2020/0039744 | A1 | 2/2020 | Lert et al. |
| 2020/0172336 | A1 | 6/2020 | Sullivan et al. |
| 2020/0346866 | A1 | 11/2020 | Lert et al. |
| 2022/0002083 | A1 | 1/2022 | Lert et al. |
| 2022/0177226 | A1 | 6/2022 | Sullivan et al. |

FOREIGN PATENT DOCUMENTS

| | | | | |
|---|---|---|---|---|
| JP | S61114907 | A | 6/1986 | |
| JP | H485202 | A | 3/1992 | |
| JP | 2005506942 | A | 3/2005 | |
| JP | 2013086923 | A | 5/2013 | |
| JP | 2016518293 | A | 6/2016 | |
| JP | 2018505108 | A | 2/2018 | |
| JP | 2020040774 | A | 3/2020 | |
| JP | 2020132281 | A | 8/2020 | |
| JP | 2012211019 | A | 11/2021 | |
| WO | 03037757 | A1 | 5/2003 | |
| WO | WO-2010118412 | A1 * | 10/2010 | .............. B65G 1/04 |
| WO | 2015185628 | A2 | 12/2015 | |

OTHER PUBLICATIONS

Patents Act 1977: Search Report under Section 17 dated Jan. 6, 2022, issued by the United Kingdom Intellectual Property Office in corresponding Great Britain Application No. GB2104433.4. (5 pages).

Office Action issued on Aug. 23, 2022 by the UK Intellectual Property Office in corresponding GB Application No. 2204385.5 (8 pages) corresponding to Applicant's U.S. Appl. No. 18/552,969.

Office Action issued on Jul. 6, 2023 by the UK Intellectual Property Office in corresponding GB Application No. 2204385.5 (3 pages) corresponding to Applicant's U.S. Appl. No. 18/552,969.

Office Action issued on Oct. 10, 2024 by the Australian Patent Office in corresponding Australian Application No. 2022248847 (4 pages) corresponding to Applicant's U.S. Appl. No. 18/552,969.

Office Action issued on Jan. 2025 by the Japanese Patent Office in corresponding Japanese Application No. 2023-560117 (8 pages) corresponding to Applicant's U.S. Appl. No. 18/552,969.

Office Action issued on Feb. 12, 2025 by the Canadian Patent Office in corresponding Canadian Application No. 3,214,607 (5 pages) corresponding to Applicant's U.S. Appl. No. 18/552,969.

Office Action issued on Mar. 6, 2025 by the Australian Patent Office in corresponding Australian Application No. 2022248847 (4 pages) corresponding to Applicant's U.S. Appl. No. 18/552,969.

* cited by examiner

```
                        ┌──────────────┐
                        │    Cont'd    │
                        └──────────────┘
                               │
                               ▼         ╱── 170
                            ╱╲
                          ╱      ╲
                        ╱          ╲
                      ╱  Is platform  ╲              ╱── 174
                      ╲  at storage    ╲─────────┐
                        ╲  level?      ╱         │
                          ╲          ╱           ▼
                            ╲      ╱       ┌──────────────┐
                              ╲  ╱         │  Wait until  │
                               │           │ storage level│
                               │           └──────────────┘
                               │                  │
                               ◄──────────────────┘
      172 ──╲                  ▼
         ┌──────────────────────────────────────────┐
         │          Instruct  lift to pause          │
         └──────────────────────────────────────────┘
                               │          176 ──╲
                               ▼
         ┌──────────────────────────────────────────┐
         │        Bot moves carriage to parking space│
         └──────────────────────────────────────────┘
                               │          178 ──╲
                               ▼
         ┌──────────────────────────────────────────┐
         │  Bot sends signal to Master Controller of │
         │               availability                │
         └──────────────────────────────────────────┘
                               │
                               ▼
                        ┌──────────────┐
                        │     End      │
                        └──────────────┘
```

Figure 16 cont'd

AUTOMATED STORAGE AND RETRIEVAL SYSTEM

FIELD OF INVENTION

The present invention relates to the field of an automated storage and retrieval system comprising one or more autonomous transport vehicles and their movement therein.

BACKGROUND

Generally, warehouses for the storage and retrieval of products or items comprises a series of racks that are accessible by transport devices comprising a lifting device such as forklifts that are moveable within aisles between the racks. The products or items are typically stored on pallets or other storage containers and placed on different levels of the racks. A transport device, either manually driven or automated, travels up and down aisles between the racks and the lifting device is used to retrieve a pallet storing a particular product or item thereon from the racks. However, the storage and retrieval of products is very labour intensive and time consuming. With the rapid growth of e-commerce, there has been a drive to provide a more automated storage and retrieval system to cater for the increasing demand of online purchases.

PCT Publication No. WO2015/185628A (Ocado) describes a known automated storage and retrieval system in which stacks of bins or containers are arranged within a grid framework structure. The containers, known as bins or containers, are stacked on top of one another to form stacks. The stacks are arranged in a grid framework structure in a warehousing or distribution centre. The bins or containers are accessed by robotic load handling devices (otherwise known as bots) remotely operative on tracks located on the top of the grid framework structure. Whilst, the automated storage and retrieval system taught in WO2015/185628A (Ocado) provides for a very dense system for the storage of items, the problem with this type of storage and retrieval system is the sheer size of the grid framework structure to store the bins or containers requiring adequate headroom above the grid framework structure to accommodate the robotic load handling devices operable on the grid structure. Where space is a premium to densely store items, a storage and retrieval system is thus required that can operate without being dedicated by the amount of headroom above the system.

US2012/0259482 (Klaus Jeschke) teaches a storage and retrieval system comprising self propelled tractors to move storage material arranged on trailers on a flat freely derivable storage surface to a desired position and parking it thereon. The trailers are moved on the storage surface by the tractors to a storage location and from the storage location, e.g. from a loading station at which an empty trailer is loaded with one or more products to a storage location or vice versa from a storage location to an unloading location where the product is retrieved from the trailer again. The storage surface is distributed over several levels above one another which requires moving the loaded trailer together with the tractor from one level into another through an elevator. The elevator extends from the lowest to the highest storage surface and can stop at any level. Movement of the tractors and also the elevator which connects the storage areas with one another are controlled by a central control.

Whilst, US2012/0259482 (Klaus Jeschke) provides a more economical storage and retrieval system which is able to be accommodated in a building having a low ceiling height in comparison to the grid framework structure taught in the PCT Publication No. WO2015/185628A (Ocado), US2012/0259482 (Klaus Jeschke) suffers from the problem of congestion of products or items to and from the storage surface resulting in significant delays to fulfil customer orders. Even with the use of ramps connecting the different storage levels of the storage levels to improve the throughput of products from the storage surface, the rate limiting step for the retrieval or storage of items to and from storage is largely dependent on the speed by which the tractors can move the trailers to a loading or unloading station. Even with the use of elevators to move the trailers from one level to another level, the distribution of the storage surface amongst multiple storage levels presents a bottleneck to the moving of trailers between the different storage levels to the extent that the throughput of the items or products from storage is comparable to a manually operated warehouse discussed above.

A storage and retrieval system is thus required that offers high storage density and faster throughput of items to meet the increasing demand of the storage and retrieval of products or items and not be constrained by the height of a building accommodating the storage and retrieval system.

SUMMARY OF THE INVENTION

The present invention has mitigated the above problem by providing an automated storage and retrieval system comprising:

a) a plurality of vertically stacked storage levels, the plurality of vertically stacked storage levels comprising a storage area distributed over the plurality of vertically stacked storage levels, the plurality of vertically stacked storage levels comprises at least one in-bound area for entering the storage area and at least one out-bound area for exiting the storage area;

b) a plurality of carriages on which one or more items is placed can be moved and parked in the storage area;

c) a plurality of autonomous transport vehicles, each autonomous transport vehicle of the plurality of autonomous transport vehicles being configured to move anyone of the plurality of carriages in the storage area;

d) a multi-level vertical loop conveyor, the multi-level vertical conveyor comprising:

i) a drive member;

ii) a plurality of platforms coupled to the drive member, the plurality of platforms being vertically spaced apart corresponding to the spacing between each of the plurality of vertically stacked storage levels, each of the plurality of platforms having a support surface being configured to support at least one of the plurality of carriages, iii) a guide member for guiding the movement of the plurality of platforms around a continuous vertical loop;

iv) a drive mechanism coupled to said drive member and being configured to move the plurality of platforms vertically one behind the other around the continuous vertical loop;

e) a navigation system for guiding the plurality of autonomous transport vehicles in the storage area;

f) a control system operatively coupled to the drive mechanism and communicatively coupled to the navigation system, the control system being configured to control the movement of the drive member so that at least one of the plurality of platforms is at a level corresponding to at least one of the plurality of vertically stacked storage levels in response to one or more signals from the navigation system indicating that at least one of the plurality of autonomous transport vehicles is positioned in the at least one in-bound or the at least one out-bound area.

The provision of a multi-level vertical loop conveyor comprising a plurality of vertically spaced platforms that are configured to support a plurality of carriages on different platforms, increases the throughput of carriages to and from the storage area since multiple carriages can be vertically accumulated in the multi-level vertical loop conveyor. A multi-level vertical loop conveyor comprising a plurality of platforms attached to a drive member formed in a continuous vertical loop and driven by a drive mechanism (e.g. a motor) so that the platforms are driven around the continuous vertical loop may be based on a "paternoster" principle. The drive member could be a chain or belt that is able to follow a continuous vertical loop.

Alternatively, the drive member can additionally comprise a sprocket or drive wheel that works in tandem with the belt or chain to drive the plurality of platforms around a continuous vertical loop. More specifically, each of the plurality of platforms couples with the sprocket or drive wheel at the upper and lower curved portions of the multi-level vertical loop conveyor. The multi-level vertical loop conveyor further comprises a guide member for guiding the plurality of platforms around the continuous vertical loop. The drive mechanism can be a motor for moving the plurality of platforms around the guide member.

For the purpose of clarification and convenience, the term "multi-level vertical loop conveyor" and "multi-level conveyor" are used interchangeably to mean the same feature.

The multi-level vertical loop conveyor not only allows multiple carriages to be vertically accumulated on different platforms but also allows the loading and unloading of multiple carriages to and from the multi-level vertical loop conveyor to be performed at any point in the continuous vertical loop. This not only reduces the waiting time and congestion of one or more carriages in the in-bound or out-bound area of the storage area but also increases the movement of the carriages to and from the storage area. Moreover, the increasing ability to accommodate a plurality of carriages vertically in the multi-level vertical loop conveyor and the ability to move them between different levels of the vertically stacked storage levels increases the ability to process multiple carriages substantially simultaneously. The in-bound area is a designated area of the storage area for entering the storage area. For example and for the purpose of the present invention, exiting the storage area through use of the multi-level vertical loop conveyor can be via the out-bound area. Likewise, the in-bound area is a designated area of the storage area for entering the storage area. Again, entering the storage area through the use of the multi-level vertical loop conveyor may be via the in-bound area. For efficiency, the use of the term "plurality of vertically stacked storage levels" will be used interchangeably with the term "rack" throughout the description.

The spacing between the plurality of platforms of the multi-level loop conveyor corresponds to the spacing between the plurality of vertically stacked storage levels such that more than one platform is at a level corresponding to the level of the plurality of vertically stacked storage levels. This allows multiple carriages to transfer between a plurality of platforms and the plurality of vertically stacked storage levels at substantially the same time, thereby increasing throughput of carriages to and from the multilevel vertical loop conveyor, i.e. index multiple storage levels at substantially the same time.

Preferably, the drive mechanism is operable to index the movement of the plurality of platforms in sequential steps, each of the sequential steps corresponding to the spacing between each of the plurality of storage levels. For example, the drive mechanism can have indexing means to index the movement of the plurality of platforms sequentially across the vertically stacked storage level, each indexing position corresponding to the level of a platform with at least one of the plurality of vertically stacked storage levels as the plurality of platforms travels around a continuous vertical loop.

A plurality of autonomous transport vehicles (referred to herein as "bots") are configured to move anyone of the plurality of carriages to and from the storage area distributed amongst the different levels of the rack. Examples of autonomous transport vehicles include but are not limited to an AGV (Automated Guided Vehicle) or an AMR (Autonomous Mobile Robots). Preferably, one or more of the autonomous transport vehicles is configured to push or pull one or more of the plurality of carriages in the storage area. Optionally, the one or more of the autonomous transport vehicles is configured to tow one or more of the plurality of carriages in the storage area. For example, the one or more autonomous transport vehicles may be configured to tow one or more carriages parked in the storage area to the out-bound area where it is subsequently loaded onto a platform of the multi-level vertical loop conveyor for transport to a pick station. Equally, the one or more autonomous transport vehicles may be instructed to transport one or more carriages from a decant station to a platform where it is transported to the in-bound area for entering the storage area.

A navigation system is used for guiding the plurality of autonomous vehicles in the storage area. For example, the navigation system comprises a plurality of markers distributed in the storage area, and each of the plurality of autonomous transport vehicles comprises at least one sensor or reader for sensing each of the plurality of markers. Alternatively, one or more sensors can be distributed throughout each storage level of the vertically stacked storage levels which are configured for sensing an identification, e.g. a marker, on each of the plurality of autonomous transport vehicles. Other means to navigate each of the plurality of autonomous transport vehicles around the storage area include but is not limited to the use of cameras or a GPS (global positioning system). Preferably, the markers comprises optical makers, e.g. barcode, QR etc. or an RFID tag. More preferably, the plurality of markers are distributed in a regular pattern in the storage area. The makers are strategically placed in different locations in the storage area so that the one or more sensors of a travelling autonomous transport vehicle can sense the markers and send a signal to the control system, which is processed by the control system to identify the position of the autonomous transport vehicle in the storage area. There are various makers used in the art that can be used to identify the location of an autonomous vehicle and these include but are not limited to barcode, QR etc or an RFID tag. Alternatively, the navigation system can comprises one or more cameras.

The control system and each of the autonomous vehicles are able to communicate with each other via a communication means. Preferably, the plurality of autonomous transport vehicles are wirelessly connected to the control system such that each of the plurality of autonomous transport vehicles is configured to send and/or receive the one or more signals to and from the control system indicative of the position of a respective autonomous transport vehicle in the storage area. The wireless communication between the control system can be based on a short range wireless communication technology, e.g. Bluetooth®, or long range wireless communication, e.g. over a network. The network may comprise a local area network (LAN), a wide area network (WAN) or any other type of network.

The operation of the multi-level vertical loop conveyor can be controlled by a control system operatively coupled to the drive mechanism and communicatively coupled to the navigation system. The control system is configured to control or coordinate the movement of the drive member so that at least one of the plurality of platforms is at a level corresponding to at least one of the plurality of vertically stacked storage levels in response to one or more signals from the navigation system indicating that at least one of the plurality of autonomous transport vehicles is positioned in the at least one in-bound area or the at least one out-bound area of the storage area.

One or more of the plurality of carriages can enter the storage area via the at least one in-bound area and one or more of the plurality of the carriages can exit the storage area via the at least one out-bound area. Preferably, each of the plurality of vertically stacked storage levels comprise the at least one in-bound area and the at least one out-bound area. Having at least one in-bound area and at least one out-bound area at each of the plurality of vertically stacked levels allows multiple carriages to traverse to and from the multi-level conveyor system.

Preferably, a first side of the multi-level loop conveyor is configured for feeding one or more of the plurality of carriages into the storage area at different storage levels of the vertically stacked storage levels and a second side of the multi-level level loop conveyor is configured for removing one more of the plurality carriages from the storage area at different storage levels of the vertically stacked storage levels, the first side corresponding to where the plurality of platforms are moving in an upward direction and the second side corresponds to where the plurality of platforms are moving in a downward direction. In this way, there is a flow of traffic into the multi-level vertical loop conveyor on one side of the multi-level vertical loop conveyor when exiting the storage area and a flow of traffic into the storage area via the other side of the multi-level vertical loop conveyor. In other words, the one or more of the plurality of carriages are fed into the storage area on one side of the multi-level conveyor where the plurality of platforms are moving in an upward direction. Conversely, one or more of the plurality of carriages exits the storage area from on the other side of the multi-level conveyor where the plurality of platforms are moving in a downward direction. Thus, both sides of the multi-level conveyor respectively feed one or more of the plurality of carriages into and out of the storage area as the plurality of platforms travel in a continuous vertical loop.

More preferably, the control system is configured to control the movement of the drive member so that each of the plurality of platforms is at a level corresponding to a storage level of the plurality of vertically stacked storage levels in response to one or more signals from the navigation system indicating that at least one of the plurality of autonomous transport vehicles is positioned in the at least one in-bound area or the at least one out-bound area. This allows multiple platforms of the multi-level conveyor to receive one or more carriages from different levels of the rack at substantially the same time. Preferably, the control system is configured to instruct the movement of at least one of the plurality of autonomous transport vehicles to or from the in-bound area or the out-bound area at each respective level of the plurality of vertically stacked storage levels substantially simultaneously.

In order to coordinate the movement of the carriages to and from the storage area, preferably, the control system is configured to control the movement of the plurality of autonomous transport vehicles so that the plurality of carriages are loaded onto the plurality of platforms in a first predetermined sequence and then unloaded from the plurality of platforms in a second predetermined sequence. Optionally, the first sequence is different to the second sequence such that the plurality of carriages are unloaded from the plurality of platforms in a different order to the loading the plurality of carriages onto the plurality of platforms. This allows one or more of the plurality of carriages to be unloaded from the multi-level conveyor system in a different order to the order the carriages are loaded into the multi-level conveyor system and could be associated with the order the items in the carriages are retrieved from the carriages. For example, in some cases where one or more items are grocery items, the different sequencing of retrieval of the carriages from the multi-level conveyor system allows orders to be packed differently depending on a particular attribute or characteristic of the order for delivery to a customer. The characteristic or attribute of the order may be associated with the type of item, e.g. frozen, chilled, or ambient, or the weight of the item. Equally, certain items, particularly chilled or frozen items, or perishable items may need to take preference over non-perishable items when being retrieved from their respective carriage. The different sequencing also allows to coordinate the retrieval of items depending upon customer demand or order of packing or urgency. For example, heavy items may take preference over lighter items in the sense that the heavy items are removed from the respective multi-level vertical conveyor before the lighter items so as to coordinate the packing of the items and to prevent the heavy items being placed on top of the lighter items.

Preferably, the control system is configured to control the movement of the drive member so as to prioritise one or more of the plurality of platforms to one or more of the carriages in the at least one in-bound area of one or more of the plurality of vertically stacked storage levels on the basis of a defined urgency criteria of the one or more carriages. The urgency criteria can be based on prioritising the one or more carriages at the pick station to fulfil customer orders. Other factors that could affect the urgency criteria include the duration of time the one or more containers is waiting in the at least one out-bound area and/or one or more attributes of one or more items in the one or more carriages. Preferably, the one or more attributes could comprise the temperature of the one or more items. For the control system to be configured to control the movement of the drive member so that one or more of the plurality of platforms are prioritised to one or more storage levels of the plurality of vertically stacked storage levels, allows the system to choose which of the carriages in the out-bound area are to be loaded on one or more platforms of the multi-level vertical loop conveyor depending on one or more attributes of the items in the one or more carriages or the time the one or more carriages are waiting in the out-bound area. For example, the control system can be configured to control the movement of the drive member so that the one or more of the plurality of platforms are moved to one or more storage levels where one or more one or more carriages are waiting in the out-bound area and to prioritise those carriages that have been waiting the longest. The waiting time can be overridden depending on a particular attribute of one or more items held in the one or more of the carriages in at least one out-bound area. These could include the temperature of one or more items in the carriages. For example, frozen items may take preference over non-frozen items in the at least one out-bound area.

There are two examples by which the plurality of platforms are configured to move around the continuous vertical loop. In the first example of the present invention, the plurality of platforms of the multi-level vertical loop conveyor is fixedly coupled to the drive member such that the orientation of each of the plurality of platforms changes as the direction of the drive member changes when moving around the continuous vertical loop. Thus, opposing faces of each of the plurality of platforms are orientated for accepting one or more of the plurality carriages. By being fixedly coupled to the drive member in the sense that each of the plurality of platforms do not move relative to the drive member, each of the plurality of platforms is configured to rotate through a vertical plane as the plurality of platforms travels across the uppermost and the lowermost portion of the multi-level loop conveyor. Such a configuration allows both opposing faces of the plurality of platforms to be used to load one or more of the plurality of carriages. One face of the plurality of platforms can be used to support one or more carriages when travelling upwardly in a first orientation of the plurality of platforms and the opposing face of the plurality of platforms can be used to support one or more carriages when travelling downwardly in a second orientation of the plurality of platforms. In other words, the drive member of the multi-level vertical loop conveyor is configured to flip each of the plurality of platforms as they pass over the uppermost and the lowermost portions of the multi-level conveyor. Each of the plurality of platforms can be cantilevered to the drive member. This allows the plurality of platforms to flip around the uppermost portion and the lowermost portion of the multi-level loop conveyor as the plurality of platforms are being driven around the continuous vertical loop. However, the problem with the approach of changing the orientation of the plurality of platforms when travelling around the continuous vertical loop is that one or more carriages cannot remain on the multi-level loop conveyor as the plurality of platforms travels around the uppermost and lowermost portions of the continuous vertical loop since the plurality of platforms flip at the uppermost and lowermost portion of the continuous vertical loop.

In another example of the present invention of the multi-level vertical loop conveyor, the plurality of platforms of the multi-level loop conveyor is movably coupled to the drive member such that each of the plurality of platforms remains substantially horizontal as the direction of the drive member changes when being driven around the continuous vertical loop, e.g. from an upward direction to a downward direction. In this configuration of the coupling between the plurality of platforms and the drive member, the plurality of platforms is configured to rotate about a horizontal axis extending through the coupling with the drive member so as to keep the orientation of the plurality of platform substantially horizontal as they travel around the uppermost and lowermost portion of the multi-level loop conveyor. Preferably, the guide member comprises orientation means for maintaining each of the plurality of platforms in a substantially horizontal orientation at an uppermost and lowermost portion of the multi-level vertical loop conveyor. More preferably, the orientation means comprises at least two guide paths at the uppermost and lowermost portion of the multi-level vertical loop conveyor, the at least two guide paths are in cooperation with at least two guide pins coupled to each of the plurality of platforms so as to prevent rotation of each of the plurality of platforms. As a result, one or more of the plurality of carriages can remain on the multi-level loop conveyor as the plurality of platforms travels across the uppermost and/or the lowermost portion of the multi-level vertical loop conveyor. This provides the advantage of controlling or coordinating the sequence or order of one or more carriages removed from the multi-level vertical loop conveyor as one or more carriages can be left on the multi-level vertical loop conveyor for a longer period of time without the problem of the one or more carriages falling off the platforms as with the earlier examples of the multi-level conveyor.

To provide support to the plurality of platforms for carrying one or more carriages, the guide member can be configured so that preferably, each of the plurality of platforms is supported by at least three points of contact by the guide member, more preferably, supported on all four corners of the platform.

Preferably, at least one of the plurality of platforms is configured to interface with each of the plurality of vertically stacked storage levels when the at least one of the plurality of platforms is at a level corresponding to the level of anyone of the plurality of vertically stacked storage levels so as to provide a path for at least one of the plurality of autonomous transport vehicles to travel between the at least one of the plurality of platforms and the in-bound and/or out-bound area of the storage area. More preferably, the interface between the at least one of the plurality of platforms and anyone of the plurality of vertically stacked storage levels comprises a moveable flap. For example, the path between the at least one of the plurality of platforms and anyone of the plurality of vertically stacked storage levels can be a continuous transport surface to allow the wheels of an autonomous transport vehicle to easily travel onto or off the at least one platform. The problem with disposing a movable flap between the at least one of the platforms and the plurality of vertically stacked storage levels is the wear and tear of the moveable flap resulting in the need to replace a worn moveable flap. Ideally, each of the plurality of platforms is sized so that each of the plurality of platforms is configured to provide a gap with anyone of the plurality of vertically stack storage levels in the in-bound or out-bound area of the storage area so as to allow at least one of the plurality of autonomous transport vehicles to travel onto or off the at least one platform. Here, the gap between the at least one of the plurality of platforms and anyone of the plurality of vertically stacked storage levels is small enough for an autonomous transport vehicle to easily mount onto and off the plurality of platforms when at least one of the plurality of platforms is at a level corresponding to the level of anyone of the plurality of vertically stacked storage levels. This allows the multi-level vertical loop conveyor to move an autonomous transport vehicle between different levels of the plurality of vertically stacked storage levels. To assist with the moving of the autonomous transport vehicle between the different levels of the vertically stacked storage levels, optionally, each of the plurality of platforms of the multi-level vertical loop conveyor comprises a continuous transport or ride surface for an autonomous transport vehicle to ride onto and off each of the plurality of platforms. Moving one or more of the autonomous transport vehicles between the different levels of the plurality of vertically stacked storage levels has the advantage of controlling the distribution of the plurality of autonomous transport vehicles between the different levels of the vertical stacked storage levels depending on the popularity or frequency of requested items stored at the different levels. For example, more autonomous transport vehicles can be assigned to one or more levels of the vertically stacked storage levels where the frequently requested items are stored. This could, for example, be at the lower levels of the vertically stacked storage levels so as to enable them to be accessed relatively quickly than the items stored at the upper levels.

To contain one or more of the plurality of carriages and/or the autonomous vehicle on the platform when it is travelling vertically in an upward or downward direction, preferably, each of the plurality of platforms comprises a safety barrier to prevent one or more of the carriages placed on a platform from falling off the platform.

To control the loading and unloading of the multi-level vertical loop conveyor, preferably the multi-level vertical loop conveyor comprises a traffic light system for controlling entry and/or exit of one or more of the plurality of carriages into and/or out of the multi-level vertical loop conveyor, said traffic light system comprising at least one sensor for sensing the presence of at least one autonomous transport vehicle and/or the presence of at least one of the plurality of carriages. For example, a sensor in the outbound area and/or in-bound area of the storage area can send a signal to the one or more of the plurality of autonomous transport vehicles or the control system to instruct the one or more of the plurality of autonomous transport vehicles to enter or exit of the multi-level vertical loop conveyor. More preferably, the traffic light system comprises a physical barrier moveable from a first position to prevent entry onto at least one of the plurality of platforms of the multi-level vertical loop conveyor to a second position to permit entry onto the at least one of the plurality of platforms of the multi-level vertical loop conveyor.

The storage area is an area for the storage of inventory and for the movement of inventory to and from the storage area which are distributed over many levels of the vertically stacked storage levels. Preferably, the storage area comprises predetermined parking areas for the storage of the plurality of carriages and predetermined paths for the movement of the plurality of the autonomous transport vehicles within the storage area. The predetermined paths allows one or more of the plurality of carriages to be moved to the multi-level vertical loop conveyor where it is substantially placed on a platform for exiting the storage area, i.e. to a pick station. Similarly, one or more of the plurality of carriages can be received from the multi-level vertical loop conveyor and parked in the predetermined parking area where it is stored for subsequent retrieval. Preferably, the predetermined parking area is arranged either side of the predetermined transport area. For example, the transport area can be a highway for the movement of one or more of the plurality of autonomous transport vehicles through the storage area.

Preferably, the automated storage and retrieval system further comprises:

i) a pick station for transfer of one or more items into the one or more carriages;

ii) a decant station for removing the one or more items from the one or more carriages; and iii) a transfer deck disposed between either the pick station or the decant station and the multi-level vertical loop conveyor for one or more of the plurality of autonomous transport vehicles to move one or more carriages between the pick station or decant station and the multi-level vertical loop conveyor.

From the storage area, one or more of the plurality of carriages are transported via the multi-level conveyor to the pick station where items stored in the one or more carriages are picked. Similarly, one or more items are placed in one or more of the plurality of carriages at the decant station where they are subsequently transported to the storage area via the multi-level conveyor to replenish the stock in the storage area.

BRIEF DESCRIPTION OF THE DRAWINGS

Further features and aspects of the present invention will be apparent from the following detailed description of an illustrative embodiment made with reference to the drawings, in which:

FIG. 5b is an expanded perspective view of the multi-level vertical loop conveyor shown in FIG. 5a.

FIG. 5c is an illustration of the drive member comprising a sprocket at the curved portions of the multi-level vertical loop conveyor shown in FIG. 5a.

FIG. 6b is an expanded view of the multi-level vertical loop conveyor shown in FIG. 6a.

FIG. 7b is an expanded view of the multi-level vertical loop conveyor shown in FIG. 7a.

DETAILED DESCRIPTION

Figure 1:
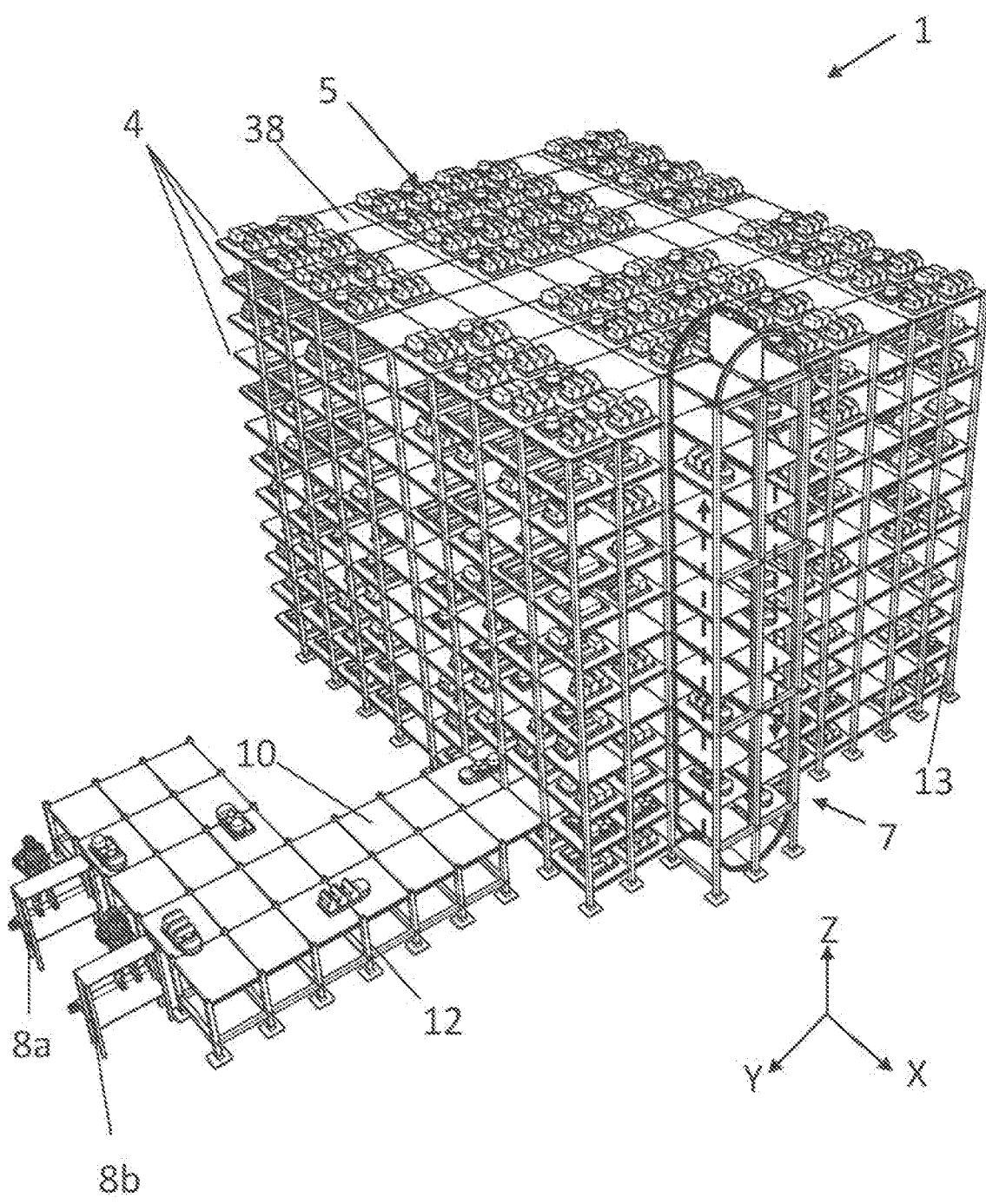
FIG. 1 is an illustration of an automated storage and retrieval system according to an exemplary embodiment of the present invention.

FIG. 1 is an illustration of an automated storage and retrieval system 1 according to an embodiment of the present invention. The automated storage and retrieval system 1 comprises a plurality of vertically stacked storage levels 4 (otherwise known as a rack) and represents an inventory storage area. Inventory 5 includes grocery items such as food items but is not limited to grocery items and can include non-grocery items. The inventory items can be stored in separate storage containers or the inventory items can be the storage containers themselves. One or more of the storage containers are moved around the storage area by one or more autonomous transport vehicles. The storage area provides a storage surface for the movement of the autonomous transport vehicles around the storage area. For example, the one or more storage containers can be loaded onto carriages and the carriages are moved by the one or more autonomous transport vehicles around the storage area. For the purpose of the present invention, the carriage represents a payload that is moved by the autonomous transport vehicle. Examples of autonomous transport vehicles include but are not limited to an AGV (Automated Guided Vehicle) or an AMR (Autonomous Mobile Robots).

One or more carriages are moved between the storage levels 4 by a multi-level vertical loop conveyor 7 comprising a plurality of platforms that are driven around a continuous vertical loop by a drive member. Further detail of the multi-level vertical loop conveyor 7 and its cooperation with the vertically stacked storage levels 4 is discussed below.

Also shown in FIG. 1 is a pick station or out-feed station 8(*a* and *b*) for picking one or more items from the carriages delivered by the autonomous transport vehicles. The pick station 8(*a* and *b*) can double up as a decant station or in-feed station for replenishing stock in the inventory. In operation, the one or more autonomous transport vehicles are instructed by a control system to transport one or more carriages carrying items to fulfil a customer's order to the pick station 8 (a and b) where they can be picked either manually or by a robotic picking device, e.g. robotic arm, from the carriage. Equally, goods entering the storage area are deposited into one or more carriages at a decant station 8 (a and b), either manually or by robotic means and transported to the storage area for storage until one or more items stored in the carriages are required to fulfil a customer order. One or more items can be spatially arranged on each of the carriages so as to permit a robotic device to easily scan the profile of the items in the carriage without interruption of nearby items and thereby, is able to identify the items in the carriage. This helps with the automation of the picking or placing of items into or from the carriage. Disposed between the vertically stacked storage levels and the pick/decant station 8(*a* and *b*) is a transfer area or transfer station 10 comprising a raised platform for the movement of the one or more autonomous transport vehicles between the pick/decant station 8 and the vertically stacked storage levels 4. The raised platform extends between pick/decant station 8(*a* and *b*) and a level of the vertically stacked storage levels 4 so that an autonomous transport vehicle can traverse between the pick/decant station 8(*a* and *b*) and the level of the vertically stacked storage levels via the transfer area 10. In the particular embodiment shown in FIG. 1, the transfer area 10 is raised above the ground by vertical uprights 12 so as to be at the same level as the pick/decant station 8 (a and b). The pick/decant station is at a convenient height for an operative to pick/decant one or more items into or from the one or more carriages transported by the autonomous transport vehicles. Whilst the particular embodiment in FIG. 1 show the pick/decant stations 8(*a* and *b*) at one level 4 of the vertically stacked storage levels, the pick/decant station can be distributed at multiple levels of the vertical stack storage levels.

FIG. 2(*a* to *c*) shows the different examples of carriages 6 and/or autonomous transport vehicles for moving the one or more storage items around the storage area. In all of the examples shown in FIG. 2(*a* to *c*), the carriages do not drive themselves but are moved by the autonomous transport vehicles 14 which are instructed to move on the storage surface to a desired destination in the storage area. The carriages 6 can be fabricated from low cost or sustainable materials, e.g. as wood or recycled materials such as plastic. In the first example, shown in FIG. 2*a*, the carriage 16 functions as a trailer for carrying the payload and the autonomous transport vehicle 14 functions as a tractor which is configured to removably couple with the trailer and either push or pull the trailer on the storage surface to a desired destination. The tractor 14 is configured to couple with the trailer such that one end of the trailer 16 is configured to couple with the tractor 14 and the other end of the trailer 16 comprises a wheel assembly 18 to allow the trailer to roll on the storage surface. The autonomous transport vehicle 14 has three wheels 15 sufficient to move the autonomous transport vehicle on the storage surface. The coupling involves lifting a front end of the trailer without the wheel assembly clear of the storage surface so allowing the wheel assembly mounted to the rear end of the trailer to roll on the storage surface—much like a tractor and trailer configuration. The coupling can comprise a pin, hook, or other latching means that is able to latch onto the tractor and be driven by the tractor. The coupling can also incorporate a lifting mechanism to lift the front end of the trailer when coupled to the trailer. For example, the coupling between the tractor and the trailer can be based on the teaching in the art US2012/0259482 (Klaus Jeschke) where the coupling comprises a pivotable coupling pinion that lifts the end of the trailer. Other means to couple with the trailer and lift the trailer is applicable in the present invention. For example, the use of a pivotable hook that interfaces with the trailer. One or more sensors, e.g. proximity sensors, can be mounted to the autonomous transport vehicle to provide an indication of the coupling between the tractor and the trailer.

Figure 2A:
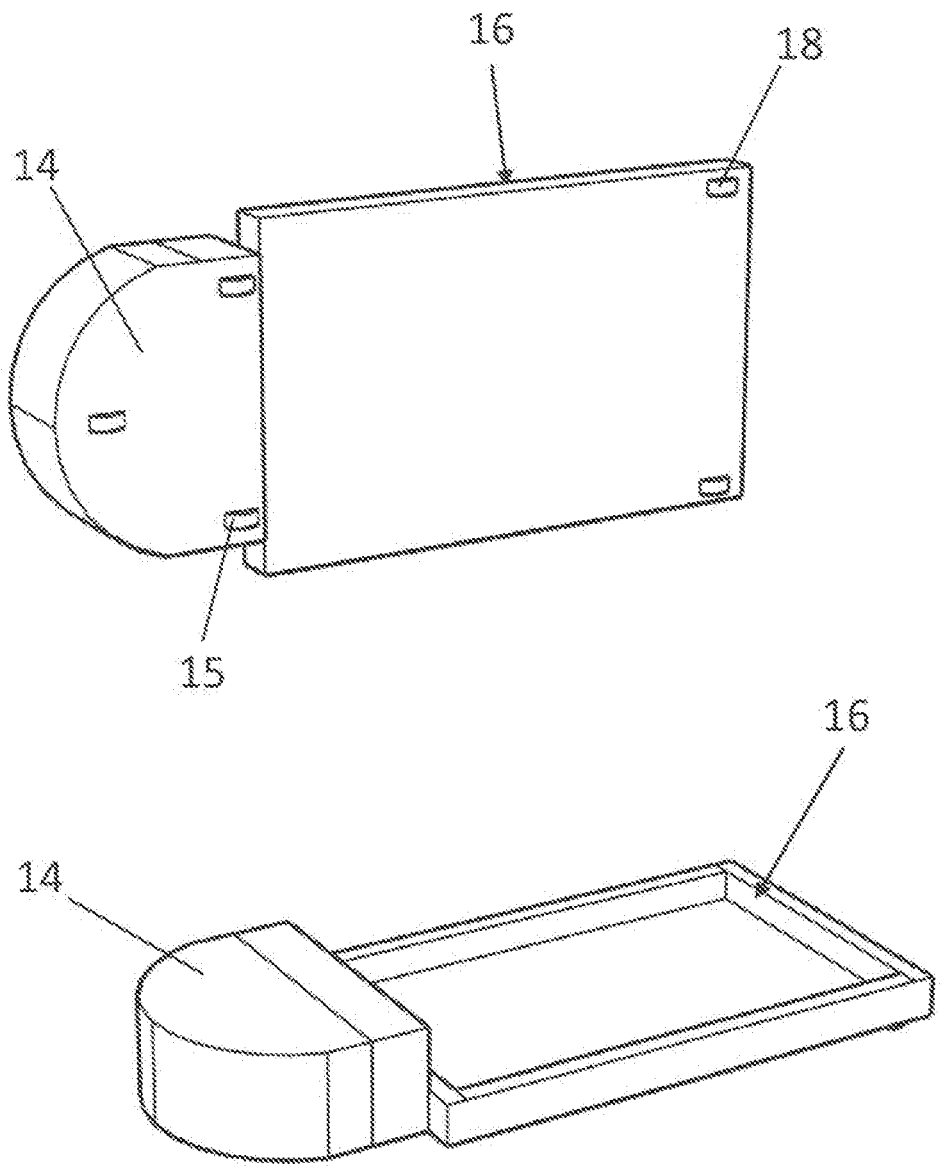
FIG. 2a is an illustration of an autonomous transport vehicle and carriage according to a first exemplary embodiment of the present invention.
Figure 2B:
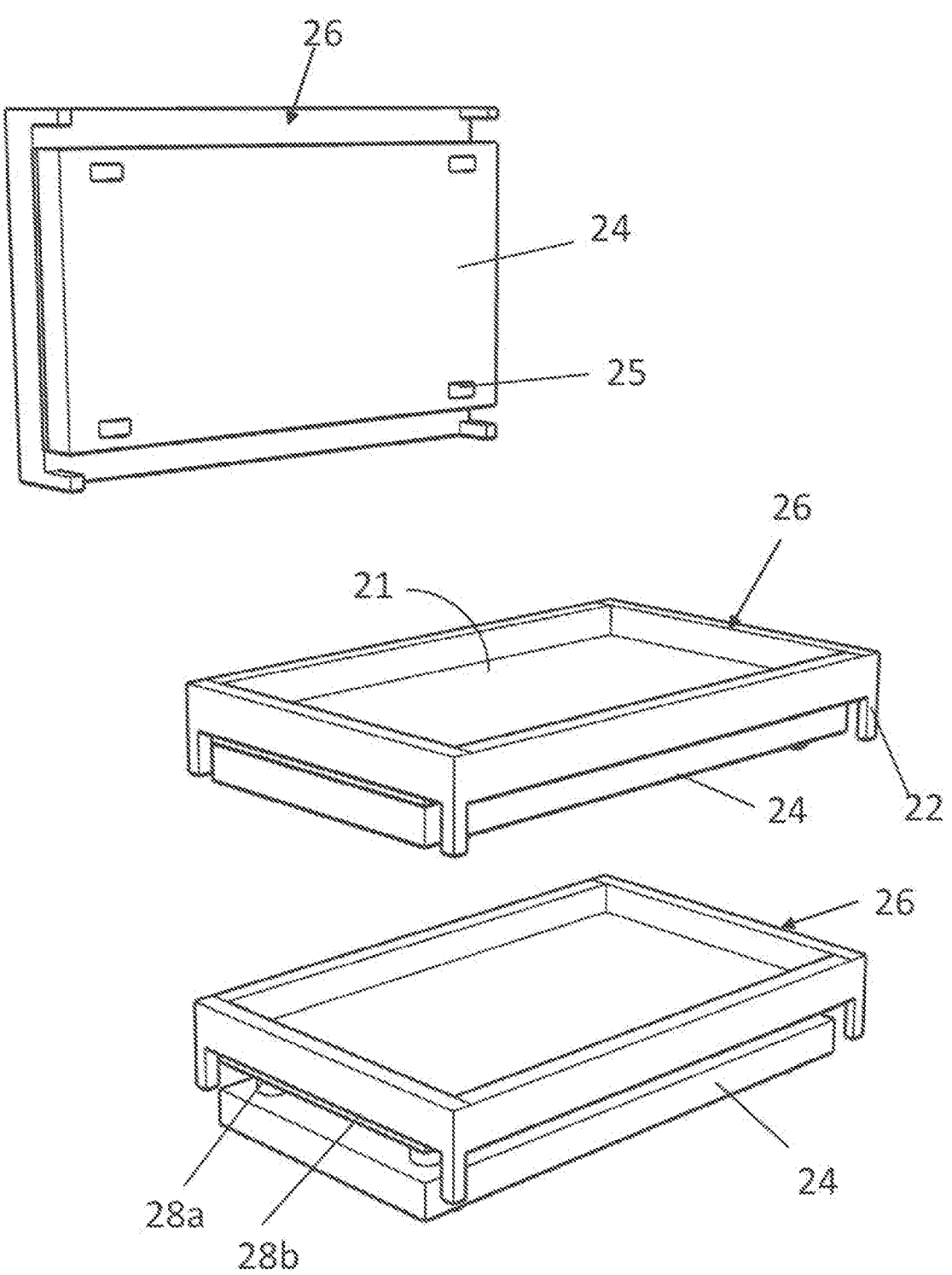
FIG. 2b is an illustration of an autonomous transport vehicle and carriage according to a second exemplary embodiment of the present invention.

In a second example of the carriage shown in FIG. 2b, the carriage 26 comprises a support surface 21 mounted on legs 22 for supporting a payload. The legs raise the supporting surface 21 above the storage surface. The elevation above the storage surface provides a space sufficient for an autonomous transport vehicle 24 to move underneath the support surface 21 and subsequently lift the carriage 26 such that the legs 22 of the carriage 26 are lifted clear off the storage surface. Unlike the embodiment of the autonomous transport vehicle shown in FIG. 2a, the autonomous transport vehicle 24 in the embodiment shown in FIG. 2b comprises four wheels 25 for moving the autonomous transport vehicle on the storage surface. This allows the autonomous transport vehicle 24 to move under the carriage 26 and lift the carriage clear of the storage surface. The autonomous transport vehicle 24 is provided with a lifting mechanism 28a to raise the height of the autonomous transport vehicle 24 once under the support surface of the carriage 26. As shown in FIG. 2b, the lifting mechanism comprises a moveable platform 28b mounted to one or more linear actuators 28a to raise the platform 28 when the autonomous transport vehicle 24 is underneath the carriage 26. Alternatively, the lifting mechanism can raise the wheel assembly relative to the body of the autonomous vehicle so causing the height of the autonomous transport vehicle to be increased. For example, some or all of the wheels of the wheel assembly can be pivotably mounted to a body of the autonomous transport vehicle. In both cases, the height of the autonomous transport vehicle can be increased to raise a carriage on top of the autonomous. The number of wheels of the assembly is not limited to four wheels and can comprise any number of wheels to allow the autonomous transport vehicle to move along the support surface.

Figure 2C:
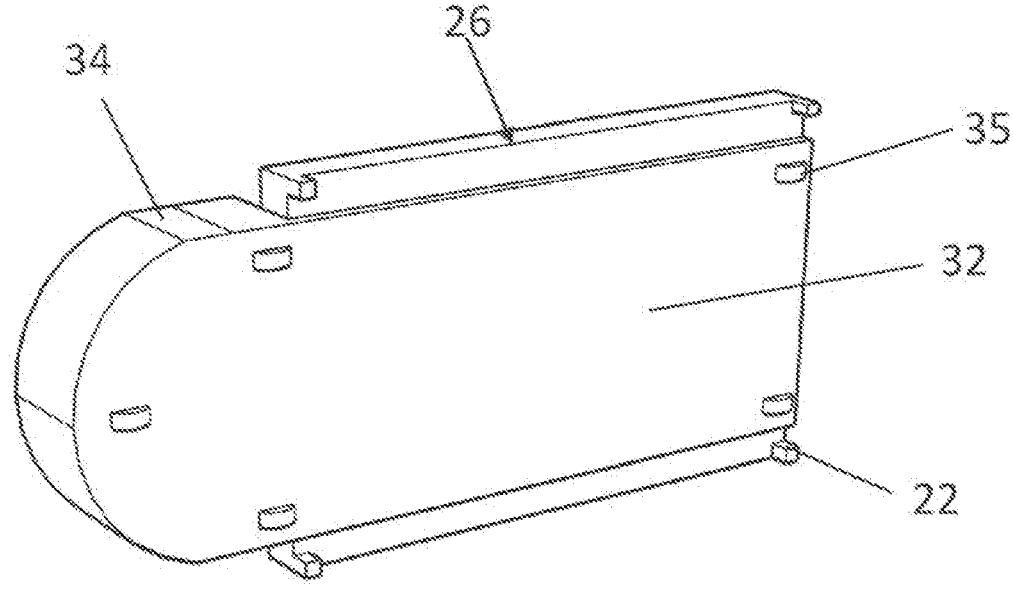
FIG. 2c is an illustration of an autonomous transport vehicle and carriage according to a third exemplary embodiment of the present invention.
Figure 2C:
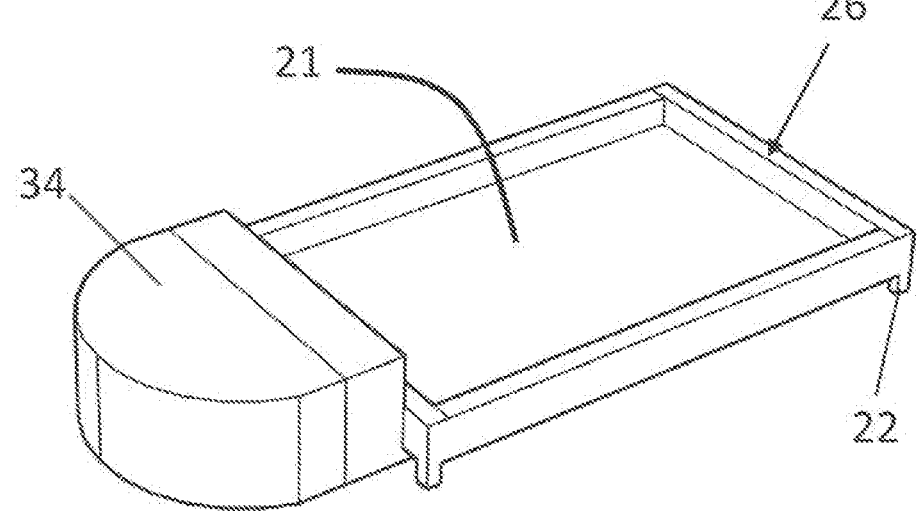

Instead of the autonomous transport vehicle itself moving under the carriage as shown in FIG. 2b, the autonomous transport vehicle 34 itself can comprise a trailer 32 that is shaped to fit under the carriage 26 and carry the carriage 26 on the trailer 32 as shown in FIG. 2c. As a result, the wheel assembly of the autonomous transport vehicle 34 is a combination of the wheel assembly of the first embodiment shown in FIG. 2a and the second embodiment shown in FIG. 2b. In the particular embodiment shown in FIG. 2c, the wheel assembly of the third embodiment of the autonomous transport vehicle 34 shown in FIG. 2c comprises five wheels 35 for moving the autonomous transport vehicle 34 on the storage surface. However, the wheel assembly can comprise three wheels with at least one of the wheels being pivotably mounted to the body of the autonomous transport vehicle. As with the embodiment shown in FIG. 2b, the carriage 26 comprises legs 22 to raise the support surface 21 of the carriage above the storage surface and allow the trailer 32 of the autonomous transport vehicle 34 to fit under the carriage 116. The trailer 32 can comprise a lifting mechanism (not shown), e.g. linear actuator, to raise the carriage, in particular the legs of the carriage clear off the storage surface so as to enable the carriage 26 to be moved around the storage area. Other examples of carriages to move a payload around the storage area are applicable in the present invention. Once loaded onto or towed by the autonomous transport vehicle, movement of the autonomous transport vehicles to and from a pick station or decant station or around the storage area is coordinated or controlled by a control system running an inventory management software. Further detail of coordinating the movement of one or more carriages to and from the pick station/decant station and around the storage area by autonomous transport vehicles is discussed below.

The vertically stacked storage levels provides a 3-dimensional array of storage levels or floors that are a vertically spaced apart by being mounted to a plurality of vertical uprights. The spacing between the storage levels are such so as to allow the autonomous transport vehicles and carriages to travel between the storage levels. Since the height of the autonomous transports vehicles and the carriages can be short, this has the advantage that the height of the vertically stacked storage levels can be made much smaller than known automated storage and retrieval system in which stacks of bins or containers are arranged within a grid framework structure as taught in PCT Publication No. WO2015/185628A (Ocado). Moreover, due to the smaller spacing between the storage levels a greater density of storage levels can be accommodated within a given height of the vertically stacked storage levels.

In the particular embodiment shown in FIG. 1, each floor or storage level 4 comprises an assembly of floor panels 37 lying in a substantially horizontal plane. The floors are stacked vertically and spaced apart one on top of the other by being support to a plurality of vertical uprights 13 to form a storage rack. Each of the plurality of vertical uprights 13 are arranged at each corner of the floor panel such that the plurality of vertical uprights are distributed both externally and internally of the vertically stacked storage levels. Multiple floor panels 37 are arranged at each level of the vertically stacked storage level such that each floor panel shares one or more of the vertical uprights. Whilst the particular embodiment shown in FIG. 1 shows multiple vertical uprights 13 being distributed both externally around the outer periphery of the storage levels and internally within the storage levels, fewer vertical uprights for supporting the storage levels 4 in a vertically spaced apart arrangement is applicable in the present invention. One or more bracing members or trusses (not shown) can be used to improve the structural integrity of the vertically stacked storage levels 4 to support a plurality of carriages carrying one or more storage containers at the different storage levels. Also not shown is that the feet of the one or more of the vertical uprights can be made adjustable to adjust the height and thus, level of the vertically stacked storage levels. The vertically stacked storage levels 4 provides a storage area for the storage of the inventory in a densely packed arrangement. As discussed above, one or more storage containers representing a payload are stored in one or more carriages. The storage area is distributed over the plurality of vertically stacked storage levels 4 such that each level of the vertically stacked storage level represents a portion of the storage area. The size of the storage area is dependent on the height and thus, number of storage levels. For example, the storage area can be increased by increasing the density of storage levels and/or the surface area of the storage area for a given height of the vertically stacked storage level.

Figure 3:
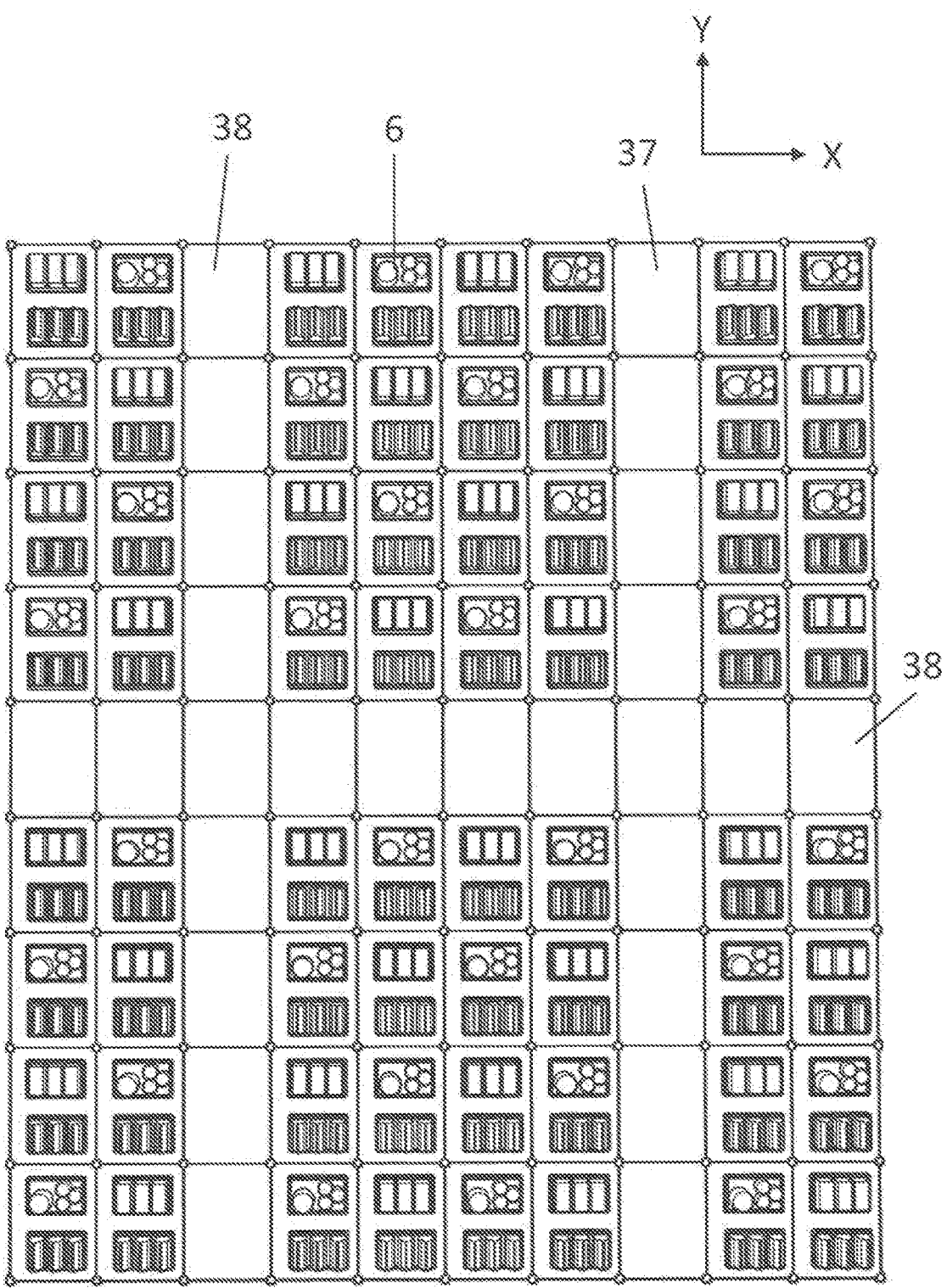
FIG. 3 is an illustration of a top plan view of a storage level of the vertical stacked storage levels according to an exemplary embodiment of the present invention.

Also shown in FIG. 1, are one or more pathways 38 at each of the vertically stacked storage levels 4 to allow the pick up and/or drop off of one or more carriages 6 by autonomous transport vehicles as well as transporting the one or more carriages 6 around the storage area. At each floor level in 2-dimensions as shown in FIG. 3, the carriages 6 are arranged in rows designated by an X coordinate and columns designated by a Y coordinate. Multiple carriages are stored at different floor levels to provide a 3-dimensional array of storage levels, each floor level designated by a Z-coordinate. One or more pathways 38 are arranged in the storage area between the rows and/or columns at each floor level to permit an autonomous transport vehicle to couple onto any carriage in the storage area and move the carriage around the storage area and/or to the different floor levels via a suitable lift mechanism to a desired destination.

Figure 4A:
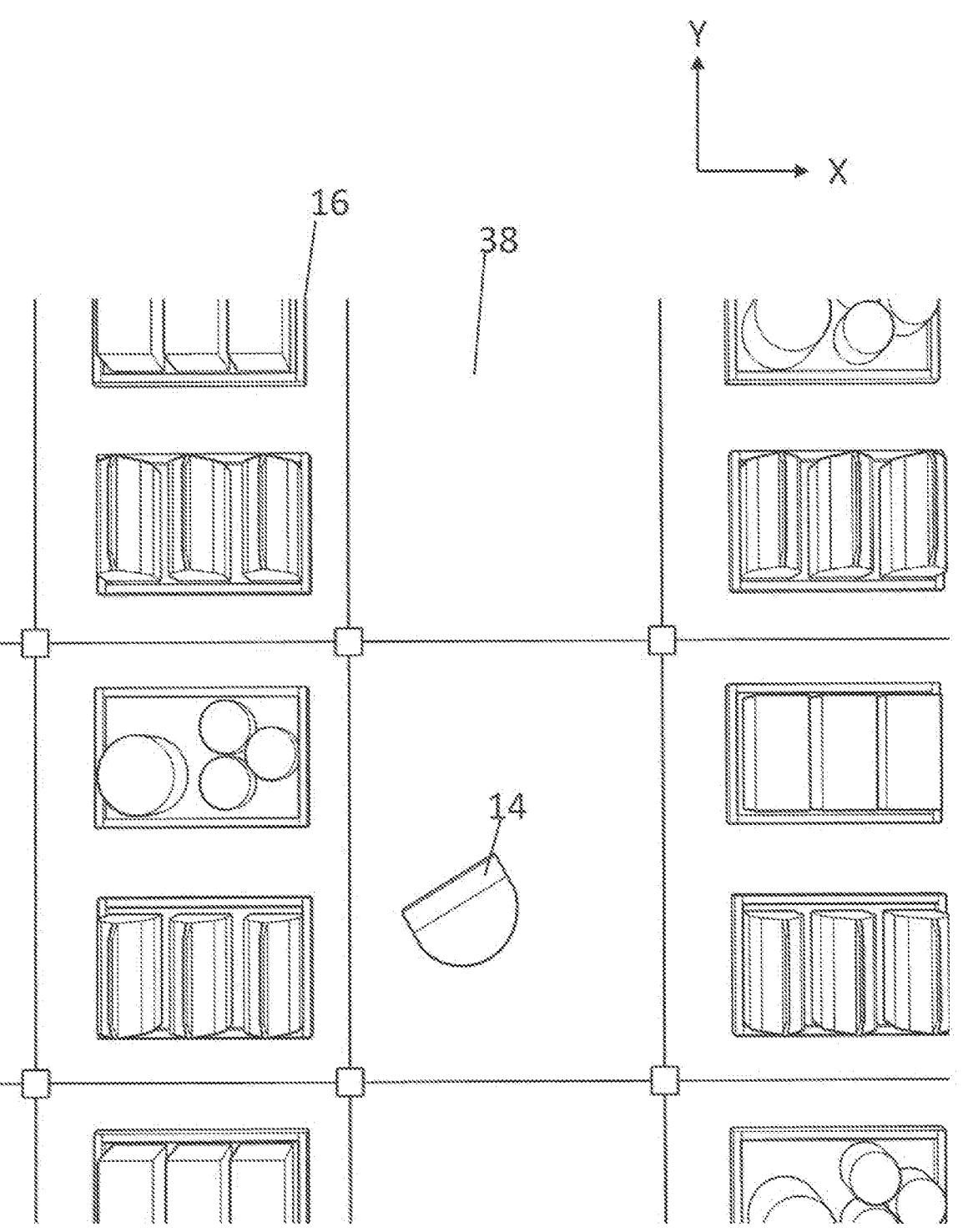
FIGS. 4a-4c are an illustration of the movement of a carriage from its parking space by the autonomous transport vehicle according to an exemplary embodiment of the present invention.
Figure 4B:
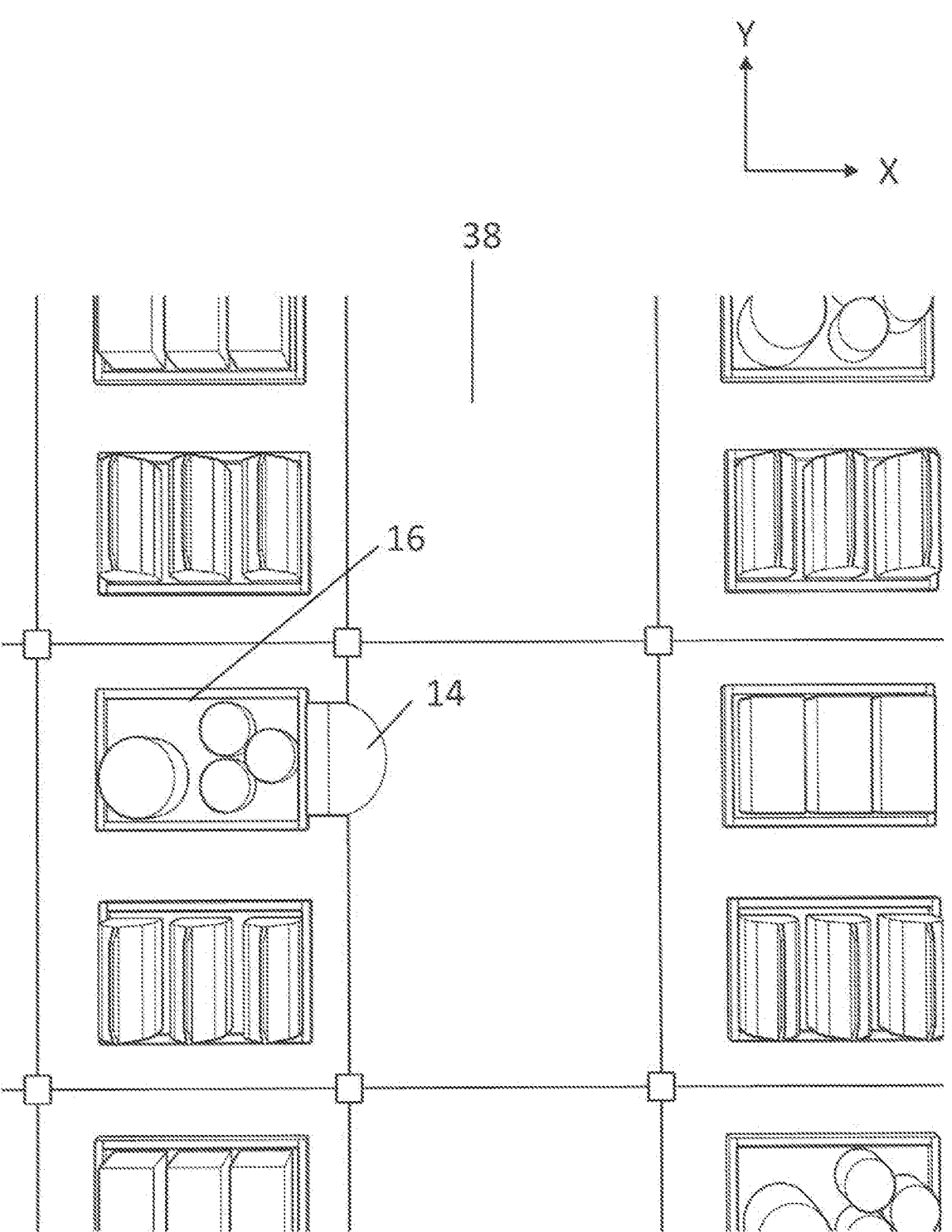
Figure 4C:
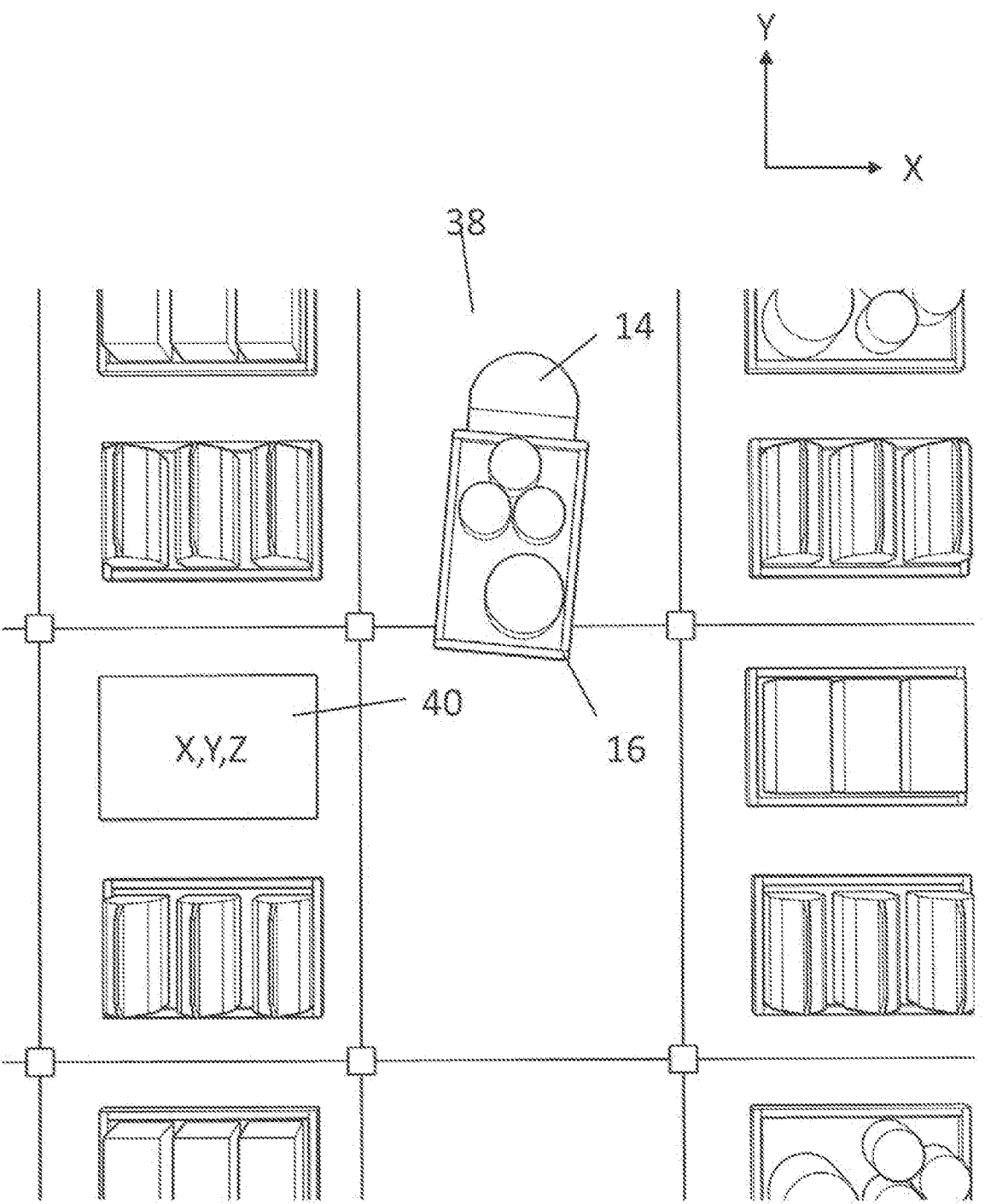

FIGS. 4(a to c) shows an example where an autonomous transport vehicle 14 couples onto a carriage 6 and moves it out of its parking space 40 (see FIG. 4c) in the storage area. In a first manoeuvre, the autonomous transport vehicle 14 instructed by the control system travels along an alleyway 38 between rows of carriages until it locates a desired carriage 6 where upon the autonomous transport vehicle 14 manoeuvres itself so that it can couple onto the located carriage 6 as shown in FIG. 4b. Various coupling mechanisms can be used to couple with the carriage including but not limited to the coupling discussed above with reference to FIGS. 2(a to c). One or more sensors, e.g. proximity sensors can be used to actuate the coupling between the autonomous transport vehicle 14 and the carriage 6. Once coupled to the carriage 6 as determined by the one or more sensors on the autonomous transport vehicle 14, the autonomous transport vehicle 14 can then make its way to the multi-level vertical loop conveyor by travelling along the alleyway 38 as shown in FIG. 4c. The retrieved carriage 6 from the storage level leaves an empty parking space 40 in the storage area having a specific designated position as determined by the coordinates XYZ.

Navigation of the one or more autonomous transport vehicles to a desired destination in the storage area is provided by a navigation system. The navigation system according to an exemplary embodiment of the present invention comprises a plurality of markers (not shown) that are distributed at different positions throughout the storage area and one or more sensors or readers for sensing the markers. For example, the markers cover at least a portion of the storage surface, in particular around the one or more pathways 38 leading to the carriages 6 in the rows/columns at each floor level. One or more sensors built into the autonomous transport vehicles are able to guide or navigate the autonomous transport vehicle along a predetermined path in the storage area by recognising and/or responding to the markers. The makers are strategically located in the storage area so that one or more autonomous transport vehicles guided by the markers can move one or more carriages around the storage area to and from a drop off area or retrieval area or another desired location. Another desired location can be a pick station or a decant station depending on whether the autonomous transport vehicle is instructed to retrieve a carriage to fulfil a customer order or return a carriage to replenish stock. The one or more makers can be based on an optical maker, e.g. barcode, QR code etc. or simply a marker recognisable by a sensor, e.g. RFID tag. The pattern of makers can be arranged into a series of black and white squares or "dots" that are sensed by the one or more sensors mounted to the autonomous transport vehicle, in particular to the underneath of the autonomous transport vehicle. The one or more makers can include information pertaining to the location of the marker in the storage area so that an autonomous transport vehicle travelling over the markers can determine its location in the storage area. Other information stored in the markers may include the presence of any obstacles present in the storage area so that the autonomous transport vehicle can be aware to avoid such obstacles, e.g. the vertical uprights discussed above. The relationship between the one or more markers and the autonomous transport vehicles can be based on the teaching in US2012/0259482 (Klaus Jeschke), the content of which are incorporated herein by reference.

The autonomous transport vehicle can determine its position in the storage area by sensing the markers and sending one or more signals to a control system wirelessly, e.g. over a network. The control system is typically computerised and comprises a database for monitoring and controlling the movement of one or more autonomous transport vehicles in and around the storage area. Each of the one or more autonomous transport is equipped with an on-board control and communication system comprising suitable transmission and receiving means, i.e. a transmitter and receiver, to enable transmission and reception of the one or more signals to and from the control system. The one or more autonomous transport vehicles typically communicates with the control system via wireless communication means, e.g. WLAN and/or utilising a mobile telecommunication technology such as 4G or higher. The control system is configured to control or coordinate the movement of the one or more autonomous transport vehicles to return or retrieve a carriage from the storage area such that the storage and retrieval system is able to fulfil customer orders in a timely manner. Further detail of the coordination of the one or more of the autonomous transport vehicles to retrieve and/or return carriages to a desired destination to and from the storage area is discussed below.

Figure 5A:
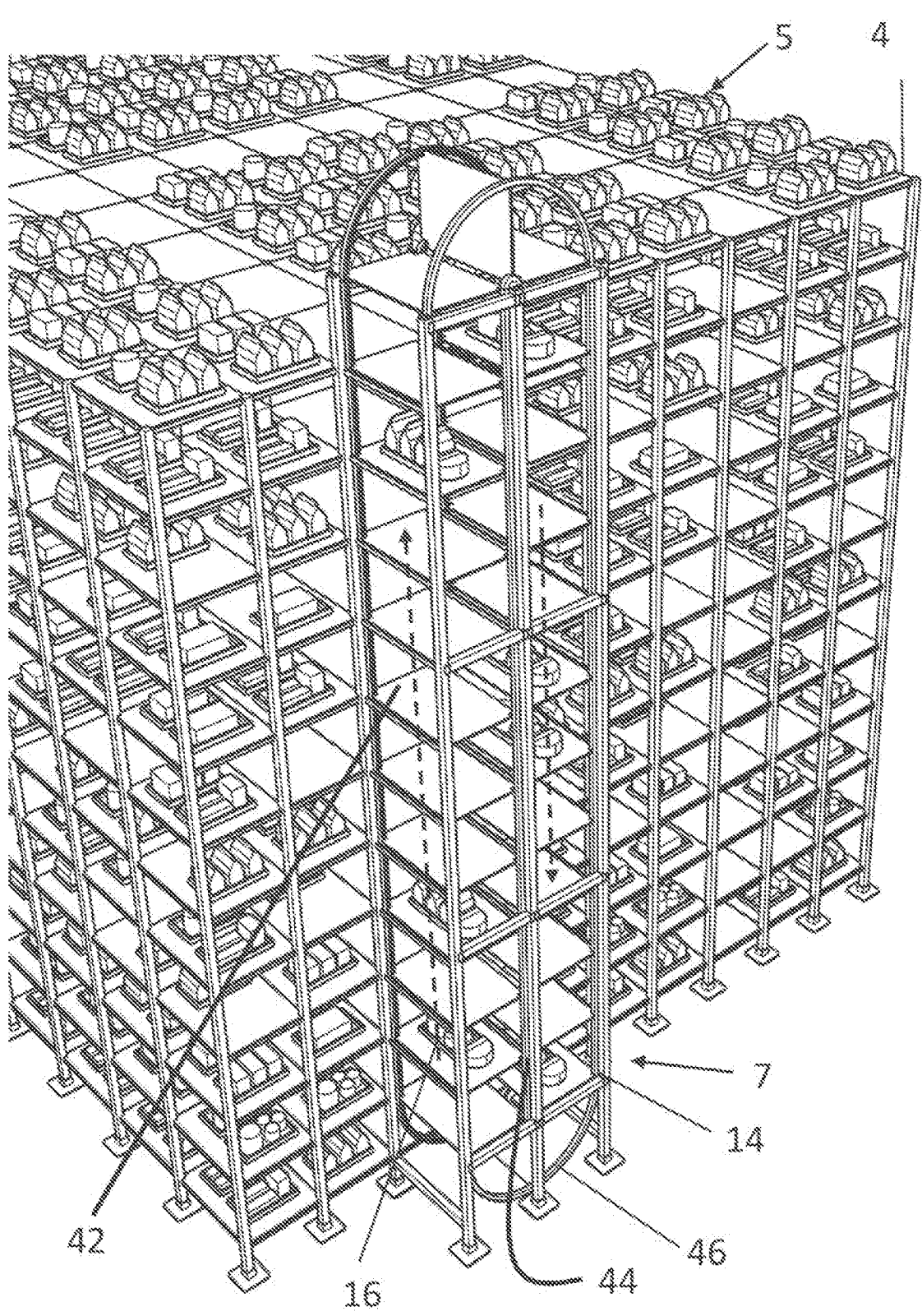
FIG. 5a is an illustration of a multi-level vertical loop conveyor adjacent a plurality of vertical stacked storage levels according to a first exemplary embodiment of the present invention.

To move the one or more of the carriages to the different storage levels of the vertically stacked storage levels, the automated storage and retrieval system further comprises a lift or elevator. In contrast to the lift discussed in the art US2012/0259482 (Klaus Jeschke), the lift or elevator according to the present invention comprises a multi-level vertical loop conveyor 7 as shown in FIGS. 1 and 5a. The problem with a single elevator for moving one or more carriages up and down the vertically stacked storage levels particularly when the storage area is distributed over many levels is that the single elevator would present a bottleneck as the one or more carriages would have to wait to be transported to a different storage level of the vertically stacked storage levels resulting in congestion of the carriages at one or more of the storage levels. Ultimately, movement of one or more carriages around the storage area would have to be interrupted for an elevator or lift to take the one or more carriages to a different storage level. This in turn reduces the throughput of the one or more carriages to and from the automated storage retrieval system which in turn increases the time taken to fulfil customer orders.

In the present invention, a multi-level vertical loop conveyor 7 is shown adjacent to the vertically stacked storage levels 4 in FIG. 1. The multi-level vertical loop conveyor 7 allows multiple carriages to be vertically accumulated and therefore, reduces the bottleneck at the different storage levels. The multi-level vertical loop conveyor 7 is used to move multiple carriages that are vertically accumulated to different storage levels substantially simultaneously. Generally, the multi-level vertical loop conveyor 7 comprises a plurality of payload platforms 42 coupled to a drive member 44, e.g. chains or belts, which are formed in a continuous or circulating vertical loop and guided by a guide member 46 to form a "paternoster" principle of conveyance, with loading and unloading performed at any point in the loop. The drive member is driven to move in a continuous vertical loop by a drive mechanism (not shown), e.g. a motor. There are various ways to move a plurality of platforms around a continuous vertical loop. Exemplary embodiments of the different types multi-level vertical loop conveyor are discussed further below.

Movement of the drive member 44 and thus, the plurality of platforms 42 is controlled or coordinated by a control system depending on the number of carriages waiting at its respective storage level. One side of the multi-level vertical loop conveyor 7 can be used to feed carriages 6 into the storage area and the other side of the multi-level vertical loop conveyor 7 can be used to retrieve one or more carriages 6 from the storage area such that carriages 6 can enter and leave the multi-level vertical loop conveyor 7 at any point along the continuous vertical loop. The movement of the platforms 42 can be controlled to coordinate the storage and retrieval of one or more carriages 6 to and from the storage area. Further detail of the control system to control the movement of the plurality of platforms 42 is discussed below. One or more items are added to the carriages at the decant station and transported to the storage area via the multi-level vertical loop conveyor 7 to replenish stock and one or more items are moved to the pick stations where the one or more items are picked from the or more carriages to fulfil one or more customer orders. The multi-level vertical loop conveyor 4 can be configured such that a first side of the conveyor, where the plurality of platforms 42 are travelling in an upward direction, is catered for feeding a payload comprising one or more carriages 6 into the storage area and a second side of the multi-level vertical loop conveyor 7, where the plurality of the platforms 42 are travelling in a downward direction, is catered for retrieving a payload transported on a carriage from the storage area. In the particular embodiment of the present invention shown in FIG. 1 and because of the arrangement of the multi-level vertical loop conveyor, the second side of the multi-level vertical loop conveyor 7 is laterally disposed of the first side. The upward and downward movement of the plurality of platforms 42 either side of the multi-level vertical loop conveyor is shown by the direction of the arrows in FIG. 1.

For example, a carriage 6 driven by an autonomous transport vehicle 14 enters the first side of the multi-level conveyor, where it is transported by a platform 42 travelling in an upward direction to a desired storage level where it can enter the storage area via an in-bound area of the storage area. Conversely, the carriage 6 carrying one or more items and driven by an autonomous transport vehicle 14 can leave the storage area at a storage level and enter the second side of the multi-level vertical loop conveyor 7 via an out-bound area. Thereupon, the carriage is transported in a downward direction to a level where it can exit the multi-level vertical loop conveyor driven by the autonomous transport vehicle to a pick station or out-feed station for retrieval of one or more items from the carriage. The in-bound area represents the area of the storage area adjacent to the multi-level vertical conveyor, in particular a platform of the multi-level vertical conveyor for the inflow or ingress of carriages into the storage area from the multi-level vertical conveyor. The out-bound area represents the area of the storage area adjacent to the multilevel vertical conveyor for the outflow of carriages from the storage area into the multi-level vertical conveyor.

Typically as shown in FIG. 1, each level of the vertical stack of storage levels comprises an in-bound area and an out-bound area. The in-bound and the out-bound areas are adjacent to each other so as to provide an uninterrupted flow of traffic into and out of the multi-level vertical loop conveyor. One or more autonomous transport vehicles 14 are instructed to wait at the out-bound area until a platform becomes available to enter into the multi-level vertical loop conveyor. Movement of the carriages into and out of the multi-level vertical loop conveyor via in-feed or the out of the out-feed station is shown by the arrows in FIG. 1. In the particular embodiment shown in FIG. 1, the platforms of the multi-level conveyor are configured to carry the autonomous transport vehicle between the different levels of the vertically stacked storage levels. As a result, each of the platforms of the multi-level conveyor has a continuous transport surface so as to allow an autonomous transport vehicle to ride onto and off the platforms as demonstrate in FIG. 1 rather than just dropping off the carriage on the platform. This allows movement of the autonomous transport vehicles between the different levels of the multi-level conveyor so that not one level of the vertically stacked storage levels is limited to a fixed number of autonomous transport vehicles. Thus, the same autonomous transport vehicle can be configured to transport the carriage to and from the storage area and the pick/decant station via the multi-level conveyor. Movement of the autonomous transport vehicles between the different levels of the multi-level conveyor provides the flexibility of distributing the stock at the different storage levels of the vertically stacked storage levels. For example, frequently requested items can be placed at the storage lower levels that are easily accessible and therefore, more autonomous transport vehicles can be assigned to the lower storage levels. The less frequently requested items can be placed at the higher levels of the vertically stacked storage levels. A traffic light system in communication with the control system can be used to coordinate the movement of traffic of carriages into and out of the multi-level vertical loop conveyor. Further detail of the traffic light system to control the in-flow and the out-flow of traffic of carriages into and out of the multi-level vertical loop conveyor is discussed below.

Multi-Level Vertical Loop Conveyor

Figure 5B:
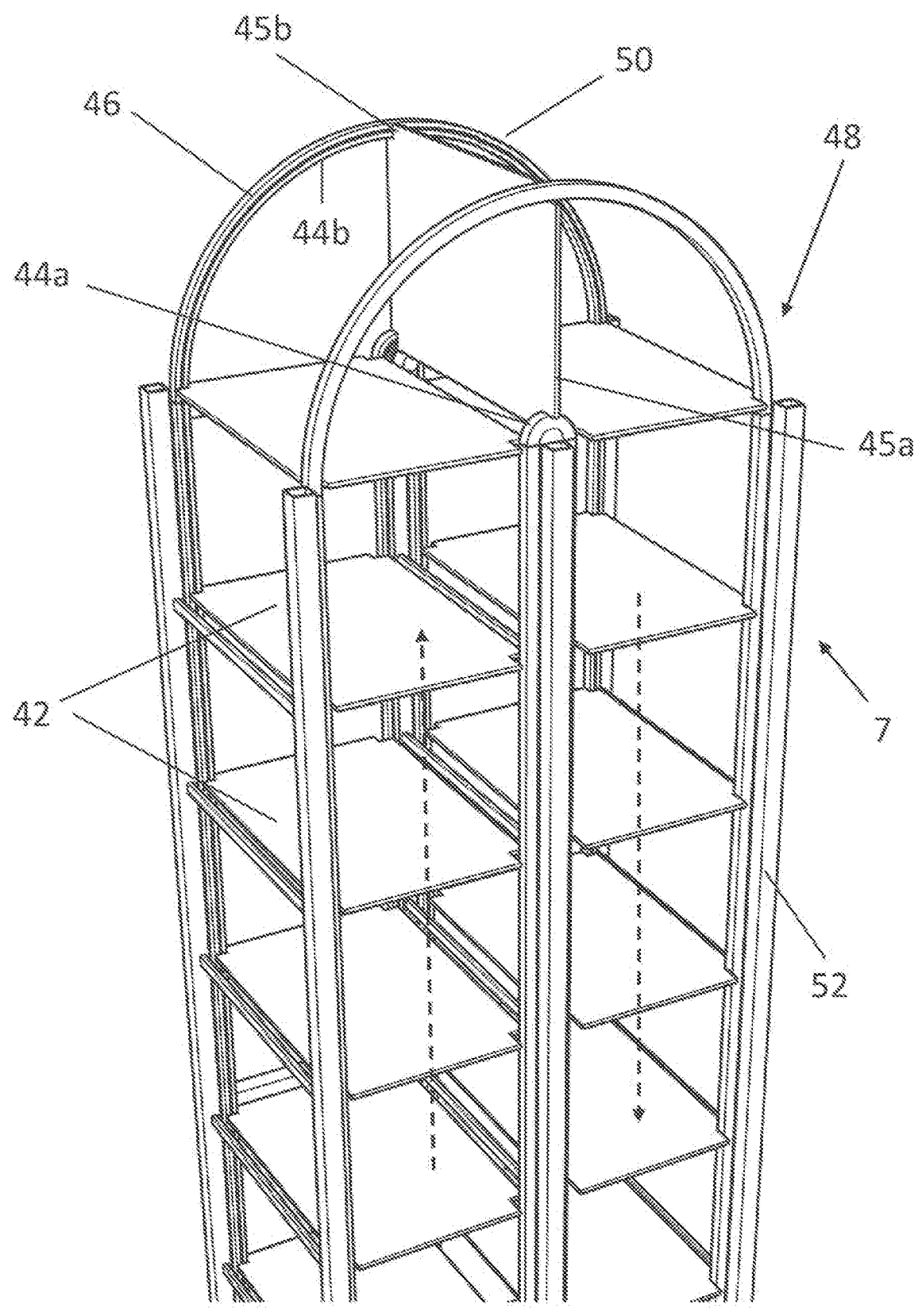
Figure 5C:
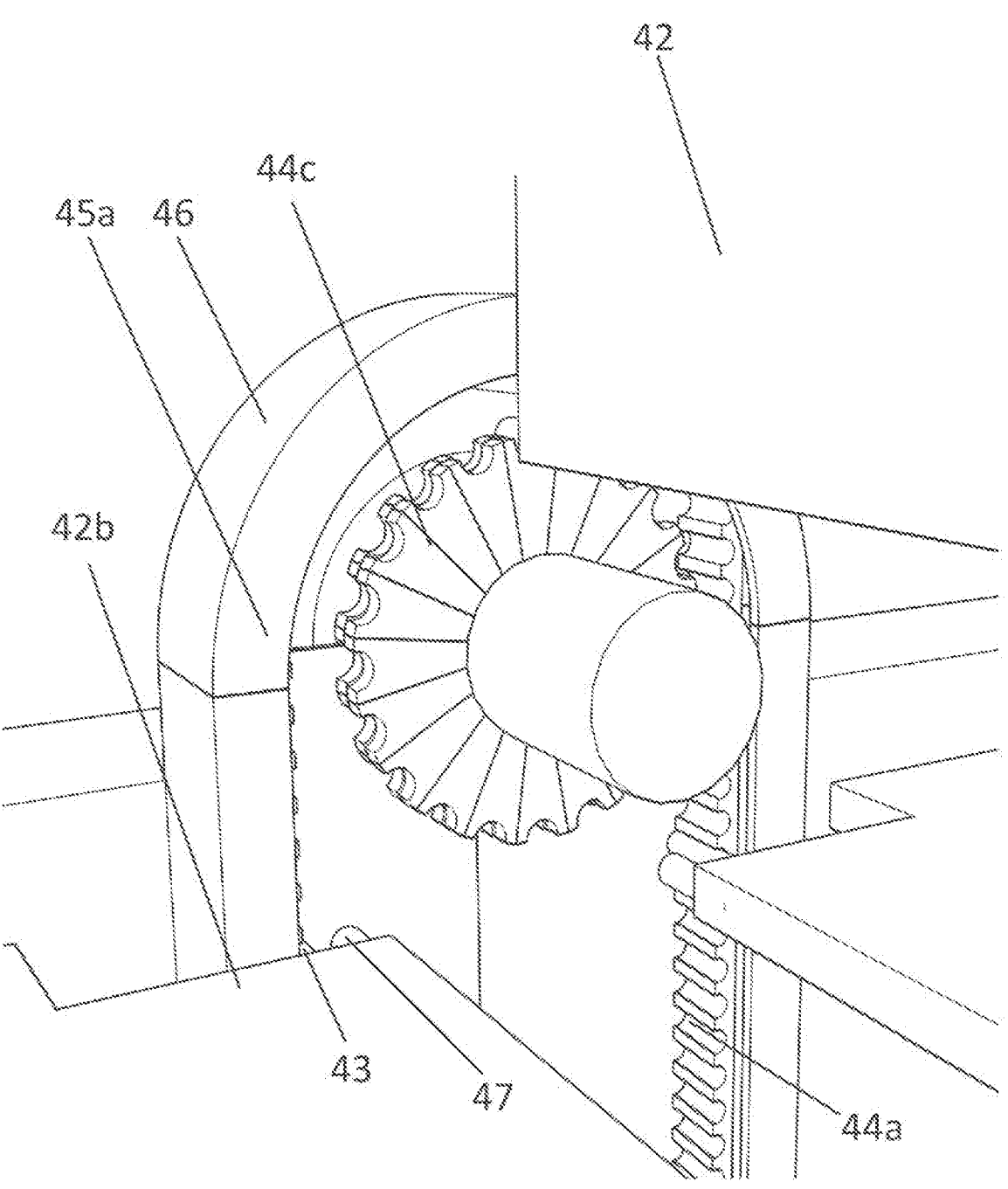

Examples of the different types of multi-level vertical loop conveyors 7 are shown in FIGS. 5(*a* and *b*), FIGS. 6(*a* and *b*) and FIGS. 7(*a* and *b*). In the first example of the multi-level vertical loop conveyor 7 shown in FIGS. 5(*a, b* and *c*), the plurality of platforms 42 are fixedly coupled to the drive member 44 such that the platforms 42 flip or change orientation when changing direction from an upward movement to a downward movement and vice-versa at the top and bottom of the multi-level conveyor. In the exemplary embodiment shown in FIG. 5*c*, the drive member additionally comprises a sprocket 49 for carrying each of the plurality of platform around the upper and lower curved portions of the multi-level vertical loop conveyor 7. The coupling between each of the plurality of platforms and the drive member are such that that there is a smooth transition of the plurality of platforms between the upward and downward movement of the platforms and around the upper and lower curved portions of the multi-level vertical loop conveyor.

In the particular embodiment shown in FIGS. 5(*a, b* and *c*), the drive member comprises an inner drive member 44*a*, and outer drive member 44*b* such that the plurality of platforms always remains in contact with the inner and outer drive member 44*a*, 44*b* in the upward and downward direction. The inner drive member 44*a* further comprises the sprocket 44*c* around the upper and lower curved portions of the multi-level vertical loop conveyor 7. The plurality of platforms are coupled to the sprocket 44*c* at their respective inner edge 45*a* such that the edge of each of the plurality of platforms 42 travel around an inner radius, r, and are coupled to the outer drive member 44*b* such that the outer edge 45*b* of each of the plurality of platforms travel around an outer radius, R. Thus, the inner edges 45*a* of each of the plurality of platforms travel around the upper and lower curved portions at a speed equivalent to $v_i = r \times \omega$ (where $v_i$=inner velocity, r=inner radius and $\omega$=angular speed) and the outer edges 45*b* of each of the plurality of platforms travel around the upper and lower curved portions at a speed equivalent to $v_o$=R×ω (where $v$=outer velocity, R=outer radius and ω=angular speed. To ensure that the plurality of platforms travel at a constant angular velocity ω, around the upper and lower curved portions of the multi-level vertical loop conveyor, the inner edge of each of the platforms are driven around the inner drive member 44a, at an angular speed, $v_i$=r/R×$v_o$. One of the ways for achieving this is to use inner and outer drive members 44a, 44b, 44c which can be continuous belts or chains for fixedly coupling to an inner and outer edge of the platforms to the drive member using connectors (pins) 43. Each corner 42b at the inner edge of each of the plurality of platforms 42 comprises sets of connectors 43, 47, e.g. pins. Each sets of pins comprises two pins, a first set of pins 43 that is setback from a second set of pins 47. In the upward and downward direction of each of the plurality of platforms 42, the first set of pins 43 at the corners of the platforms are fixedly coupled to the inner drive member 44a. At the pivot point 45a, the platforms disconnect from the inner drive member (belt) 44a and instead a second set of pins 47 connect to the sprocket 44c of the inner drive member, as is shown in detail of FIG. 5c. Rotation of the sprocket 44c drives the second set of pins 47 and thus, the platform around the curved portion of the multi-level vertical loop conveyor. The rotation of the sprocket is driven by a drive mechanism, e.g. a motor, so that there is a smooth transition of the plurality of platforms between the upward and downward movement of the platforms and around the upper and lower curved portions of the multi-level vertical loop conveyor. Once the platform has rotated to the other side, the second set of pins 47 disconnect from the sprocket 44c and the first set of connectors 43 connect to the downwardly travelling inner drive member 44a. The connections of the first and second sets of pins 43. 47 at the corners 42b of the inner edge of each of the plurality of platforms 42 is repeated at the upper and lower curved portion of the multi-level vertical loop conveyor 7.

In this way, opposing faces of each of the plurality of platforms provide a support surface for supporting a payload. Thus, in the upward direction of the plurality of platforms 42, the top face of the plurality of platforms 42 is offered up to accept the payload. In the downward direction of the plurality of platforms 42, what was the bottom face of each of the plurality of platforms 42 when traveling in the upward direction now becomes the top face as they are flipped around the vertical loop whilst still fixedly coupled to the drive member 44 at the top and bottom of the multi-level vertical loop conveyor 7. The plurality of the platforms 42 are guided around the continuous vertical loop by the guide member 46 that forms part of a frame 48 of the multi-level vertical loop conveyor 7. In the particular embodiment shown in FIG. 5b, the guide member 46 cooperates with the corners of each of the platforms 42 as they move around the upper and lower curved portions of a continuous vertical loop. As a result, the guide member 46 is shaped as a continuous vertical loop that comprises upwardly and downwardly extending semi-circular portions 50 for providing a guide path for the platforms to flip at the top and bottom of the multi-level vertical loop conveyor. The guide member 46 can be in the form of guide tube bent into a continuous vertical loop. The guide member 46 is supported in the upright position by a plurality of vertical uprights 52 arranged at the four corners of the platforms so providing support to the platforms as they travel up and down the multi-level vertical loop conveyor. The combination of the plurality of platforms together with the frame 48 provides a series of compartments separated by the plurality of platforms 42 for accommodating the payload comprising one or more carriages.

Figure 8A:
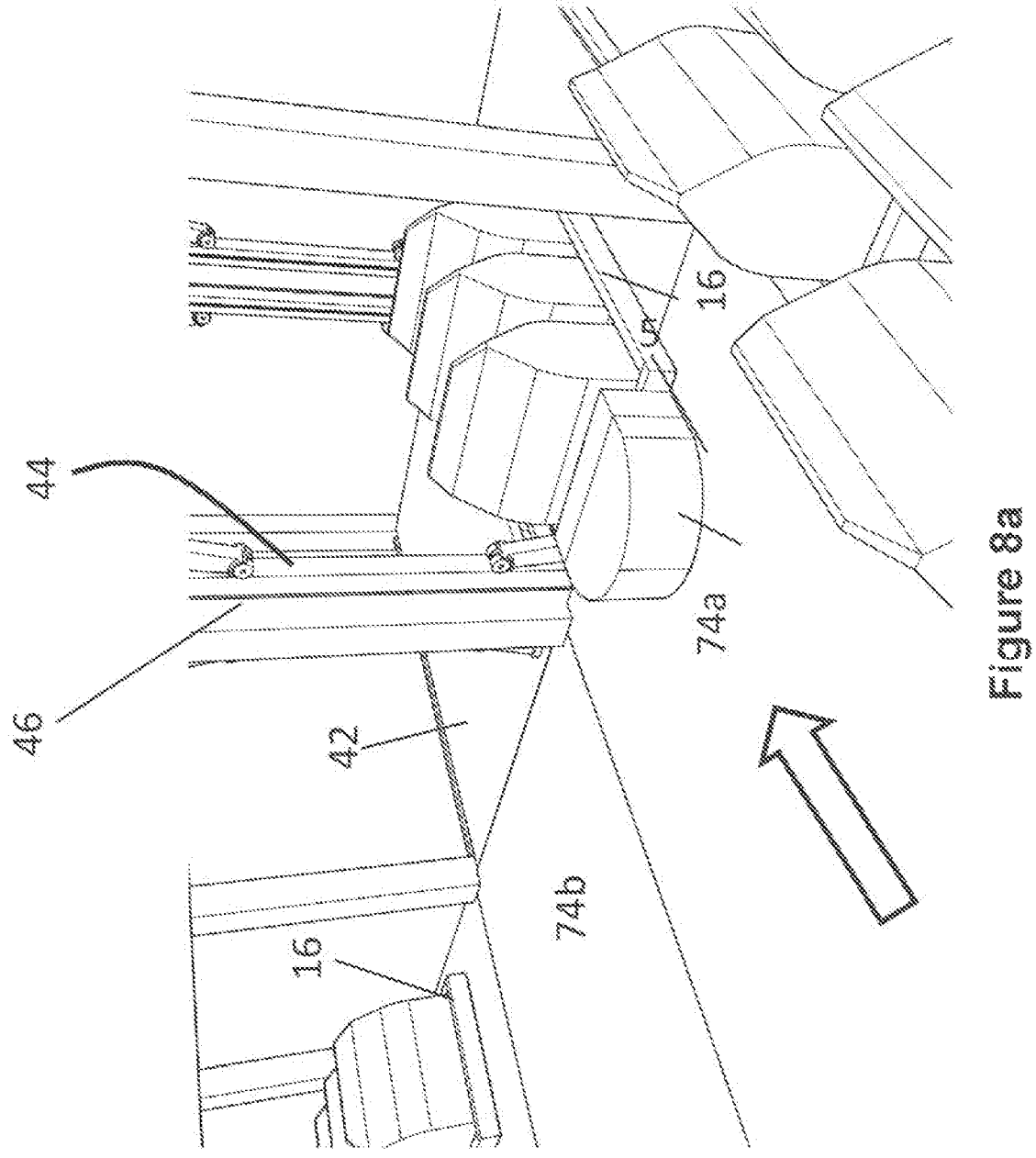
FIG. 8a is an illustration of the loading of a platform via the out-bound area of the storage area according to an exemplary embodiment of the present invention.
Figure 8B:
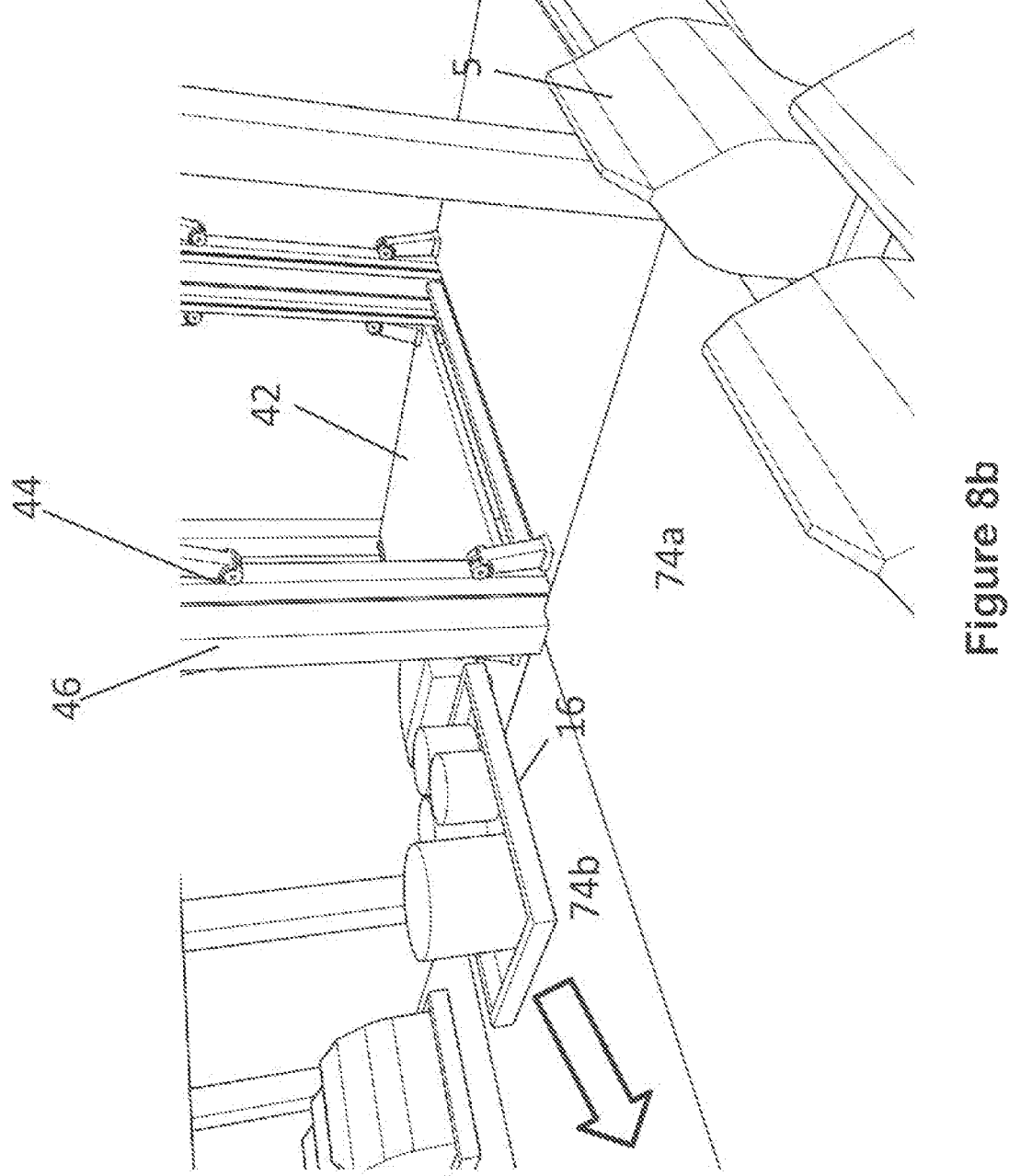
FIG. 8b is an illustration of the unloading of a platform into the in-bound area of the storage area according to an exemplary embodiment of the present invention.

The advantage with this arrangement of the multi-level vertical loop conveyor 7 is that each of the plurality of platforms 42 remains coupled to the drive member 44 in the sense that the plurality of platforms does not move relative to the drive member as they travel through a continuous vertical loop. As a result, each of the plurality of the platforms can be supported by more than two points of contact increasing the ability of the platforms to support a payload. This is particularly important when wanting to support both the autonomous transport vehicle and the carriage. In the particular embodiment shown in FIG. 5b, four corners of each of the plurality of platforms are supported by the guide member 46 as the plurality of platforms move around a continuous vertical loop. Another advantage of coupling the plurality of platforms to the drive member 44 is that the interface between each of the plurality of platforms and anyone of the vertically stacked storage levels when a platform is at a level corresponding to the level of the vertically stacked storage level can be simplified. For example, the multi-level vertical loop conveyor can be positioned relative to the vertical stack of storage levels such that a relatively small gap exists between the edge of each of the plurality of platforms and the edge of anyone of the plurality of vertically stacked storage levels when a platform is at a level corresponding to the level of a storage level so as to allow an autonomous transport vehicle to ride over the small gap between the platforms and the storage levels. The small gap removes the need to provide a flap between the edge of the platform and the storage level for an autonomous transport vehicle to travel between the storage level and the platform. For the purpose of the present invention, the term "interface" corresponds to the cooperation between the platform and the storage level (more specifically the edges of the platform and the storage level) when the level of the platform is at a level corresponding to the level of anyone of the storage levels of the rack. As discussed above, one or more carriages enter the storage area via the in-bound area of the storage area and represent the portion of the storage area at a storage level that interfaces with the platform. Likewise, one or more storage carriages exit the storage area onto a platform of the multi-level vertical loop conveyor via the out-bound area of the storage area. The in-bound and out-bound area for entering and exiting the storage area respectively are shown in FIG. 8a and FIG. 8b.

Since one or more carriages can enter and exit the multi-level vertical loop conveyor at different levels along a continuous vertical loop of the vertical stack of storage levels, the in-bound and the out-bound area are present at the different storage levels. Ideally, the cooperation between each of the plurality of platforms and the in-bound and/or the out-bound area provides a continuous surface for an autonomous transport vehicle to easily move over the interface between each of the plurality of platforms and the in-bound and/or the out-bound area at each of the storage levels. The small gap discussed above at the interface between the platform and the storage level removes the need for any moving parts at the interface between the platform and the storage level. Alternatively, the interface can comprise a flap (not shown) at the junction between the edge of the platform and the storage level. The flap at the interface is moveable so as to allow movement of the platforms uninterrupted by the flap in an upward and downward direction. For example, the flap can comprise a resilient material, e.g. rubber, or is pivotally mounted to either the edge of the platform and/or storage level without hindering movement of the plurality of platforms in both the upward and downward direction but allowing an autonomous transport vehicle and/or carriage to pass over the interface between the edge of the platforms and the storage level.

Figure 6A:
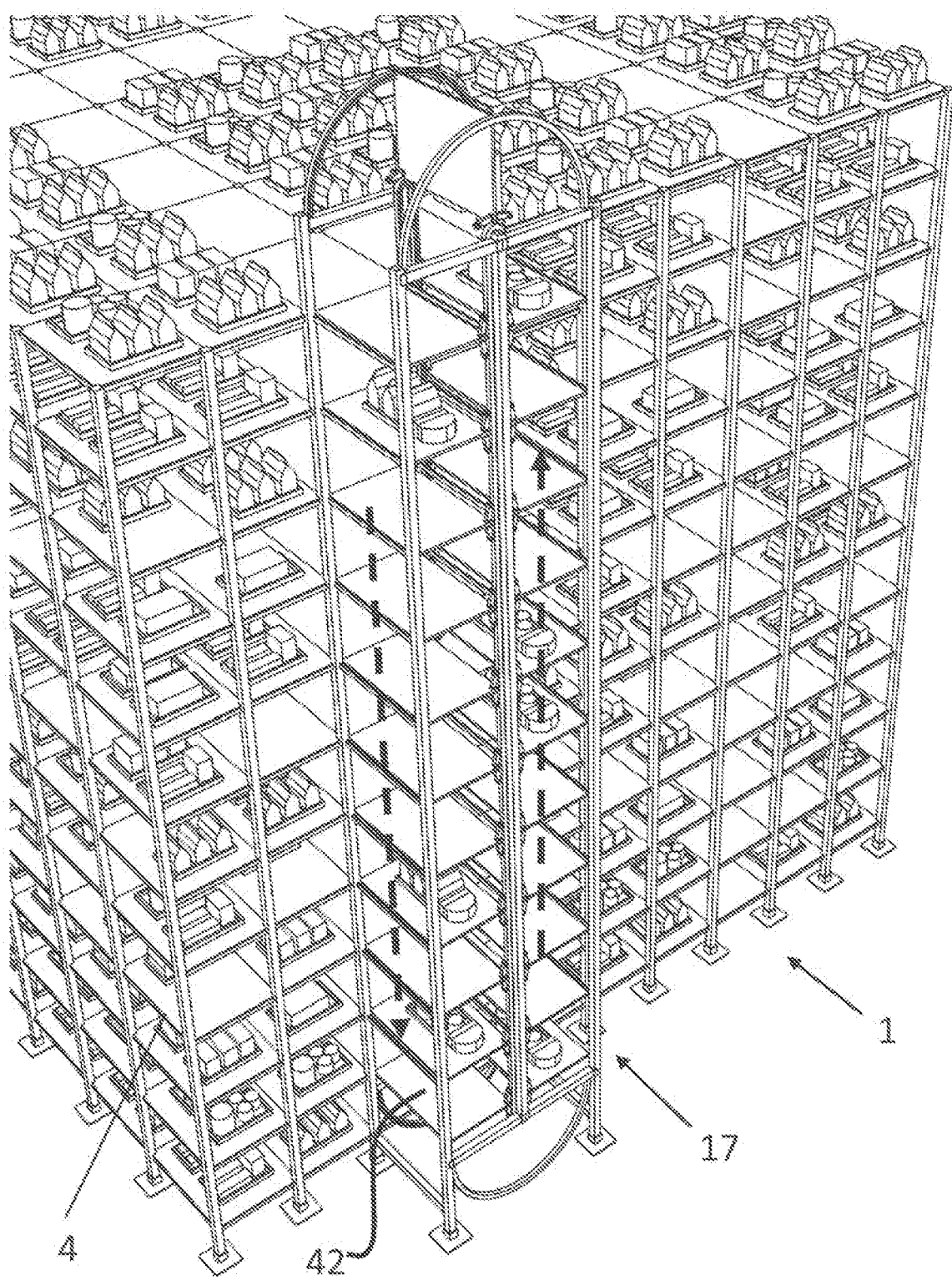
FIG. 6a is an illustration of a multi-level vertical loop conveyor adjacent a plurality of vertically stacked storage levels according to a second exemplary embodiment of the present invention.
Figure 6B:
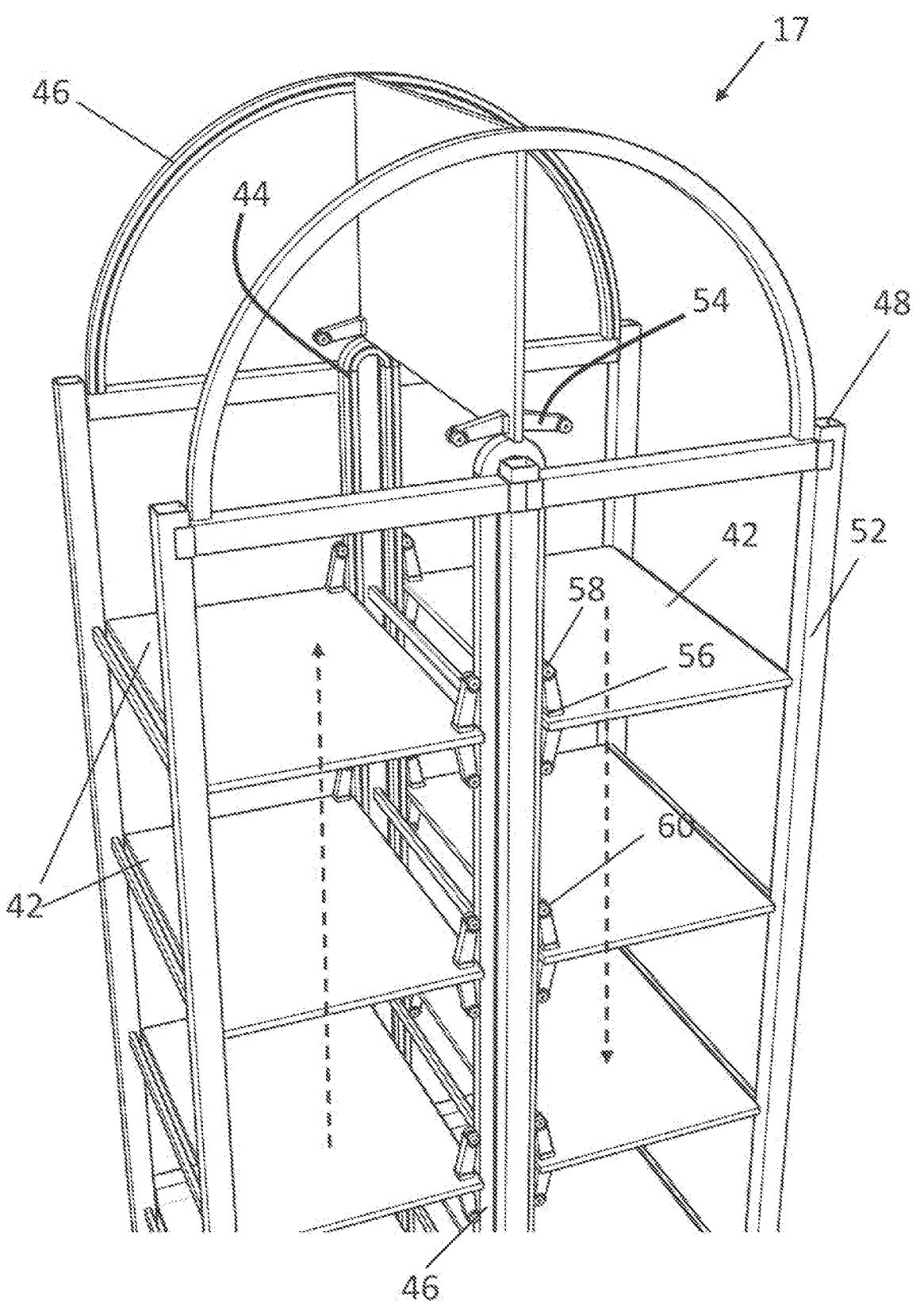

In another example of a multi-level vertical loop conveyor 17 for conveying a plurality of platforms 42 in a continuous vertical loop is shown in FIG. 6a and FIG. 6b. In comparison to supporting the corners of each of the plurality of platforms as they travel in continuous vertical loop, each of the plurality of platforms 42 is fixedly coupled to the drive member 44 so as to be cantilevered from the drive member 44. The movement of the plurality of platforms travel mimics the movement of the plurality of platforms as shown in FIG. 5(a and b) in the sense that they travel in a continuous vertical loop and flip at the top and bottom of the continuous vertical loop. To ensure that each of the plurality of platforms remain substantially horizontal as they travel up and down the conveyor, the plurality of platforms comprises one or more stabilisers or legs 54. The one or more stabilisers 54 are configured to ride around the guide member 46 that houses the drive member 44. The guide member 46 is shaped as a continuous vertical loop so as to guide the plurality of platforms around a continuous vertical loop whilst maintaining the plurality of platforms in a substantially horizontal orientation as they travel in an upward and downward direction.

The one or more stabilisers 54 are angled so that, in a given orientation of the platforms, the one or more stabilisers are configured to butt up against the guide member 46 and, thereby, help to ensure that each of the plurality of platforms remain in a substantially horizontal orientation as they travel up and down the multi-level vertical loop conveyor 17. A first end 56 of each of the stabilisers 54 are mounted to the platform and a second end 58 of the stabilisers butts up and rides against the guide member 46. The angle of the stabilisers 54 is such that when the second end 58 of the stabilisers butt up against the guide member 46, the platforms 42 are maintained in a substantially horizontal orientation as they travel up and down the multi-level vertical loop conveyor 17. Opposing faces of each of the plurality of platforms comprises one or more stabilisers 54 extending in opposite directions (i.e. upwardly and downwardly direction) so that each of the plurality of platforms remain substantially horizontal in the different orientations of the platforms as they travel in the upward and the downward direction.

In the particular embodiment of the present invention shown in FIG. 6b, the second end 58 of the stabilisers 54 can optionally comprise a roller or wheel 60 that rides along the guide member 46 as the platforms 42 are guided around a continuous vertical loop. Two stabilisers 54 are shown mounted to each of the bottom and the top face of each of the plurality of platforms 42 close to the edge where each of the plurality of platforms are fixedly coupled to the drive member 44, i.e. at opposing faces of the platforms. During operation, the roller 60 at the second end 58 of the stabilisers 54 rides along the guide member 46 as they travel up and down the multi-level vertical loop conveyor 17 in a continuous vertical loop. However, during the transition from an upward direction to a downward direction at the top of the multi-level conveyor, the stabilisers 54 at the bottom of the platform in contact with the guide member 46 as shown in FIG. 6b decouples or disconnects from the guide member 46 as the bottom face of the platform flips around to become the top face, i.e. as the orientation of the platforms change direction when the platforms transition from an upward direction to a downward direction. The one or more stabilisers 54 re-connects with the guide member 54 when travelling in the downward direction. The process repeats when travelling from a downward direction to an upward direction in that the one or more stabilisers 54 on opposing faces of the platforms 42 disconnects and reconnects with the guide member 46 when moving from a downward to an upward direction and vice versa. This allows the plurality of platforms to travel around a continuous vertical loop without being impeded by the frame 52.

The multi-level vertical loop conveyor according to the present invention is arranged against the rack (vertically stack storage levels) such that each of the plurality of platforms, in particular the edge of the platform, interfaces with anyone of the storage levels of the rack as they travel around a continuous vertical loop. The spacing between the plurality of the platforms coupled to the drive member 44 are such that a plurality of platforms of the multi-level vertical loop conveyor interfaces with an equal number of storage levels of the rack at the same time so allowing multiple carriages at different storage levels to enter and/or exit the multi-level conveyor at substantially the same time. In other words, multiple platforms of the multi-level conveyor reach a level that corresponds to the level of an equal number of storage levels of the rack at substantially the same time, i.e. the movement of the plurality of platforms is indexed in sequential steps with respect to the spacing between the storage levels. This movement applies to the plurality of platforms travelling in both the upward and downward direction. This is demonstrated in FIG. 5a and FIG. 6a, where the plurality platforms 42 either side of the drive member 44 are at the same level of the storage levels such that when any one of the platforms reach a level corresponding to the level of storage levels of the rack, multiple platforms 4 are at a correspondingly number of levels of the rack.

A control system operatively coupled to a network comprising one or more processors and memory storing instructions that when executed by the one or more processors cause the one or more processors to coordinate the movement of each of the plurality of platforms 42 as they travel around a continuous vertical loop such that one or more of the plurality of platforms is at a level corresponding to the level of one or more of the plurality of vertical storage levels. Further details of the control system configured to coordinate the movement of the plurality of the platforms so that one or more of the plurality of the platforms is at a level corresponding to the level of one or more of the plurality of storage levels is discussed further below.

The problem with the multi-level vertical loop conveyor 7, 17 based on the system shown in FIGS. 5(a and b) and 6(a and b) is that the payload on a platform should exit the platform prior to the platform reaching the uppermost or lowermost portion of the multi-level vertical loop conveyor, i.e. prior to the platform flipping, as this would cause the payload to fall off the platform as the orientation of the platforms changes, (the direction of the drive member changes). To mitigate this problem, it is essential that the payload exits the multi-level vertical conveyor prior to the platform reverses direction from an upward to a downward direction and vice versa around the upper and the lower portion of the multi-level vertical conveyor, i.e. prior to the drive member changing direction. One or more sensors (not shown) in communication with the control system can be located externally or internally of the multi-level vertical conveyor 7, 17 to monitor the occupancy of the multi-level conveyor at each of the plurality of platforms. The one or more of the sensors can be mounted within the compartments divided by the plurality of platforms so as to monitor the occupancy of the platforms. Alternatively, the one or more sensors can be mounted in or around the in-bound and/or out-bound area of the storage area. The one or more sensors can be a camera or a load cell to sense the weight of a payload on the platforms. When a given platform carrying a payload reaches a level corresponding to the uppermost level or the lowermost level of the vertically stacked storage levels and prior to the drive member changing direction along the continuous vertical loop, the one or more sensors in communication with the control system can determine the occupation status of the platform and prevents the platform from moving if the top or bottom platform is occupied. This is to prevent the payload being carried along the portion of the multi-vertical loop conveyor where the platforms flips when changing direction at the uppermost and lowermost portion of the multi-vertical loop conveyor, thereby, causing the payload to fall off the platform. In the present invention, the one or more sensors monitor the occupancy of the plurality of platforms moving in both the upward and downward direction and prevents the platforms from moving should a payload be present when the platform has reached its top or bottom level prior to the drive member changing direction at the uppermost and lowermost portion of the multi-level vertical loop conveyor.

To mitigate the problem of the orientation of the platforms changing at the uppermost and lowermost portion of the multi-level vertical loop conveyor, the guide member 46 shown in FIGS. 7(*a* and *b*) comprises orientation means 62 so as to maintain the platforms 42 in a substantially horizontal orientation as they transfer from an upward to a downward and vice versa when travelling around in a continuous vertical loop. This has the advantage of removing the need to remove a payload when a platform reaches its uppermost or lowermost level as required by the embodiments shown in FIGS. 5(*a* and *b*) and FIGS. 6(*a* and *b*). Thus, one or more payloads can be kept on the multi-level vertical loop conveyor 27 for a longer period of time. This helps with the sequence by which the carriages can be added and/or removed from the multi-level vertical loop conveyor 27; details of which are discussed further below. In contrast to the embodiment shown in FIG. 5(*a* and) and FIGS. 6(*a* and *b*), the guide member 46 comprises two outer parallel side sections 64 for guiding the corners of each of the plurality of platforms 42 in the upward and downward direction and opposed end sections 66 for guiding each of the plurality of platforms around the upper and lower portion of the multi-level conveyor to complete the continuous loop. Each of the two outer parallel side sections 64 comprise two side sections laterally disposed either side of a centre section and guide the corners of the platforms when travelling in the upward and downward direction. The outer parallel side sections are supported by a frame 48 comprising parallel upright members 52. To keep each of the plurality of platforms in a substantially horizontal orientation when travelling around a continuous vertical loop, each of the plurality of platforms are movably coupled to the drive member 44 such the each of the plurality of platforms is able to pivot relative to the drive member 44 when the drive member changes direction at the uppermost and lowermost portion of the multi-level vertical loop conveyor. Thus, when travelling around the curvature portion of the drive member 44 at the uppermost and lowermost portion of the multi-level vertical loop conveyor 27, to maintain each of the plurality of platforms 42 substantially horizontal as the drive member changes direction at the uppermost and lowermost portion of the multi-level vertical loop conveyor, each of the plurality of platforms pivots about the coupling with the drive member 44 about a substantially horizontal axis extending through the coupling.

In the particular embodiment of the present invention shown in FIG. 7(*a* and *b*), the orientation means comprises a bracket 68 (or hanger) so that each of the plurality of platforms 42 are moveably coupled to the drive member 44 via the bracket 68. The brackets 68 are pivotally coupled to the drive member, e.g. chain or belt, and each of the plurality of platforms 42 are fixedly coupled to each of the brackets 68. The drive member 44 drives the plurality of platforms 42 around a continuous vertical loop. To maintain each of the plurality of platforms 42 in a substantially horizontal orientation as they travel around the uppermost and lowermost portion of the multi-level vertical loop conveyor, each of the brackets is pivotally coupled to the drive member such that the bracket rotates about a horizontal axis extending through the coupling as the drive member changes direction around the curvature portions of the multi-level vertical loop conveyor 27.

Figure 7A:
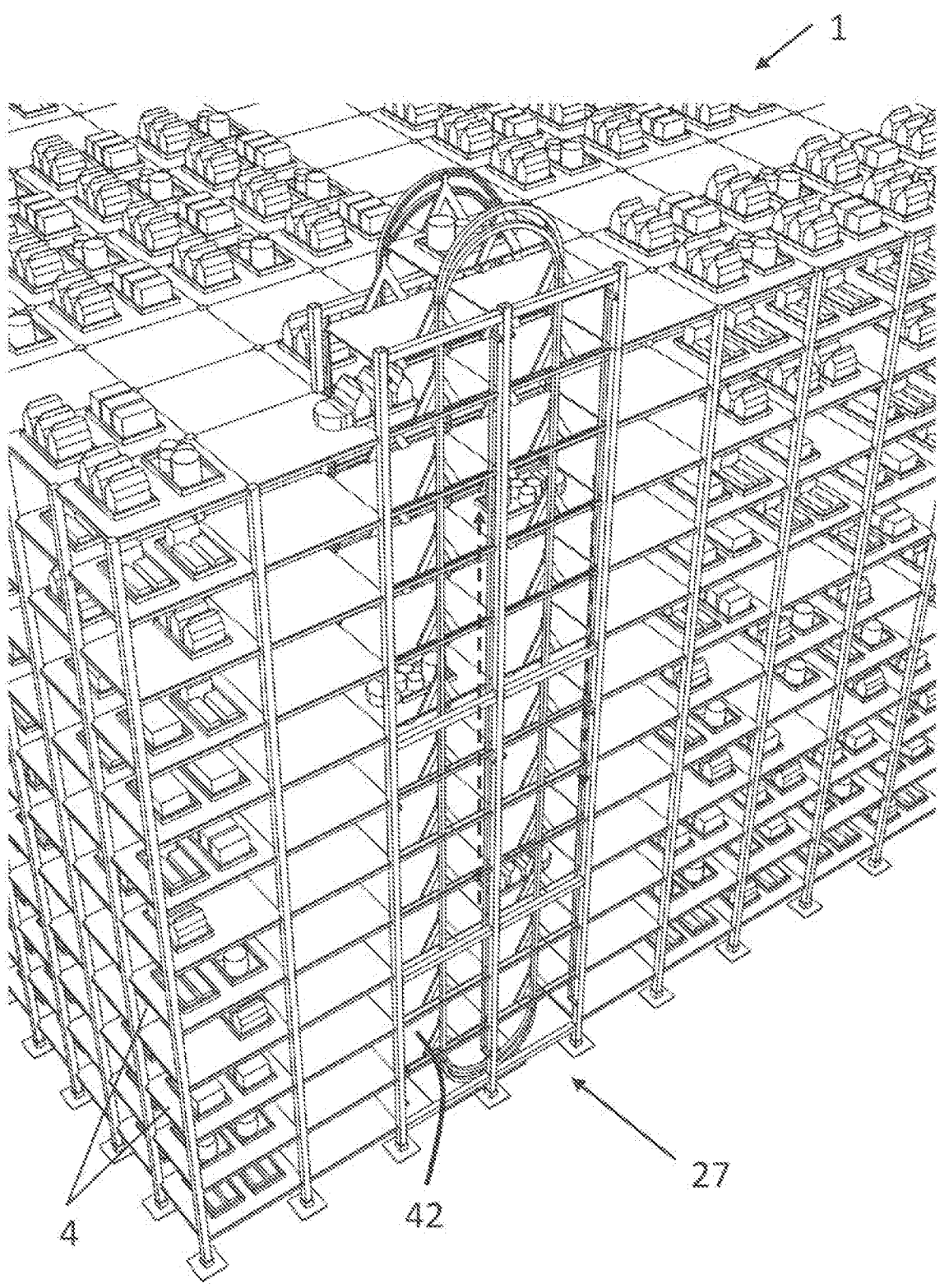
FIG. 7a is an illustration of a multi-level vertical loop conveyor adjacent a plurality of vertically stacked storage levels according to a third exemplary embodiment of the present invention.
Figure 7B:
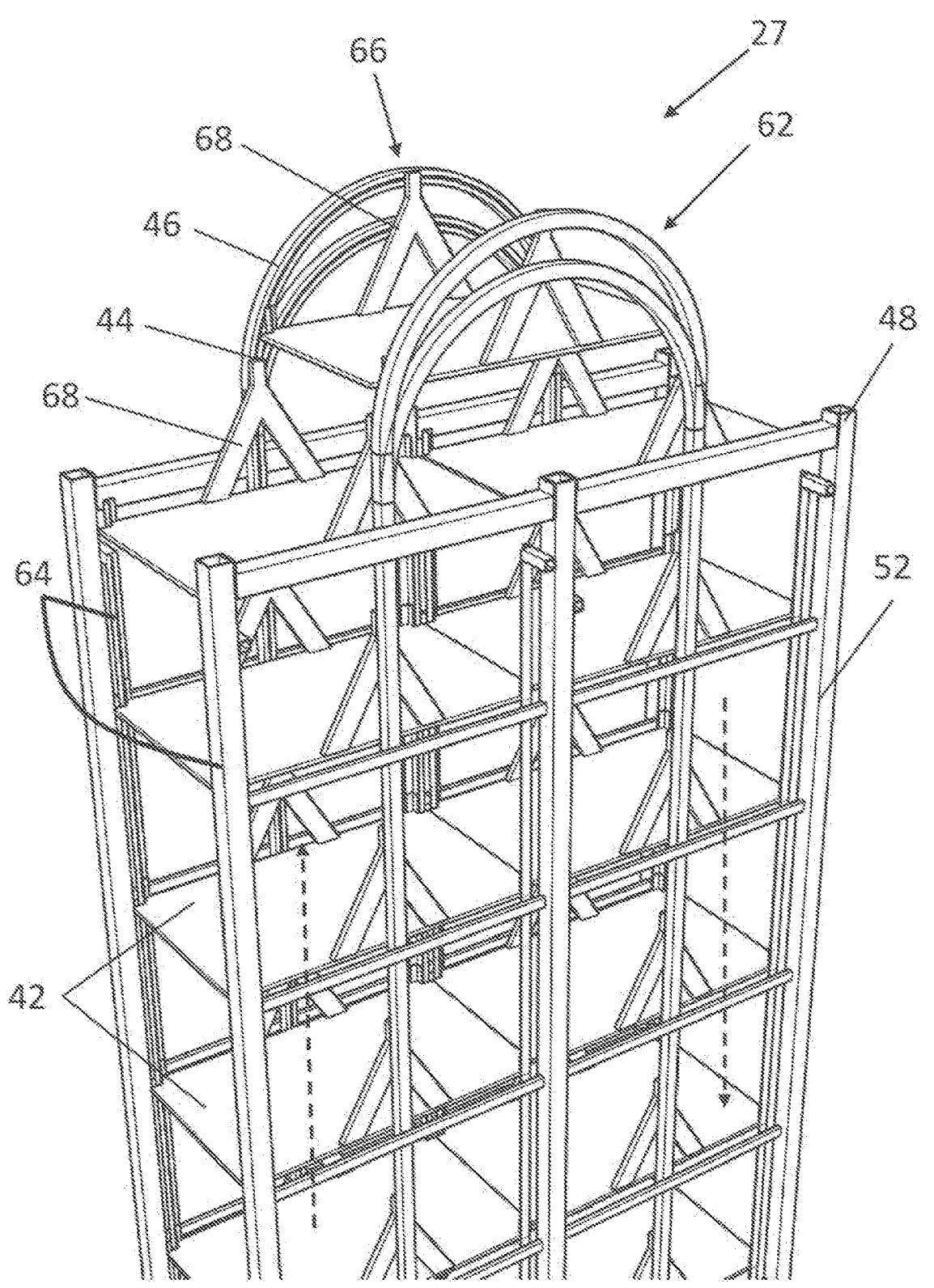
Figure 7C:
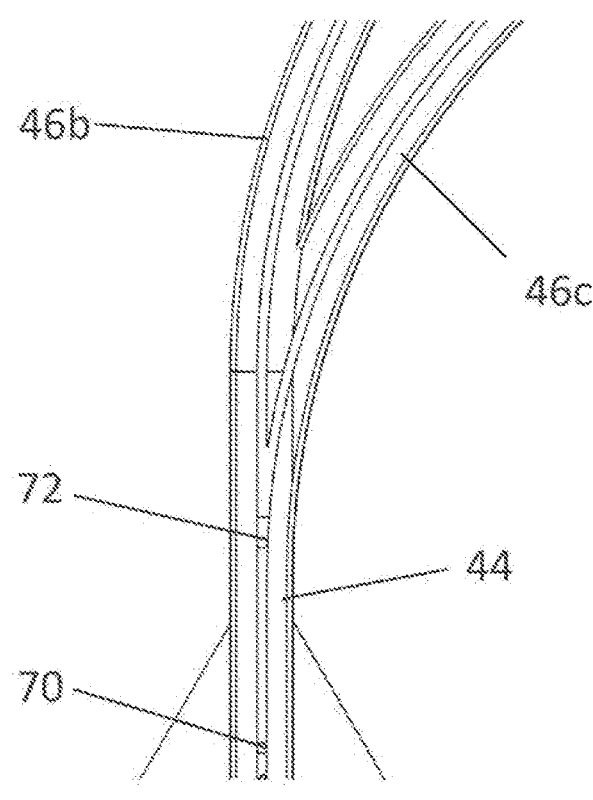
FIGS. 7c-7e are an illustration of the orientation means to keep the orientation of the plurality of platforms in FIGS. 7a and 7b substantially the same as they circulate around a continuous vertical loop.
Figure 7D:
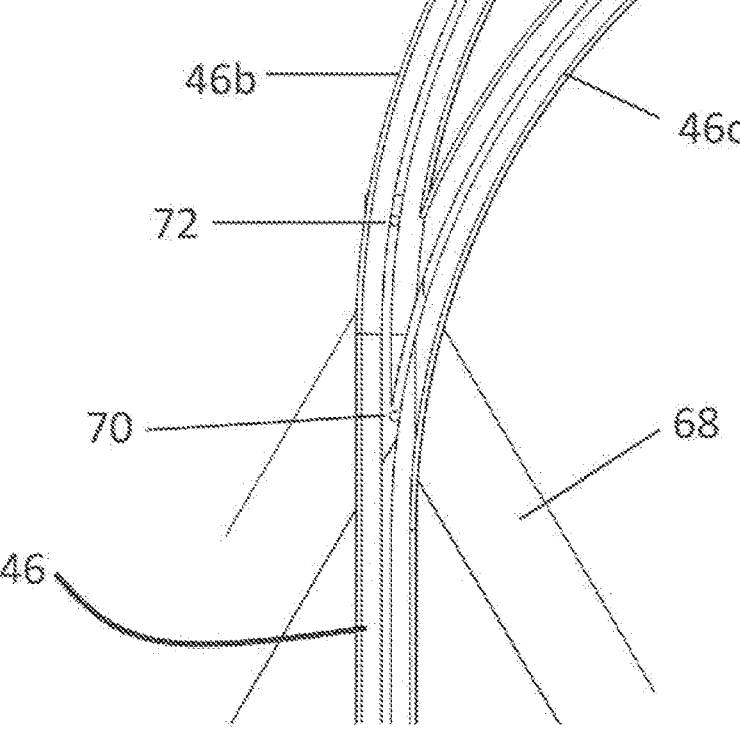
Figure 7E:
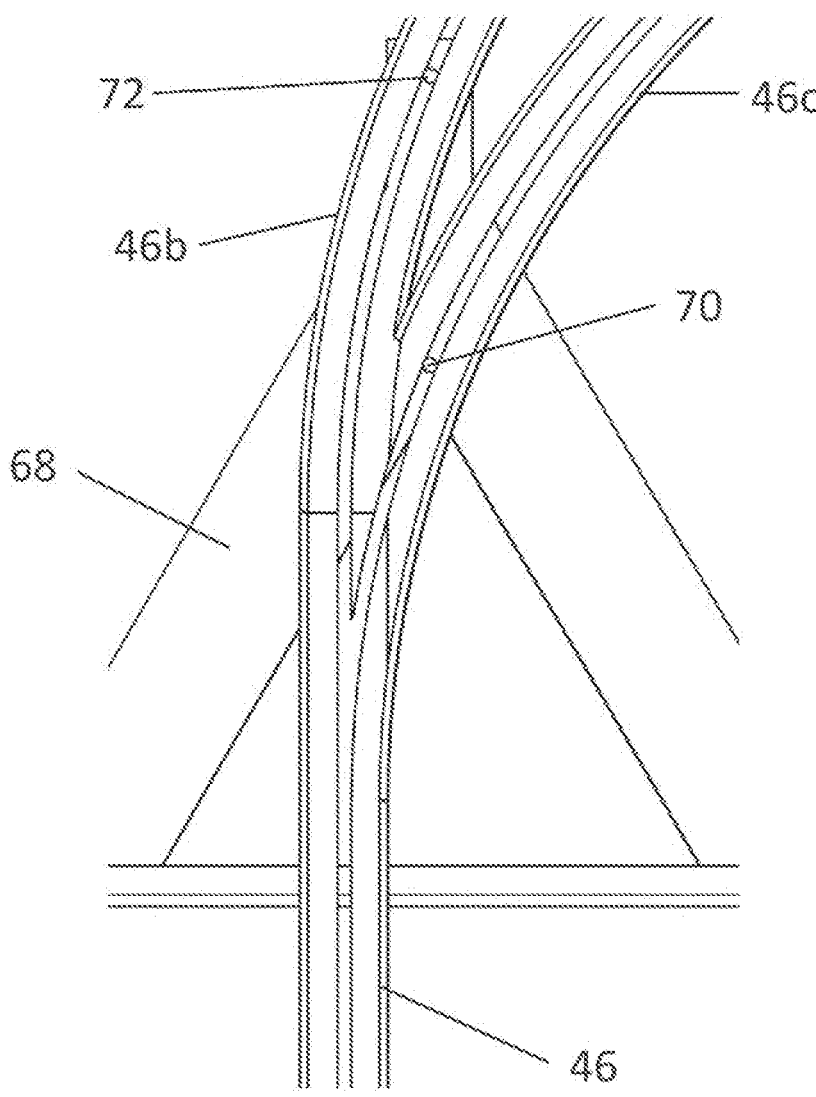

To prevent each of the plurality of platforms 42 from swinging about the horizontal axis when the drive member 44 changes direction, the bracket 68 comprises at least two vertically spaced guide pins 70, 72, an upper guide pin 72 and a lower guide pin 70, that each cooperate with corresponding vertically spaced guide paths (upper guide path 46*b* and lower guide path 46*c*) having a similar curvature as the drive member at the uppermost and lowermost portion of the multi-level vertical loop conveyor such that the bracket 68 is guided by the at least two vertically spaced guide paths 46*b*, 46*c* at the uppermost and lowermost portion of the multi-level vertical loop conveyor. As clearly demonstrated in FIGS. 7(*c*) to 7(*e*), the two vertically spaced pins 70, 72 are guided by two guide paths 46*b*, 46*c* one above the other, more specifically two semi-circular guide paths at the upper and lower portion of the multi-level vertical loop conveyor that merge into a single guide path 46 between the uppermost and lowermost portions of the multi-level vertical loop conveyor. In other words, the separation between the two guide paths changes as the drive member changes direction from an upward direction to a downward direction and vice versa, whereby the separation increases as the drive member increasingly changes direction. Maximum separation occurs at the uppermost and lowermost point of the guide member. The at least two vertically spaced guide pins 70, 72 are preferably are vertically spaced in an axial direction, i.e. aligned on the same vertical axis. The mechanism by which the orientation means maintains the orientation of the platforms in a substantially horizontal orientation at the uppermost and lowermost portion of the multi-level vertical loop conveyor is now described with reference to FIGS. 7(*c*) to 7(*e*). FIG. 7(*c*) shows the bracket 68 supporting a platform 42 approaching the uppermost portion of the multi-level vertical loop conveyor where the guide path 46 separates into the two guide paths 46*b*, 46*c* and the upper guide pin 72 of the vertically spaced guide pins enter the upper guide path 46*b*. As the direction of the upper guide path changes 46*b* due to its curvature, the upper guide pin 72 engages with the upper guide path 46*b*. This causes the bracket 68 to shift laterally in the direction of the curvature of the upper guide path 46*b* as shown in FIG. 7*d*. This in turn causes the lower guide pin 70 to enter the lower guide path 46*c* as demonstrated in FIG. 7*d*. Further movement of the upper guide pin 72 driven by the drive member drives the upper 72 and lower guide pins 70 into their respective upper 46*b* and lower guide paths 46*c* as shown in FIG. 7*e*. The cooperation of the lower guide pin 70 with the lower guide path 46c prevents the platform changing orientation. When exiting the uppermost or lowermost portion of the multi-level vertical loop conveyor, the upper and lower guide pins 72, 70 enter into the guide path 46 as the upper and lower guide paths 46b, 46c merge into the single guide path 46.

In the particular embodiment of the present invention shown in FIG. 7(*a* and *b*), the bracket 68 is mounted to the drive member at opposing sides and centrally of each of the plurality of platforms 42. The bracket 68 is fixed at two points on each of the plurality of platforms 42 to ensure that the platforms are kept in the same orientation as the bracket 68 is driven around the continuous vertical loop. In the particular embodiment of the present invention shown in FIG. 7(*a* and *b*), the bracket 68 is substantially V shaped. In contrast to the guide member 46 shown in FIG. 5(*a* and *b*) and FIG. 6(*a* and *b*), the guide member 46 comprises two outer parallel side sections 64 in addition to the guide path 46 disposed between the side sections 64 for maintaining the horizontal orientation of the platforms as they change direction at the uppermost portion and the lowermost portion of the multi-level vertical loop conveyor as discussed above. In operation when moving from an upward direction to a downward direction, each of the plurality of platforms 42 decouple from the parallel outer side sections 64 at the upper and lower portion of the multi-level vertical loop conveyor and is carried by the drive member 44 around the centrally mounted guide path 46 in order to keep the platforms in a substantially horizontal orientation as they change direction.

In comparison to the embodiments shown in FIGS. 5(*a* and *b*) and FIGS. 6(*a* and *b*) where each of the plurality of platforms flip at the upper and lower portion of the multi-level vertical loop conveyor, keeping the platforms in a substantially horizontal orientation when travelling around a continuous vertical loop allows one or more payloads to be kept on the multi-level vertical loop conveyor 27 when traveling around the loop without the danger of the payload falling off the platforms. This advantage brings with it a new level of coordination of traffic to and from the multi-level vertical loop conveyor 27. For example, the carriages may be loaded and allowed to circulate around the multi-level conveyor, and be unloaded from a respective platform in a different sequence to the sequence in which they are loaded onto the platforms. In other words, the input or loading sequence of the carriages onto the multi-level vertical loop conveyor may be substantially independent from the output or unloading sequence of the multilevel conveyor and vice versa. In one example, a payload may be loaded onto a platform during the upward travel of the platform and off loaded from the platform during the downward travel of the platform. Thus, the plurality of platforms may be unloaded in a different sequence or order to when they were loaded. The different sequencing of loading and unloading the platforms also allows prioritizing the loading and/or unloading of the platforms. For example, one or more carriages may be prioritized for loading and/or unloading depending on one or more attributes of items carried by the one or more carriages. These include but are not limited to the storage temperature of the items, e.g. frozen or chilled items or the urgency of the items for fulfilling a customer order. Items that are not so urgent or non-perishable items can remain on the multi-level vertical loop conveyor 27 until when it is convenient to unload them from the conveyor. The loading and unloading of the plurality of platforms may be based on an urgency criteria associated with the demands at the pick station. Platforms may be prioritised based on a sequence of items required by the pick stations in order to fulfil customer orders. A control system can coordinate the sequencing of the loading and unloading of the multi-level conveyor in correlation to customers' orders. It also allows more carriages to be vertically accumulated in the multi-level vertical loop conveyor.

In common with all of the different examples of the multi-level vertical loop conveyor, one side or first side of the multi-level vertical loop conveyor can be configured for feeding one or more carriages into the different storage levels of the storage area and the other side or second side of the multi-level vertical loop conveyor can be configured to remove one or more carriages from the different storage levels of the storage area. This can happen sequentially but preferably, simultaneously. This is exemplified in FIG. 6a, showing the direction of the movement of the plurality of platforms at the different sides of the multi-level vertical loop conveyor. The downward movement of the plurality of platforms as indicate by the downward arrow is used to carry one or more carriages that exit the storage area at different storage levels and the upward movement of the plurality of platforms as indicated by the upward arrow is used to carry one or more carriages that have entered the multi-level vertical loop conveyor at the different storage levels to their desired storage levels. Whilst the specific description describes three different embodiments of a multi-level vertical loop conveyor, 7, 17, 27, other multi-level vertical loop conveyors that are able to vertically accumulate a plurality of carriages and allow the multi-level vertical loop conveyor to load and unload one or more of the plurality of carriages at any point along a continuous vertical loop is applicable in the present invention.

The upward and downward movements of the multi-level vertical loop conveyor also permit one or more autonomous transport vehicles to be transported to the different storage levels so as to fulfil requests to retrieve one or more carriages at the one or more storage levels. As a result, more autonomous transport vehicles can be assigned to the one or more storage levels than the other storage levels of the storage area.

Traffic Light System

FIGS. 8(*a* and *b*) shows the in-bound area 74a and the out-bound area 74b of the storage area for respectively entering and exiting the multi-level vertical loop conveyor. The in-bound and out-bound areas 74a, 74b are shown laterally disposed or side by side. In both examples shown in FIGS. 8(*a* and *b*), to allow loading and unloading of the multi-level vertical loop conveyor substantially simultaneously, the platforms 42 for loading and unloading of the multi-level vertical loop conveyor arrive at the same time so that they are each at the level corresponding to the level of a storage level of the vertical stacked storage levels at the in-bound 74a and out-bound area 74b. This is achieved by having equally spaced vertical platforms 42, wherein the vertical separation of the platforms 42 corresponds to the separation of the vertically stacked storage levels. The in-bound area 74a and the out-bound area 74b can be interchangeable and can depend on whether the plurality of platforms of the multi-level vertical loop conveyor is moving in a downward direction or an upward direction. For example, when needing to move to a lower storage level, the autonomous transport vehicle 14 can enter the downward moving platform at one side of the multi-level vertical loop conveyor via the out-bound area 74b and can exit the multi-level vertical loop conveyor via the in-bound area 74a at the same side. Conversely, an autonomous transport vehicle can enter an upwardly travelling platform at the other side of the multi-level conveyor, be lifted to a higher storage level and exit the platform at the same side of the multi-level conveyor. This allows the multi-level vertical loop conveyor to transport one or more autonomous transport vehicles to the different storage levels of the vertically stacked storage levels.

Figure 9A:
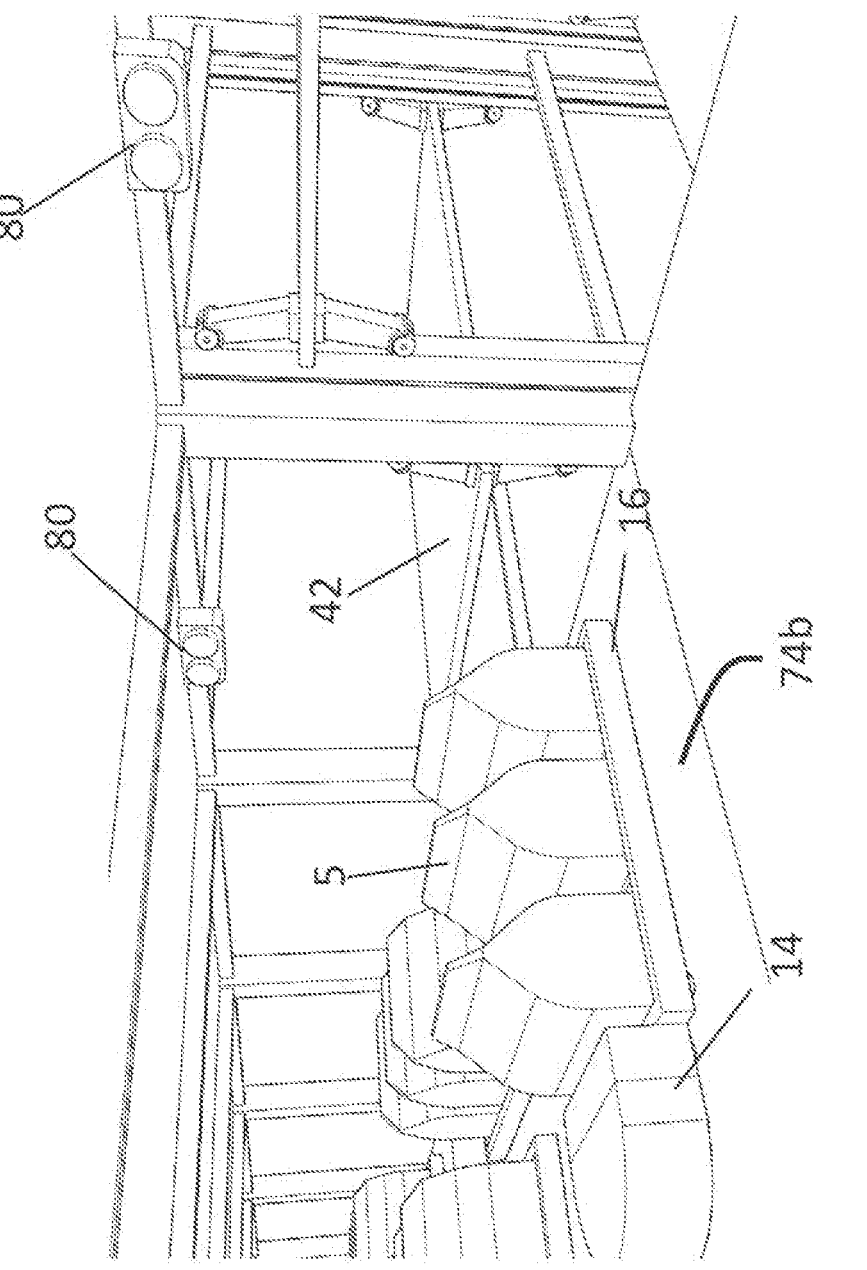
FIGS. 9a and 9b are an illustration of a traffic light system at the in-bound and out-bound area of the storage area showing the 9*a* stop stage; and 9*b* go stage according to a first exemplary embodiment of the present invention.

Also shown in FIGS. 8(a and b) is a plurality of carriages waiting in an orderly queue to enter the multi-level vertical loop conveyor. The order of the queue can depend on a number of factors including but is not limited to the time an autonomous transport vehicle had been instructed to retrieve a carriage, the priority of the items held in the carriage to fulfil a customer order or simply the fact that it depends on how quick the autonomous transport vehicle can arrive at the out-bound area for exiting the storage area. To control the entry of one or more carriages into the multi-level vertical loop conveyor, the present invention provides a traffic light system to control the entry of carriages and/or autonomous transport vehicles into and out of the multi-level vertical loop conveyor. FIGS. 9(a and b) and FIGS. 10(a and b) show two examples of the traffic light system 80 according to the present invention. In the first example of the traffic light system 80 shown in FIGS. 9(a and b), sensors mounted at the entrance of each of the plurality of platforms of the multi-level vertical loop conveyor senses the presence of a carriage 16 and/or autonomous transport vehicle 14 in the out-bound area 74b of the storage area. The sensors can be proximity sensors such as various optical sensors, e.g. Lidar sensors (Light Detection and Ranging) or ultrasonic sensors. Optionally, the sensor can be a camera that is able to sense the presence of an autonomous vehicle at the in-bound and the out-bound area of the storage area.

Figure 9B:
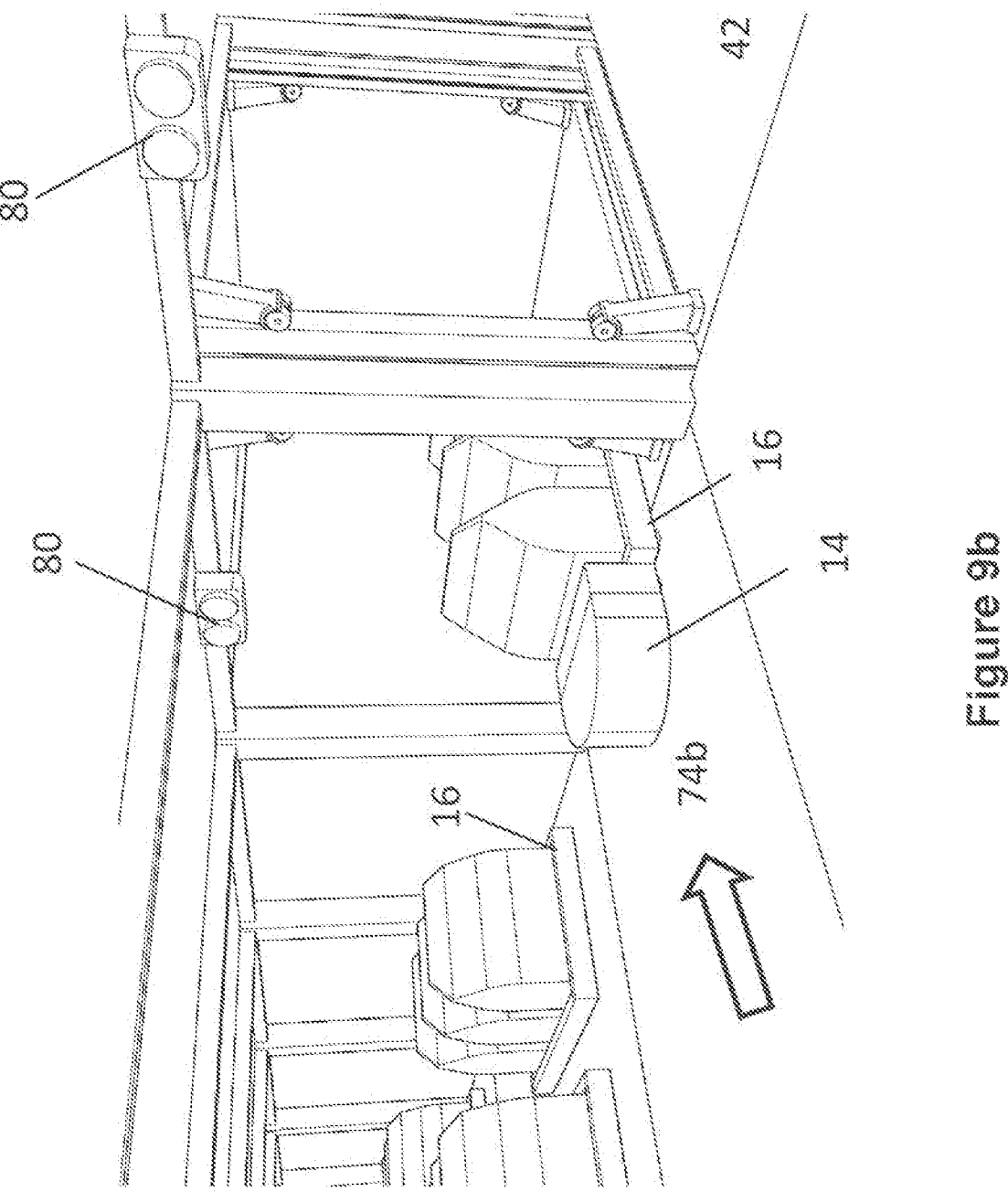

The sensor is communicatively coupled to the control system and sends a signal to the control system when the sensor senses an autonomous transport vehicle in the out-bound area 74b of the storage area. The control system prevents the autonomous transport vehicle from entering the multi-level vertical loop conveyor until a platform 42 is at a level corresponding to the storage level of the autonomous transport vehicle in the out-bound area 74b (see FIG. 9a). When the platform of the multi-level vertical loop conveyor is at the storage level, the control system sends a signal to the autonomous transport vehicle to enter the platform as shown in FIG. 9b. A similar traffic light system 80 for entry into the multi-level vertical loop conveyor also applies to exiting the multi-level vertical loop conveyor in that the sensor senses the occupation of a platform and the control system only instructs the autonomous transport vehicle to exit the multi-level vertical loop conveyor via the in-bound area 74a when the platform reaches a level corresponding to a storage level.

Alternatively, each of the plurality of autonomous transport vehicles can comprise a sensor or receiver that can talk or handshake with the traffic light system 80 and interpret the signal from the traffic light system 80 to determine whether to enter a platform of the multi-level vertical loop conveyor or wait at the out-bound area. For example, the sensor could be a camera and the traffic light system 80 can transmit different signals that are interpreted by the camera. Optionally, the traffic light system 80 can comprise signal generating means, e.g. transmitter, which is detectable by a receiver of the autonomous transport vehicle, e.g. based on short range wireless technology (Bluetooth®).

Figure 10A:
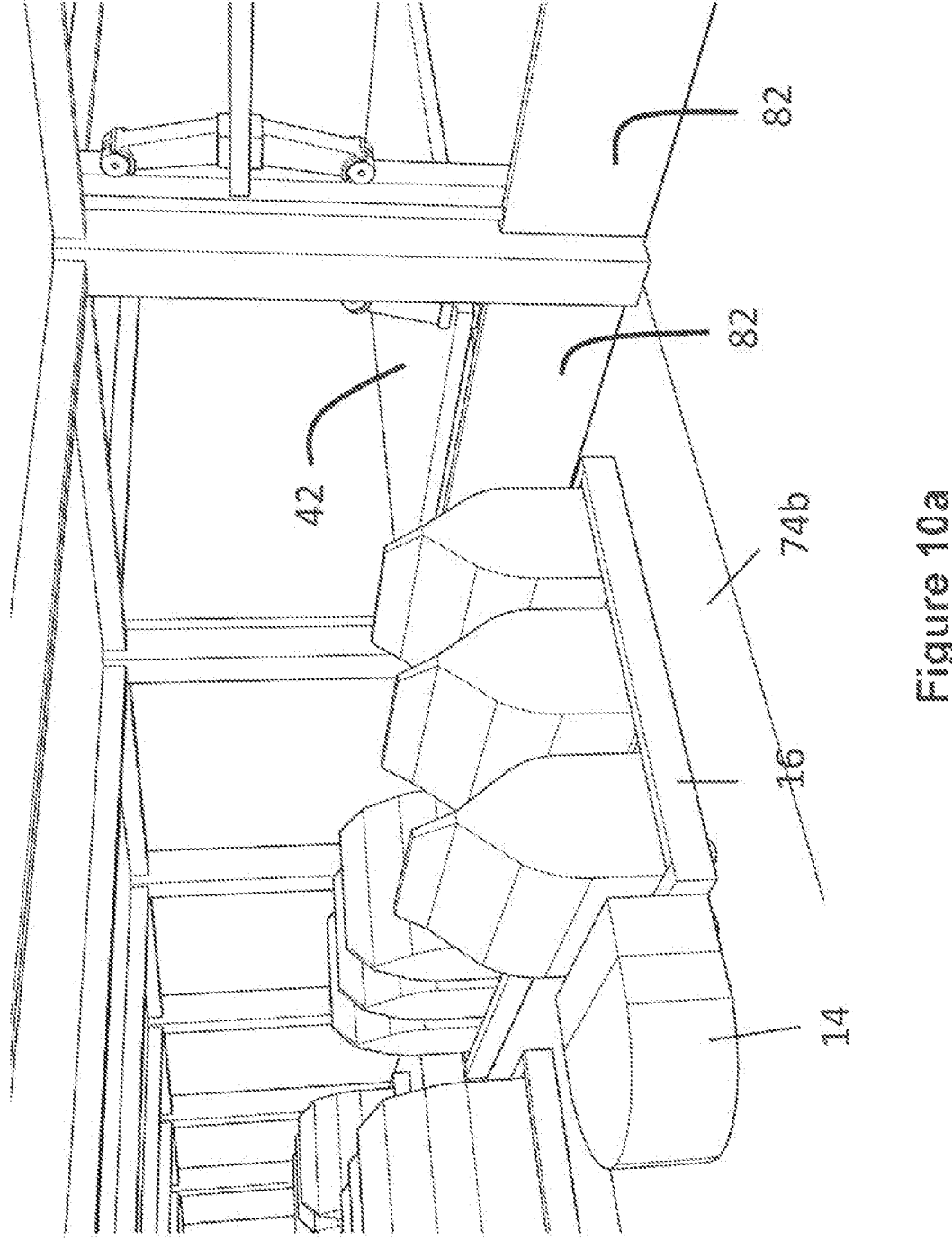
FIGS. 10*a* and 10*b* are an illustration of a traffic light system at the in-bound and out-bound area of the storage area showing the 10*a* stop stage; and 10*b* go stage according to a second exemplary embodiment of the present invention.
Figure 10B:
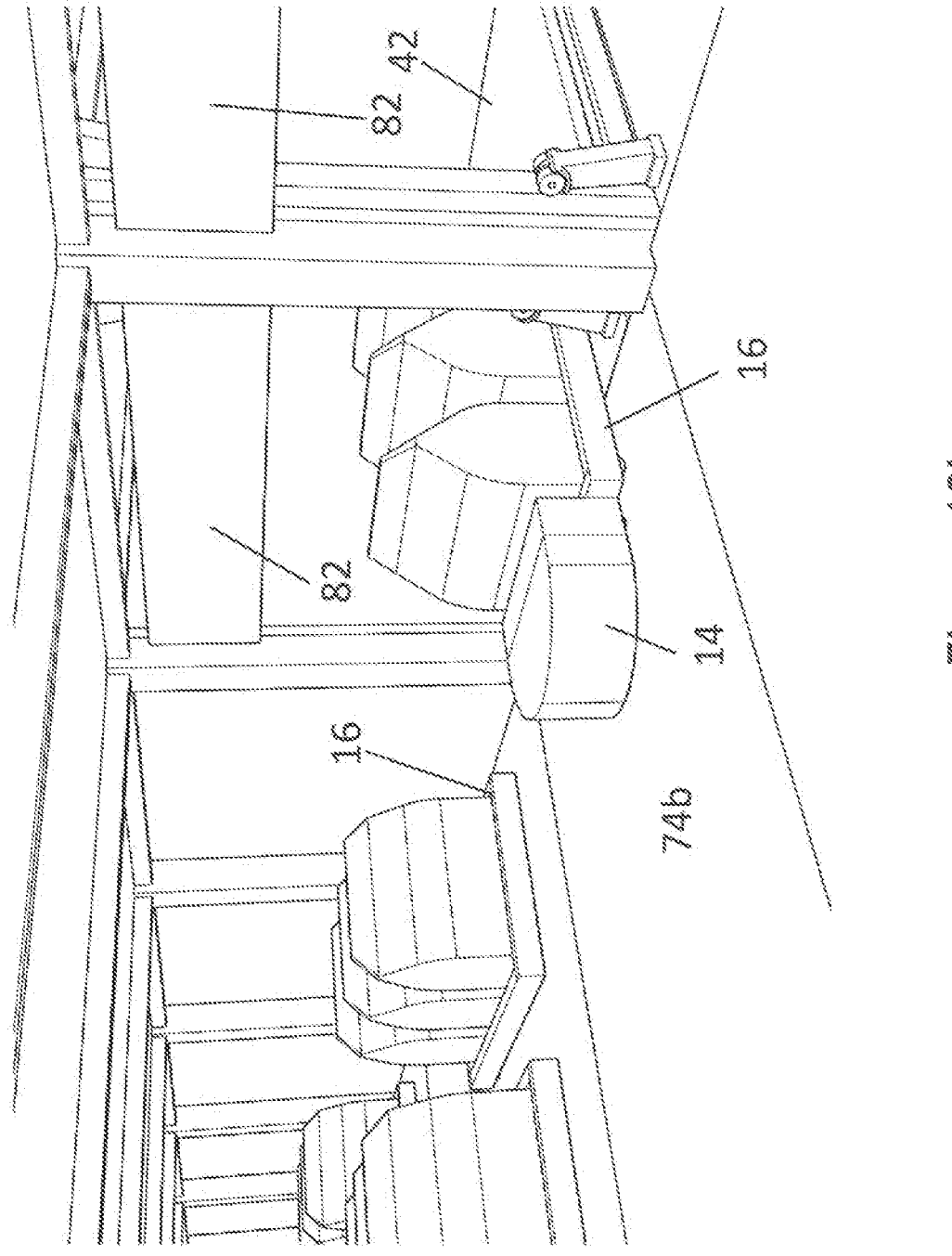

In combination with the sensor means discussed above or alternatively, the traffic light system 80 can comprise a physical barrier 82 to prevent an autonomous transport vehicle 14 entering or exiting the multi-level vertical loop conveyor as shown in FIGS. 10(a and b). Thus, when the platform sensor senses the presence of an autonomous transport vehicle 14 in the out-bound area 74b of the storage area and when the platform has not reached the storage level, the physical barrier 82 is lowered to prevent the autonomous transport vehicle 14 and/or carriage 16 from entering into the multi-level vertical loop conveyor as shown in FIG. 10a. The physical barrier 82 is raised when the platform arrives at the storage level to allow the autonomous transport vehicle to enter the multi-level conveyor as shown in FIG. 10b. Optionally, the physical barrier can be biased in the lowered position and is only raised when an autonomous transport vehicle is about to enter the multi-level vertical loop conveyor via the out-bound area.

Whilst not shown in FIGS. 9(a and b) and FIG. 10(a and b), each of the plurality of platforms can optionally comprises physical barriers (hereinafter called "platform barrier" to distinguish from the physical barriers 82 externally of the plurality of platforms at each of the storage levels). The platform barriers are lowered to prevent an autonomous transport vehicle and/or carriage from exiting the platform whilst the platform is in motion and raised to allow the autonomous transport vehicle and/or carriage to exit the platform when the platform reaches a storage level. Movement of the platform barrier from a lowered to a raised position and vice versa can be controlled by the control system, i.e. in response to signals from the one or more sensors of the traffic light system discussed above.

The autonomous transport vehicle can remain coupled to the carriage when travelling in the multi-level vertical loop conveyor or the autonomous transport vehicle can deposit the carriage in the multi-level vertical loop convey and remain on its storage level. The former has the advantage that the autonomous transport vehicle can remain coupled to the carriage when the carriage is being moved to the pick station or decant station and thereby, provides a simpler control system. The latter is where the autonomous transport vehicle decouples from the carriage when in the multi-level vertical loop conveyor and remain on its storage level such that a second autonomous transport vehicle retrieves the carriages from the multi-level vertical loop conveyor at the desired storage level. In both cases, the carriages are carried by the multi-level vertical loop conveyor.

The movement of the multi-level vertical loop conveyor is coordinated so that multiple autonomous transport vehicles are able to move multiple carriages into and out of the multi-level vertical loop conveyor at substantially the same time. Details of the coordination of the multi-level conveyor is discussed below.

Control System

Figure 11:
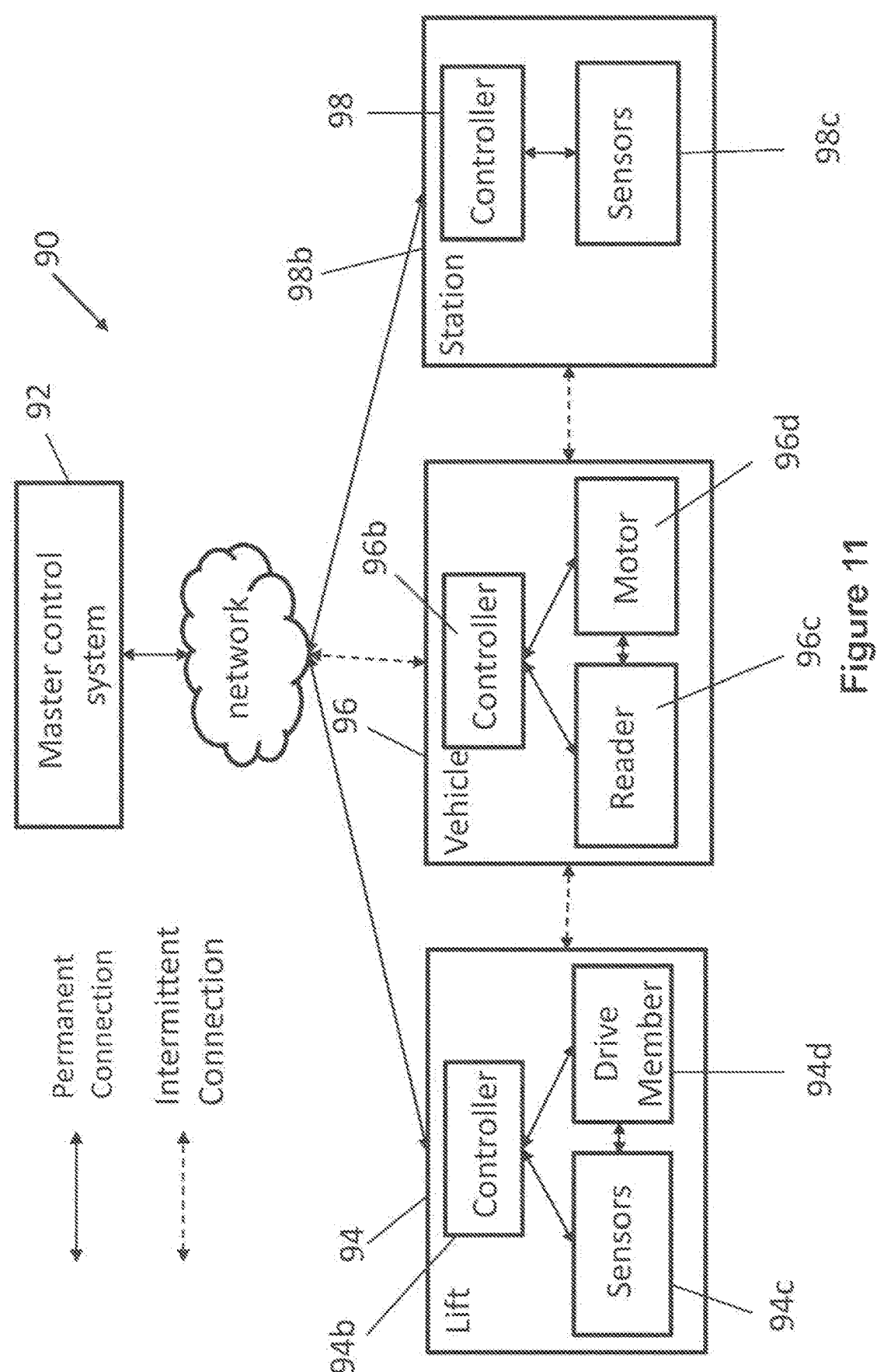
FIG. 11 is a schematic illustration of the components of the control system according to an exemplary embodiment of the present invention.
Figure 12:
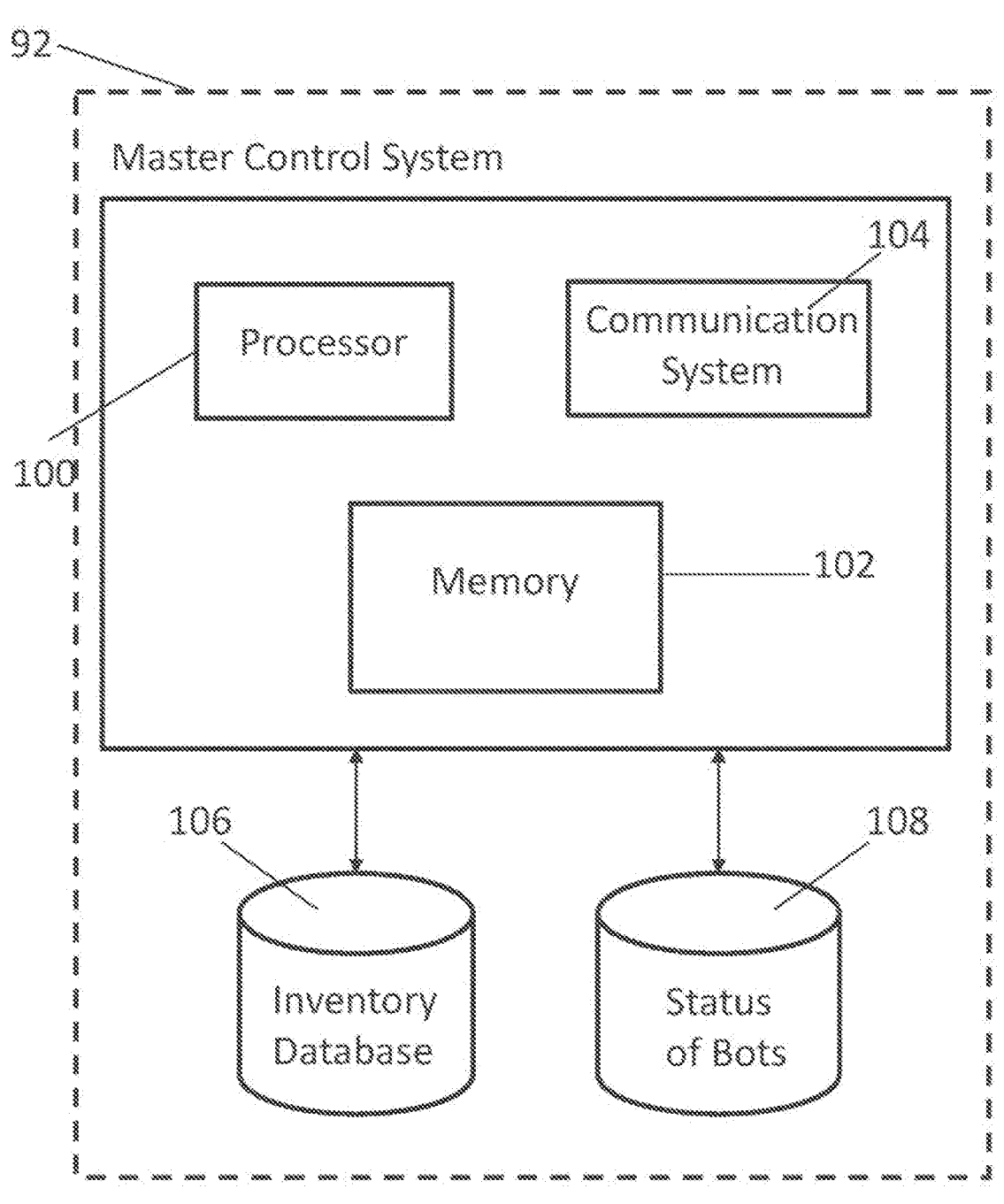
FIG. 12 is a schematic illustration of the components of the Master Control System shown in FIG. 11 according to an exemplary embodiment of the present invention.

FIG. 11 illustrates the control system 90 of the storage and retrieval system 1 in accordance with an exemplary embodiment of the present invention. The components of the storage and retrieval system such as the autonomous transport vehicles 96, the multilevel conveyor 94 and the pick/decant station 98 are controlled by a master control system 92 comprising one or more processors 100, a memory 102 for storing instructions executed by the one or more processors and a communication module 104 for communicating with the one or more autonomous transport vehicles and the multi-level vertical loop conveyor. FIG. 12 is an exemplary embodiment of the master control system 92 according to the present invention showing the one or more processors 100, the communication module 104 and the memory device 102. The master controller system 92 can be a standalone server or web server where data is processed in the cloud. The one or more processors may include one or more known processing devices, such as a microprocessor from the Pentium™ or Xeon™ family manufactured by Intel™, the Turion™ family manufactured by AMD™. The communication module 104 may be configured to allow data to be received and/or transmitted by the master controller system to and from the one or more vehicle transport vehicles 96 and/or the multi-level vertical loop conveyor 94 and/or the pick/decant station 98. The one or more processors 100 and memory 102 storing instructions when executed by the one or more processors cause the one or more processors to control the storage and retrieval system, namely the autonomous transport vehicles, the multi-level vertical loop conveyor (hereinafter referred to as "lift" in FIG. 11) and the pick/decant station (hereinafter referred to as "station" in FIG. 11). The communication module 104 is equipped with suitable transmission and receiving means (i.e. a transmitter—receiver system) to enable transmission and reception of signals to and from the autonomous transport vehicles, the multi-level conveyor and the pick/decant station.

The master controller system typically communicates with the autonomous transport vehicles 96, the multi-level conveyor 94 and the pick/decant station 98 over a network by wired or wireless communication means. In the particular embodiment shown in FIG. 11, the master controller system 92 is shown to be in permanent communication with the multi-level vertical loop conveyor 94, and the pick/decant stations 98 but in intermittent communication with the autonomous transport vehicles (vehicle) 96. The intermittent communication between the master control system 92 and the autonomous transport vehicles 96 provides a degree of autonomy to the vehicles when travelling around the storage area since the communication link between the master control system and the autonomous transport vehicles can be weak and interrupted by obstacles within the storage area, e.g. by the vertical uprights. Similarly, the communication between each of the multi-level vertical loop conveyor (lift) 94, the autonomous transport vehicles (vehicle) 96 and the pick/decant station 98 is shown to be intermittent. The intermittency of the communication between the lift 94, the vehicle 96 and the pick/decant station 98 can be based on a short range communication link, e.g. Bluetooth® whereas the permanent communication network can use any of the communication protocols commonly known in the art and include but are not limited to Transmission Control Protocol/Internet Protocol ("TCP/IP"), Open System Interconnection ("OSI"), File Transfer Protocol ("FTP"), Universal Plug and Play (UpnP"), Network File System ("NFS"), and Common Internet File System ("CFIS").

The master controller system may also be connected to one or more databases 106, 108, e.g. over the network. The one or more databases 106, 108 may include data associated with inventory and/or the position of the items of inventory in the storage area and/or frequency of requested items. In the particular embodiment shown in FIG. 12, the master controller system is in communication with an inventory database 106 and a database 108 concerning the status of the autonomous transport vehicles (hereinafter referred to as "bots" in FIG. 12). The status includes the position of the autonomous transport vehicles within and around the storage area, the engagement of the autonomous transport vehicles with one or more carriages and the health status of the autonomous transport vehicles, e.g. battery life, faults etc. The inventory database 106 provides data of the type items in storage, e.g. data associated with a SKU (stock keeping unit) of an item and the amount/weight of the items in storage. Different SKUs can be held in dedicated carriages. Each of the carriages in storage can be labelled with an electronic label or an identifier that identifies the SKU held in the carriage and/or the amount of the SKU, e.g. weight. The label or identifier can be a barcode, QR code or other electronic label which is able to hold data associated with the SKU or type of item held in the carriage and/or the position of the carriage in the storage. The label on the carriages can be read by a sensor mounted on the autonomous transport vehicles and communicated to the master controller system. Any updates in the positioning or the type of items held in the carriages can be communicated to the master controller system via the positioning data read by the autonomous transport vehicle, where they are subsequently stored in the inventory database 106. The inventory database 106 can also store data concerning the frequency of items requested to fulfil one or more customer orders. This can be regularly updated depending on certain characteristics, e.g. seasonal changes, religious and/or holiday events such as Christmas or Easter. The master controller system 92 is configured to correlate data associated with the positioning of the carriages in the storage area to the SKU of the items held in the carriages to generate an inventory management system such that the master controller system is able to locate an item or SKU in the storage area when fulfilling a customer order.

As discussed above, the inventory which is loaded into carriages are held in designated parking spaces in the storage area. The parking spaces can be labelled by their position in the storage area. A parking space can be located by the number of rows and columns on a storage level in a 2 dimensional plane, e.g. designated X, Y coordinates and the storage level of the vertically stacked storage levels in a 3 dimensional array, e.g. Z-coordinate. For example, each of the park spaces in the storage area can be labelled with their corresponding coordinates X, Y, Z, where X represents the position or row in the X direction, Y represents the position or column in the Y direction and Z represents the storage level. For example, $Z=1$ identifies the lowermost storage level, $Z=2$ is the storage level immediately above the first storage level ($Z=1$) and so on to the uppermost storage level. The positioning of each of the carriages in storage can be communicated to the master controller system via the positioning of the autonomous transport vehicle. For example, the autonomous transport vehicle is able to identify the position of the carriage in a parking space of the storage area by the markers on the floor discussed above and communicate the position to the master controller system where they can be stored in the inventory database 106. Alternatively, surface cameras at each storage level can monitor the position of the autonomous traffic vehicles moving within the storage area and relay the positioning information to the master controller system.

Each of the autonomous transport vehicles comprises a vehicle controller 94*b* for executing instructions received from the master control system, a reader 94*c* and a communication module (not shown). The reader 94*c* is configured to read the markers e.g. Barcode readers, QR code, in the storage area that is used for determining the position of the autonomous transport vehicle in the storage area and/or around the pick/decant station. The communication module is configured to send the signals from the reader to the master controller system. The signals from the readers 94*c* are used by the master controller system to determine a route that the autonomous transport vehicle can travel to and from the storage area to locate and retrieve a particular carriage. The instructions received from the master controller system via the communication module are executed by the vehicle controller 94*b* to drive the motors 94*b* and thereby, move the autonomous transport vehicle. The autonomous transport vehicle can comprise memory storing instructions for storing instructions received from the master controller system and the vehicle controller 94*b* can execute the instructions independently. This is particularly the case where the autonomous transport vehicle is unable to talk to the master controller system within the storage area of the vertically stacked storage levels. For example, the wireless signals may be unable to reach autonomous transport vehicles due to the presence of obstacles, e.g. the individual storage levels presenting a barrier for transmission and reception of signals from the master controller system. By uploading the instructions to the autonomous transport vehicle memory, the autonomous transport vehicle may able to travel around the storage area independently without the need to be constant communication with the master controller system. Instructions to one or more of the autonomous transport vehicles may be uploaded to a memory in areas where there is a strong communication link between the master controller system and the autonomous transport vehicle, e.g. around the pick/decant station. The instructions provide a possible route for the one or more autonomous transport vehicles to retrieve or deposit a carriage to or from the storage area via the multi-level vertical loop conveyor. This allows the one or more autonomous transport vehicles to travel to and from the storage area independently without continued assistance of the master control system.

The multi-level vertical loop conveyor 96 according to an exemplary embodiment of the present invention comprises a lift controller 96*b* in communication with one or more sensors 96*c* for sensing the presence of an autonomous transport vehicle and/or carriage in the in-bound area or the out-bound area of the storage area. The one or more sensors 96*c* can be present at each of the plurality of platforms such that the one or more sensors can sense the presence of an autonomous transport vehicle and/or carriage in the in-bound area or the out-bound area at each of the storage levels of the vertically stacked storage levels. Not shown in FIG. 11, the lift 96 can comprise a communication module (not shown) configured to send and receive instructions from the master controller system. The instructions are executed by the lift controller 96*b*. As discussed above, the one or more sensors 96*c* can be an optical sensor, e.g. LiDar sensor, or alternatively, a camera for detecting the presence of an autonomous transport vehicle and/or carriage in the in-bound and/or out-bound area (see section on Traffic Light System discussed above). Signals from the one or more sensors 96*c* are either processed by the lift controller 96*b* to cause movement of the plurality of platforms and/or sent to be processed by the master controller system to provide instructions to the lift controller 96*b* to cause movement of the plurality of platforms. Equally applicable in the present invention is that the autonomous transport vehicles can comprise one or more sensors as discussed above that cooperate with the multi-level vertical loop conveyor to request a platform to take the autonomous transport vehicle to a different storage level.

Figure 13:
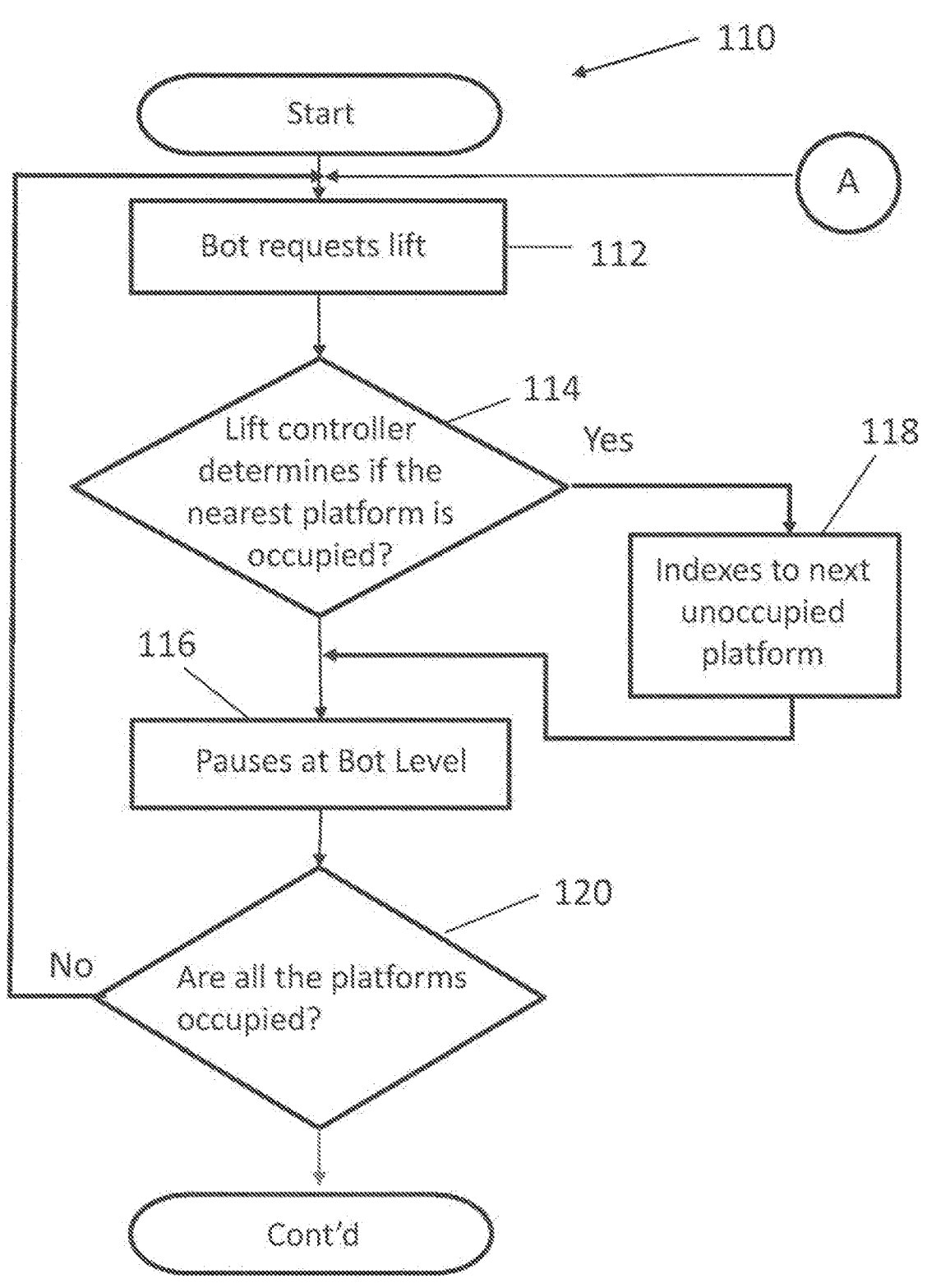
FIG. 13 is a flow diagram of feeding the multi-level vertical loop conveyor according to an exemplary embodiment of the present invention.
Figure 13:
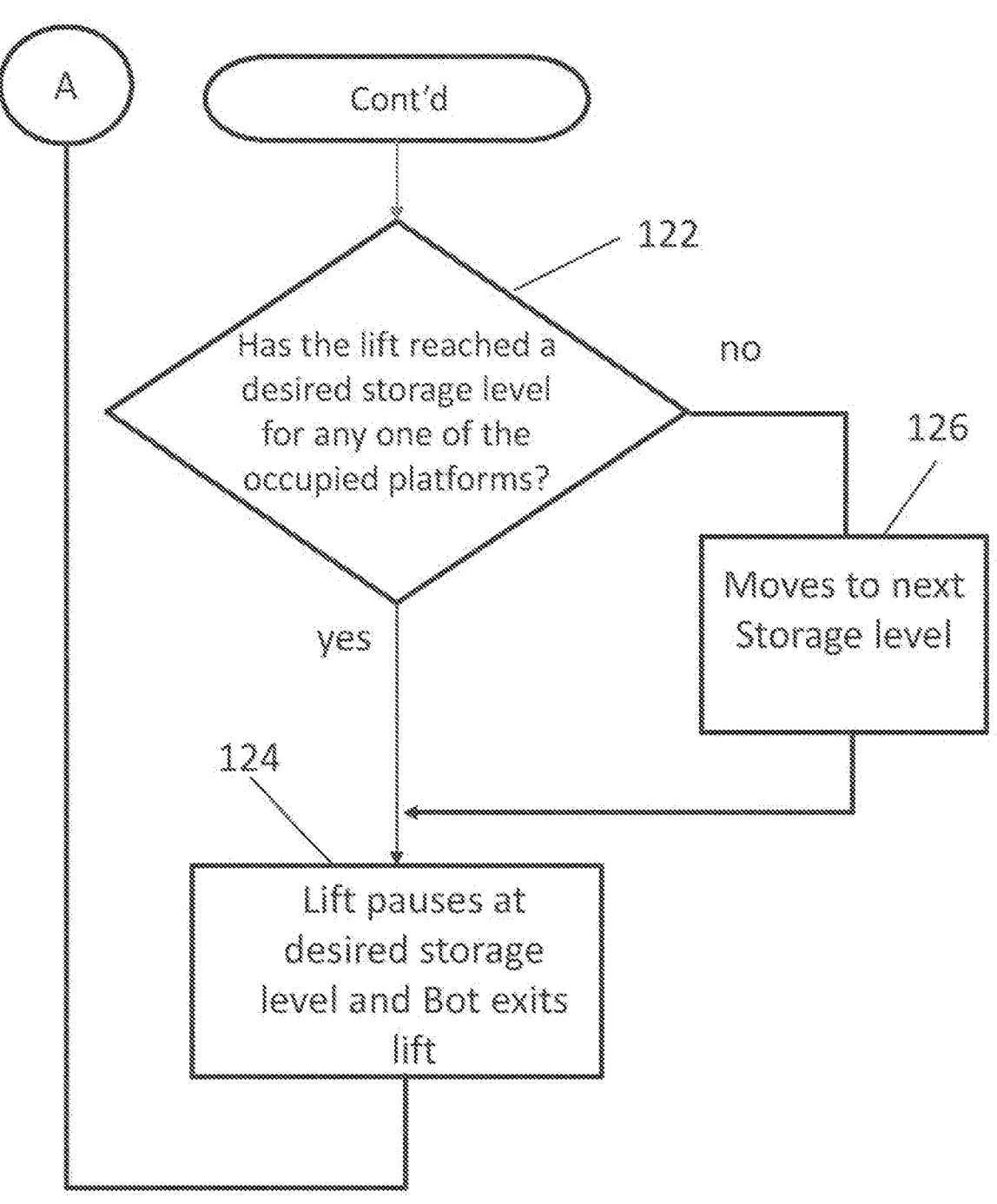

Movement of the plurality of platforms is coordinated such that multiple autonomous transport vehicles can load and/or unload one or more carriages to and from the multi-level vertical loop conveyor at substantially the same time or simultaneously. FIG. 13 is flowchart 110 which shows an example of the operation of an autonomous transport vehicle requesting entry into the multi-level conveyor according to an embodiment of the present invention. For the purpose of simplification in FIG. 13, the term "autonomous transport vehicle" is termed "Bot". At the first stage designated by ref. 112 in FIG. 13, the autonomous vehicle enters the out-bound area of a storage area and requests entry into the multi-level loop conveyor. The communication between the vehicle controller and the lift controller also includes the desired storage level that the waiting autonomous transport vehicle would like to reach. The mere presence of the autonomous transport vehicle in the out-bound area is sensed by one or more sensors by the traffic light system discussed above which triggers the lift controller to determine if a platform nearest to the storage level corresponding to the level where the autonomous transport vehicle (hereinafter referred to "Bot level") is waiting is available 114. The nearest platform could be a platform immediately close to the Bot level. If the nearest platform is unoccupied as determined by the one or more sensors, e.g. camera, as discussed above, then the nearest platform will pause at the Bot level 116 to allow the autonomous transport vehicle to move the carriage and dock onto the nearest platform. If, however, the nearest platform is occupied as determined by the one or more sensors, e.g. load cell, 118 then the lift controller indexes the platforms to the next platform and so on until an unoccupied platform nearest to the Bot level approaches the Bot level allowing the unoccupied platform to pause at the Bot level and allow the autonomous transport vehicle to enter the multi-level vertical loop conveyor.

If, however, all of the platforms are occupied 120, then the autonomous transport vehicle waits in the out-bound area until a platform becomes available, i.e. unoccupied. The multi-level vertical loop conveyor will determine whether one or more its platforms has reached a desired storage level for one of the autonomous transport vehicles and/or carriages occupying the platforms 122. When a desired storage level is reached, the multi-level conveyor will pause 124 at the storage level to allow one or more of the autonomous transport vehicles and/or carriages occupying the multi-level vertical loop conveyor to exit the multi-level vertical loop conveyor via the in-bound area and thereby, creating an availability for one or more autonomous transport vehicles waiting for a platform to pause at the storage level where the autonomous transport vehicle is waiting (Bot level). Whilst in the multi-level vertical loop conveyor, the vehicle controller communicates with the lift controller via the communication module to the storage level of the autonomous transport vehicle and to provide instructions to the lift controller when to pause at the desired storage level.

Figure 14:
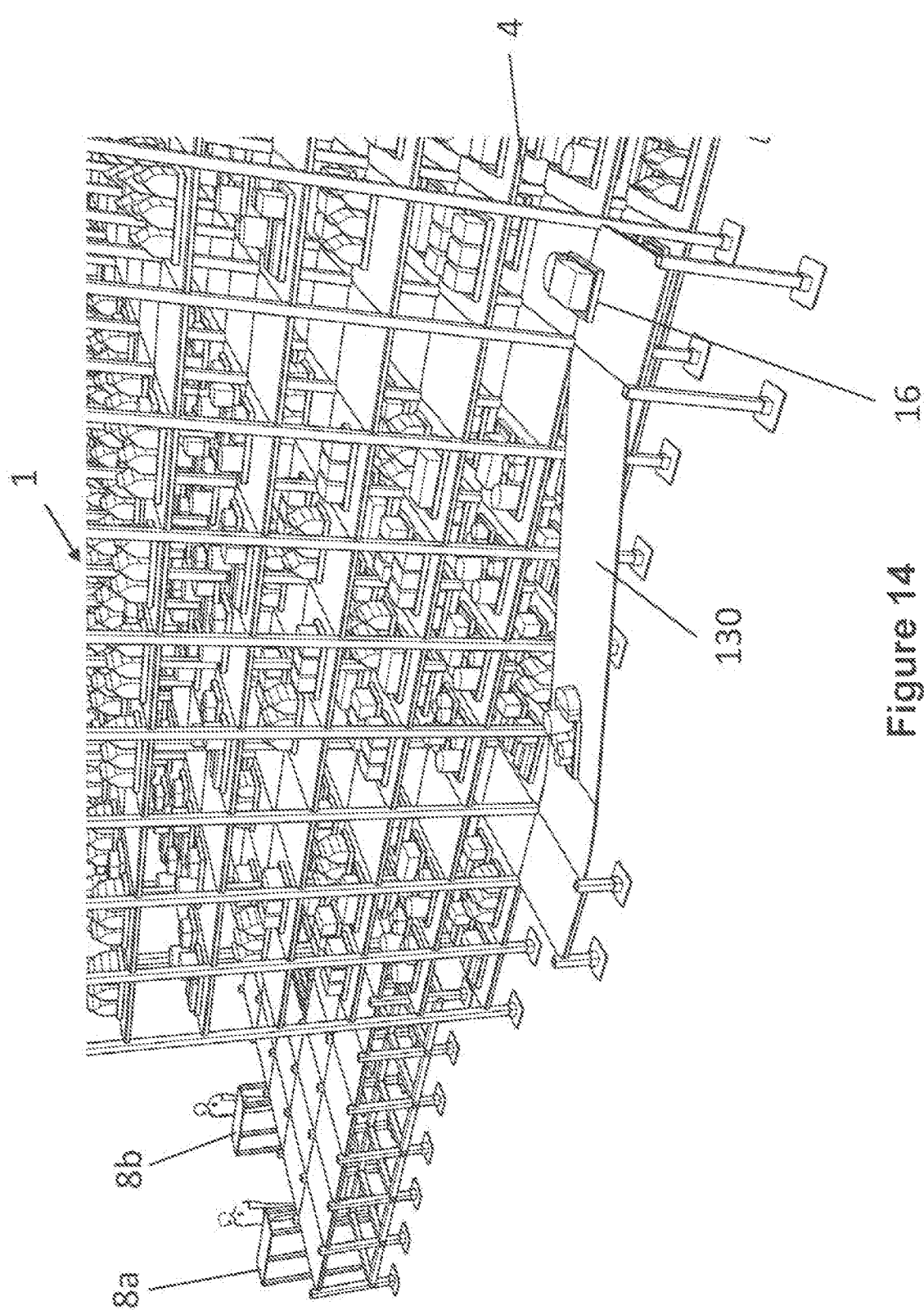
FIG. 14 is an illustration of the storage and retrieval system showing a ramp connecting different storage levels according to an exemplary embodiment of the present invention.

If one of its platforms has not reached a desired storage level for one of the autonomous transport vehicles and/or carriages to exit the multi-level vertical loop conveyor, the multi-level conveyor moves the plurality of platforms until one of the platforms reaches a desired storage level for one of the autonomous transport vehicles and/or carriage to exit the multi-level loop conveyor 126. The whole process of entry and exit of each of the plurality of autonomous transport vehicles and/or carriages repeats as the plurality of platforms travel around a continuous vertical loop. The ability to vertically accumulate a plurality of autonomous transport vehicles and/or carriages amongst a plurality of platforms in the multi-level vertical loop conveyor enables a plurality of autonomous transport vehicles and/or carriages to enter and/or exit the multi-conveyor at substantially the same time. This reduces congestion and thus, the time one or more autonomous transport vehicles and/or carriages have to wait to be transported to a different storage level and thereby, increases the traffic of autonomous transport vehicles and carriages into and out of the storage area. The autonomous transport vehicles and/or carriages are transported to a storage level where they can exit the multi-level vertical loop conveyor and move to a pick station where one or more items can be picked from the carriage (see FIG. 14).

The converse is true where an autonomous transport vehicle can enter the storage area from a decant station where it is transported by the multi-level vertical loop conveyor to a desired storage level for storage.

Moreover, not discussed in FIG. 13, is that the sequence or order by which the autonomous transport vehicles and/or carriages enter and leave the multi-level vertical loop converter can be different. As discussed above, this is particularly the case where the autonomous transport vehicles and/or carriages can remain on the platforms as they travel around in a continuous loop in the example of the multi-level vertical loop conveyor described with reference to FIGS. 7(*a* and *b*). An autonomous transport vehicle can be instructed to remain on the platform as it travels around the continuous vertical loop so as to give priority to another autonomous transport vehicle and/or carriage on another platform to exit the multi-level vertical loop conveyor. Priority may be given to items held in one or more carriages based on a particular attribute or urgency criteria. For example, the temperature of the one or more items held in one or more carriages and/or the urgency of the one or more items to fulfil one or more customer orders. The autonomous transport vehicle via the vehicle controller can communicate a priority signal to the lift controller to give priority to the items held in the carriages. The lift controller can then prioritise the one or more autonomous transport vehicles in the out-bound area of the storage area over the other autonomous transport vehicles in the out-bound area at a different storage level. Similarly, when loaded onto their respective platforms in the multi-level vertical loop conveyor, the lift controller can prioritize movement of the plurality of platforms so that one or more platforms pause at the desired storage level to allow one or more autonomous transport vehicles to unload the priority carriages. Equally, whenever the lift controller senses an autonomous transport vehicle in the out-bound area of the storage area, a timer is started to determine the length of time the autonomous transport vehicle is waiting at the out-bound area. The measurement of time can be used by the lift controller to prioritise one or more autonomous transport vehicles in the out-bound area based on the length of time the one or more transport vehicles is waiting. These are some of the examples where the multi-level vertical loop conveyor can prioritise movement of the plurality of platforms.

The master control system 92 separately or in conjunction with the lift controller may instruct the multi-level vertical loop conveyor to assign one or more autonomous transport vehicles from less busy storage levels to other storage levels storing the frequently requested items. By allowing the autonomous transport vehicles to be carried by the multi-level vertical loop conveyor to the different storage levels allows one or more autonomous transport vehicles to be assigned to one or more storage levels where demand for the items in the carriages are relatively high. In communication with the inventory database 106, the master control system 92 can identify the location of the carriages which are frequently requested. To allow the frequently requested carriages to be accessible, the master control system can instruct one or more autonomous transport vehicles to re-distribute the carriages so that the frequently requested carriages are stored at the lower storage levels and to assign more autonomous transport vehicles to the lower storage levels.

In an exemplary embodiment of the present invention, the storage and retrieval system 1 further comprises one or more ramps 130 connecting different storage levels. The one or more ramps 130 allows one or more autonomous transport vehicles that are not able to gain access to the multi-level vertical loop conveyor due to congestion and/or time constraints find alternative routes to the pick/decent station or storage area. For example, the one or more ramps 130 can provide a path for one or more autonomous transport vehicles to move one or more carriages to and from the storage area that are not time critical and prioritise one or more carriages to the multi-level vertical loop conveyor that are time critical. In the particular embodiment shown in FIG. 14, a ramp is shown connecting the lower storage levels 4, wherein one of the storage levels is at a level corresponding to the level of the pick and the decant station 8*a*, 8*b*. This removes the need for the autonomous transport vehicles at the lower storage levels from congesting the multi-level conveyor since the ramp is a quicker route to the pick and/or decant station 8*a*, 8*b*.

Other advantages of the incorporation of the ramp connecting two or more storage level is the ability for the autonomous transport vehicle and/or carriage to travel to a lower storage level deemed inaccessible due to the lower curved portions of the multi-level vertical loop conveyor 7, 17, i.e. where the platforms tend to flip around the lower curved portions. This helps with the increased throughput of one or more items to and from the storage area since it allows multiple autonomous transport vehicles on different vertically spaced platforms to exit the multi-level vertical loop conveyor at different storage levels substantially simultaneously. If the pick or decant station is at a different storage level when the autonomous transport vehicle exits a storage level, then the autonomous transport vehicle and/or carriage can make their way to the level of the pick/decant stations via the ramp rather than just using the multi-level vertical loop conveyor. For example, if the storage level is at level 2 and the autonomous transport vehicles and/or carriage exit storage levels 1, 2 and 3, then the autonomous transport vehicles and/or carriages at level 1 and 3 can make their way to storage level 2 via the ramps connecting storage levels 2 and 1, and 3 and 2. This allows the movement of the plurality of platforms relative to the plurality of storage levels to be indexed in multiples of two or more storage levels rather than pausing at each storage level.

Also, having a pick station and/or decant station at the different storage levels to process multiple carriages allows the storage and retrieval system of the present invention to fulfil multiple orders simultaneously. However, the separation between the vertical stacked storage levels can be such that a plurality of carriages at the different storage levels can be easily accessible from a single location or a storage level. Since, the separation between the vertical stacked storage levels need only accommodate the height of the autonomous transport vehicles and the carriages, an operative and/or a robotic picking device may have sufficient reach to access the carriages at multiple storage levels from a single location so allowing to pick items at the different storage levels from the single location.

Figure 15:
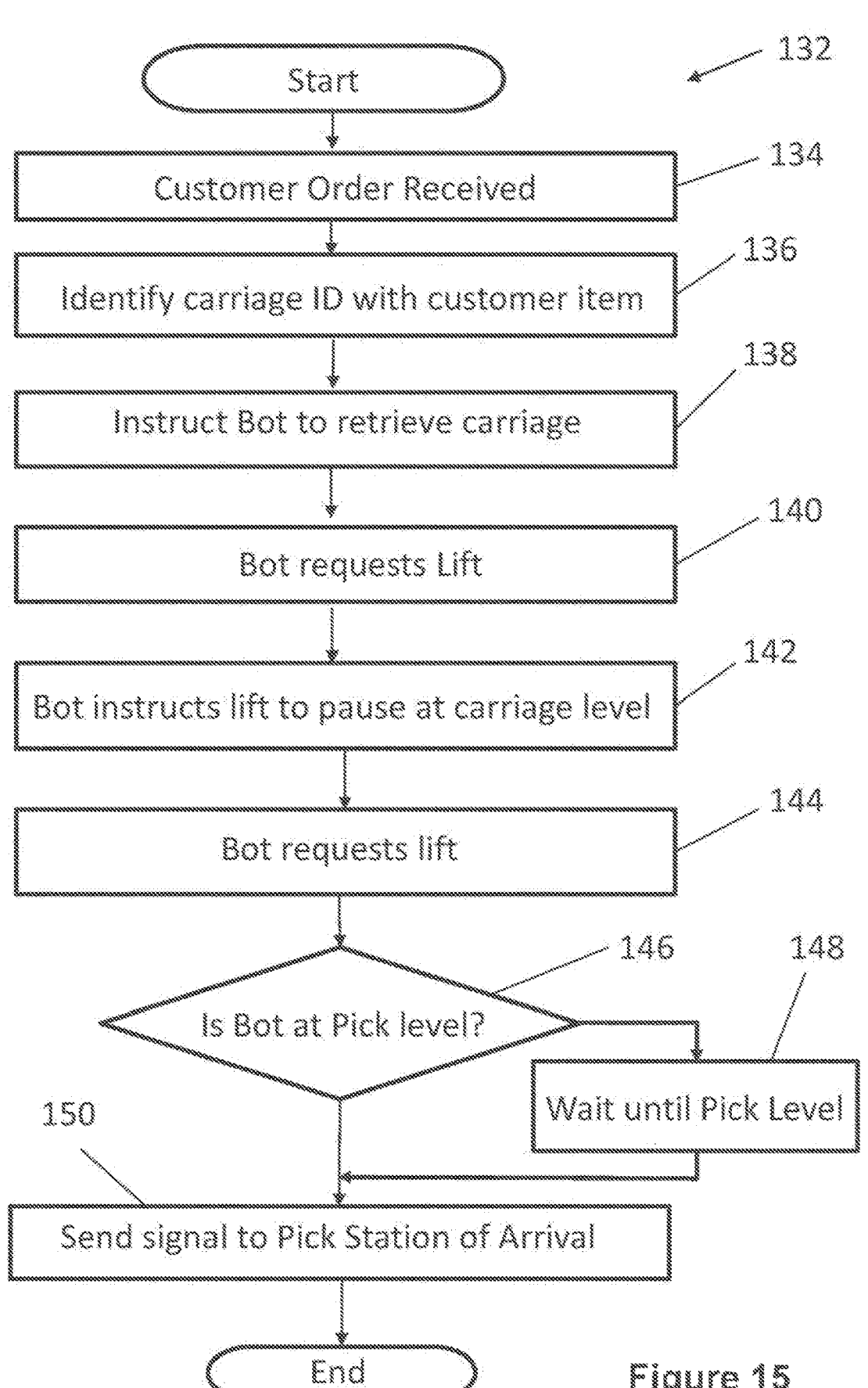
FIG. 15 is a flow diagram of a picking operation according to an exemplary embodiment of the present invention.

An exemplary operation of fulfilling an item of a customer order is shown in the flowchart 132 in FIG. 15. In response to receiving a customer order 134 comprising one or more items, the master controller system identifies 136 one or more carriages in the storage area comprising the one or more items by correlating the one or more items with the location of the carriages in the storage area as discussed above. The location can be expressed as coordinates in the storage area as described above. The master controller system then instructs the one or more autonomous transport vehicles to retrieve the carriages 138 from their respective parking spaces in the storage area. If the one or more carriages are on a different storage level, the autonomous transport vehicle requests a lift 140 to take the autonomous transport vehicle to the correct storage level (hereinafter referred to carriage level in FIG. 15) 142 and the process described with reference to the flowchart shown in FIG. 13 is performed. At the desired storage level, the autonomous transport vehicle enters the storage area to retrieve the carriage and returns to the multi-level conveyor whereupon the autonomous transport vehicle requests the lift 144 to take the autonomous transport vehicle coupled to the carriage to a pick station where the item can be picked. The autonomous transport vehicle enters the multi-level conveyor once a nearest unoccupied platform is available and waits until the autonomous transport vehicle in communication with the lift controller determines 146, 148 that the platform is at the level corresponding to the level of the pick station (hereinafter defined "Pick level" in FIG. 15). On arrival at the pick station, the autonomous transport vehicle sends a signal to the pick station of arrival so that an operator at the pick station or a robotic handling device can retrieve the item from the carriage. The pick controller or the autonomous transport vehicle can then send a signal to the master controller of the availability of the autonomous transport vehicle for another retrieval 150.

Figure 16:
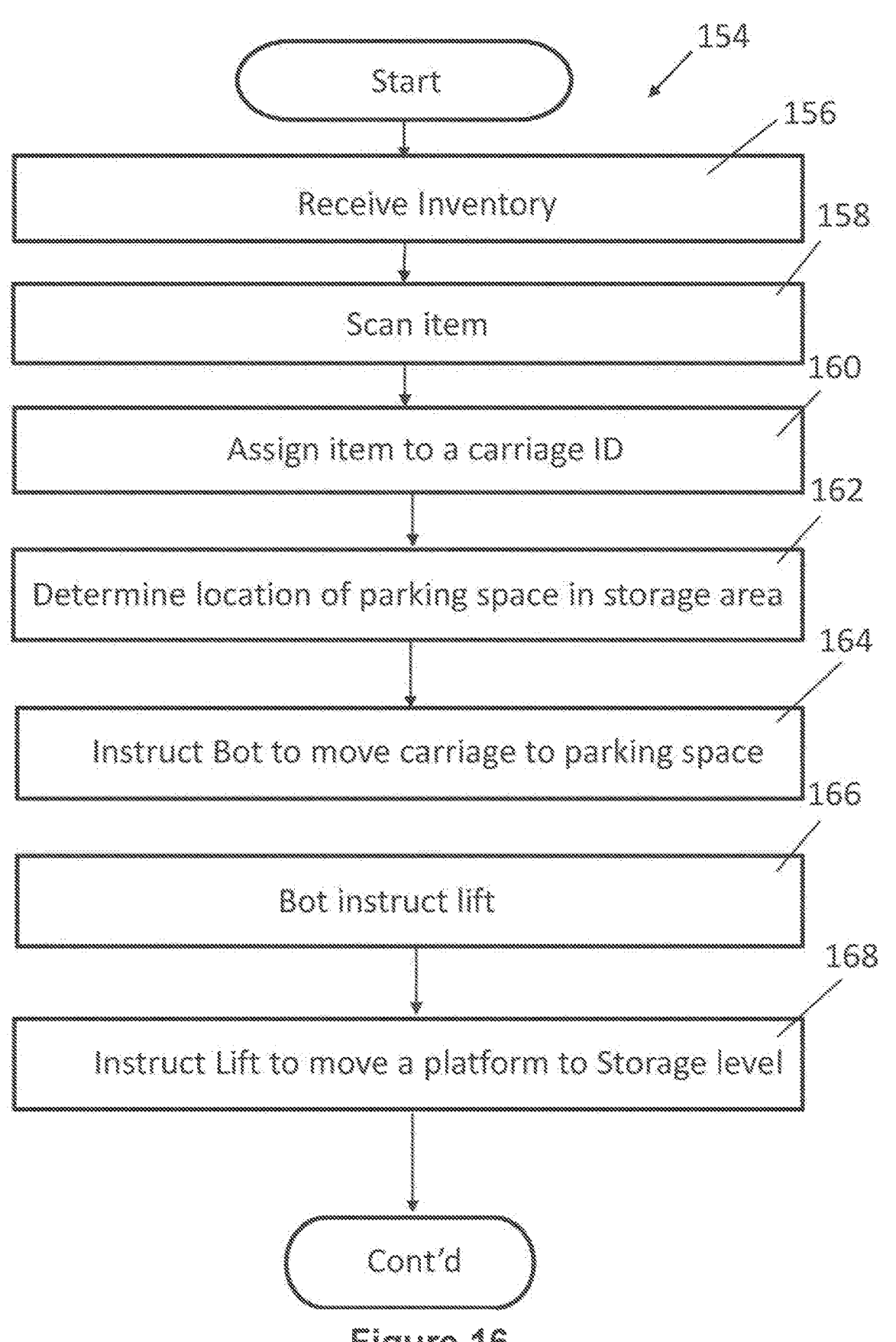
FIG. 16 is a flow diagram of a stocking operation according to an exemplary embodiment of the present invention.

An exemplary operation of stocking the inventory via the decant station is shown in the flowchart 154 in FIG. 16. Stock arriving 156 at the decant station is scanned 158 to record the SKU in the inventory database. This may involve scanning a barcode of the one or more items and communicating the information carried by the label to the master controller system.

The master controller system then assigns a carriage ID 160 to the one or more items which are stored in the inventory database and determines a parking space for the carriage 162 in the storage area. The decant operation can also include replenishing existing stock in a carriage already parked in the storage area, in which case, the master controller system requests an autonomous transport vehicle to retrieve the carriage from the storage area. The one or more items scanned at the decant station are correlated with a carriage ID in the storage area. The carriage ID will comprise data associated with the location of the carriage in the storage area, e.g. coordinates of the carriage in the storage area. The master controller system then instructs an available autonomous transport vehicle to retrieve the carriage from the storage area via the multi-level vertical loop conveyor. One or more items of stock are loaded into the one or more carriages for storage in the storage area.

Once the location of the parking space is identified 162, the master controller system instructs the autonomous transport vehicle to move the carriage to the parking space 164. The process of requesting a lift and transporting the autonomous transport vehicle to a designated parking space at a storage level 166, 168, 170, 172, 174 as discussed in FIG. 13 is applied, wherein the autonomous transport vehicle instructs the multi-level vertical conveyor to take the autonomous transport coupled to the carriage to a storage level 166, 168 where the designated parking space is located. At the storage level, the autonomous transport vehicle deposits the carriage at the parking space 176 by decoupling from the carriage. Decoupling can involve lowering the autonomous transport vehicle as discussed with reference to FIGS. 2b and 2c. Once decoupled from the carriage, the autonomous transport vehicle sends a signal to the master controller of its availability 178.

In both exemplary operations shown in the flowcharts in FIGS. 15 and 16, the traffic of autonomous transport vehicles and/or carriages to and from the pick/decant station is increased by the ability to remove the congestion at each of the storage levels since the multi-level vertical loop conveyor is able to move multiple autonomous transport vehicles and/or carriages substantially simultaneously and the ability to vertically accumulate a plurality of carriages in the multi-level vertical loop conveyor in both the upward direction and/or the downward direction of the plurality of platforms.

It should be understood that the different embodiments described herein may be used individually or in any suitable combination thereof.

The invention claimed is:

1. An automated storage and retrieval system comprising:
   a) a plurality of vertically stacked storage levels, the plurality of vertically stacked storage levels including a storage area distributed over the plurality of vertically stacked storage levels, the plurality of vertically stacked storage levels including at least one in-bound area for entering the storage area and at least one out-bound area for exiting the storage area;
   b) a plurality of carriages on which one or more items are placed and which are configured to be removable and parked in the storage area;
   c) a plurality of autonomous transport vehicles, each autonomous transport vehicle of the plurality of autonomous transport vehicles being configured to move any one of the plurality of carriages in the storage area;
   d) a multi-level vertical loop conveyor, the multi-level vertical loop conveyor including:
      i) a drive member;
      ii) a plurality of platforms coupled to the drive member, the plurality of platforms being spaced apart corresponding to a spacing between the plurality of vertically stacked storage levels, each of the plurality of platforms having a support surface being configured to support at least one of the plurality of carriages;
      iii) a guide member for guiding movement of the plurality of platforms around a continuous vertical loop; and
      iv) a drive mechanism coupled to said drive member and being configured to move the plurality of platforms vertically one behind another around the continuous vertical loop;
   e) a navigation system for guiding the plurality of autonomous transport vehicles in the storage area; and
   f) a control system operatively coupled to the drive mechanism and communicatively coupled to the navigation system, the control system being configured to control movement of the drive member so that at least one of the plurality of platforms will be at a level corresponding to at least one of the plurality of vertically stacked storage levels in response to one or more signals from the navigation system indicating that at least one of the plurality of autonomous transport vehicles is positioned in the at least one in-bound or the at least one out-bound area.

2. The automated storage and retrieval system of claim 1, comprising:
   a first side of the multi-level loop conveyor is configured for feeding one or more of the plurality of carriages into the storage area at different storage levels of the vertically stacked storage levels; and
   a second side of the multi-level level loop conveyor configured for removing one more of the plurality of carriages from the storage area at different storage levels of the vertically stacked storage levels, the first side corresponding to where the plurality of platforms will be moving in an upward direction and the second side corresponding to where the plurality of platforms will be moving in a downward direction.

3. The automated storage and retrieval system of claim 1, wherein each of the plurality of vertically stacked storage levels comprises:

the at least one in-bound area and the at least one out-bound area adjacent the multi-level vertical loop conveyor.

4. The automated storage and retrieval system of claim 3, wherein the drive mechanism is configured to index the plurality of platforms in sequential steps, each of the sequential steps corresponding to the spacing between each of the plurality of the vertically stacked storage levels.

5. The automated storage and retrieval system of claim 3, wherein the control system is configured to control movement of the drive member so that each of the plurality of platforms will be at a level corresponding to a storage level of the plurality of vertically stacked storage levels in response to one or more signals from the navigation system indicating that the plurality of autonomous transport vehicles is positioned in the at least one in-bound area or the at least one out-bound area.

6. The automated storage and retrieval system of claim 5, wherein the control system is configured to control the movement of the plurality of autonomous transport vehicles so that the plurality of carriages will be loaded onto the plurality of platforms in a first predetermined sequence and then unloaded from the plurality of platforms in a second predetermined sequence.

7. The automated storage and retrieval system of claim 6, wherein the first sequence is different to the second sequence such that the plurality of carriages will be unloaded from the plurality of platforms in a different order to the loading of the plurality of carriages to the plurality of platforms.

8. The automated storage and retrieval system of claim 4, wherein the control system is configured to instruct the movement of at least one of the plurality of the autonomous transport vehicles at each respective level of the plurality of vertically stacked storage levels to or from the multi-level vertical loop conveyor substantially simultaneously.

9. The automated storage and retrieval system of claim 8, wherein the control system is configured to control the movement of the drive member so as to prioritise one or more of the plurality of platforms to one or more of the carriages in the at least one out-bound area of one or more of the plurality of vertically stacked storage levels based on a duration of time the one or more carriages is waiting in the at least one out-bound area and/or one or more attributes of one or more items in the one or more carriages.

10. The automated storage and retrieval system of claim 9, wherein the one or more attributes comprises:

a temperature of the one or more items.

11. The automated storage and retrieval system of claim 1, wherein the navigation system comprises:

a plurality of markers distributed in the storage area, and each of the plurality of autonomous transport vehicles includes at least one sensor for reading each of the plurality of markers.

12. The automated storage and retrieval system of claim 11, wherein the plurality of markers comprises:

at least one of optical markers and/or an RFID tag.

13. The automated storage and retrieval system of claim 12, wherein the plurality of markers are distributed in a regular pattern in the storage area.

14. The automated storage and retrieval system of claim 1, wherein each of the plurality of autonomous transport vehicles are wirelessly connected to the control system such that each of the plurality of autonomous transport vehicles is configured to send and/or receive the one or more signals to and from the control system indicative of a position of a respective autonomous transport vehicle in the storage area.

15. The automated storage and retrieval system of claim 14, wherein one or more of the autonomous transport vehicles is configured to push or pull one or more of the plurality of carriages in the storage area.

16. The automated storage and retrieval system of claim 15, wherein the one or more of the autonomous transport vehicles is configured to tow one or more of the plurality of carriages in the storage area.

17. The automated storage and retrieval system of claim 1, wherein the control system is configured to move one or more of the plurality of the autonomous transport vehicles between different levels of the plurality of vertical stacked storage levels.

18. The automated storage and retrieval system of claim 17, wherein each of the plurality of platforms of the multi-level vertical loop conveyor comprises:

a continuous ride surface for an autonomous transport vehicle to ride onto and off each of the plurality of platforms.

19. The automated storage and retrieval system of claim 18, wherein the control system is configured to move one or more of the plurality of autonomous transport vehicles to one or more lower levels of the vertically stacked storage levels.

20. The automated storage and retrieval system of claim 1, comprising:

at least one ramp connecting two or more of the plurality of vertically stacked storage levels together such that one or more of the autonomous transport vehicles will traverse between different levels of the vertically stacked storage levels along the at least one ramp.

21. The automated storage and retrieval system of claim 1, wherein the at least one in-bound area and/or out-bound area comprises;

means for sensing one more carriages in the at least one in-bound area and/or the out-bound area, said sensing means being communicatively coupled to the control system.

22. The automated storage and retrieval system of claim 21, wherein the means for sensing is a load cell.

23. The automated storage and retrieval system of claim 1, wherein a number of platforms of the multi-level vertical conveyor system is greater than or equal to a number of vertically stacked storage levels.

24. The automated storage and retrieval system of claim 1, wherein each of the plurality of platforms of the multi-level vertical loop conveyor is fixedly coupled to the drive member such that an orientation of each of the plurality of platforms will change as a direction of the drive member changes when moving around the continuous vertical loop.

25. The automated storage and retrieval system of claim 1, wherein the plurality of platforms of the multi-level loop conveyor is movably coupled to the drive member such that each of the plurality of platforms will remain substantially horizontal as a direction of the drive member changes when driven around the continuous vertical loop.

26. The automated storage and retrieval system of claim 25, wherein the guide member comprises:

orientation means for maintaining each of the plurality of platforms in a substantially horizontal orientation at an uppermost and lowermost portion of the multi-level vertical loop conveyor.

27. The automated storage and retrieval system of claim 26, wherein the orientation means comprises:

at least two guide paths at the uppermost and lowermost portion of the multi-level vertical loop conveyor, the at least two guide paths being in cooperation with at least two guide pins coupled to each of the plurality of platforms so as to prevent rotation of each of the plurality of platforms.

28. The automated storage and retrieval system of claim 1, wherein each of the plurality of platforms is supported by at least three points of contact by the guide member and/or the drive member.

29. The automated storage and retrieval system of claim 1, wherein at least one of the plurality of platforms is configured to interface with each of the plurality of vertically stacked storage levels when the at least one of the plurality of platforms is at a level corresponding to the level of any one of the plurality of vertically stacked storage levels so as to provide a path for at least one of the plurality of autonomous transport vehicles to travel between the at least one of the plurality of platforms and the in-bound and out-bound area of the storage area.

30. The automated storage and retrieval system of claim 29, wherein an interface between the at least one of the plurality of platforms and any one of the plurality of vertical stack storage levels comprises:

a moveable flap.

31. The automated storage and retrieval system of claim 1, wherein the multi-level vertical loop conveyor comprises:

a traffic light system for controlling entry and/or exit of one or more of the plurality of carriages into and/or out of the multi-level vertical loop conveyor, said traffic light system including at least one sensor for sensing a presence of at least one autonomous transport vehicle and/or a presence of at least one of the plurality of carriages.

32. The autonomous storage and retrieval system of claim 31, wherein the traffic light system comprises:

a physical barrier moveable from a first position to prevent entry onto at least one of the plurality of platforms of the multi-level vertical loop conveyor to a second position to permit entry onto the at least one of the plurality of platforms of the multi-level vertical loop conveyor.

33. The automated storage and retrieval system of claim 1, comprising:

i) a pick station configured and arranged for transfer of one or more items into the one or more carriages;

ii) a decant station configured and arranged for removing the one or more items from the one or more carriages; and iii) a transfer deck disposed between either the pick station or the decant station and the multi-level vertical loop conveyor, and configured for one or more of the plurality of autonomous transport vehicles to move the one or more carriages between the pick station or decant station and the multi-level vertical loop conveyor.

* * * * *